(12) United States Patent
Ishida et al.

(10) Patent No.: US 11,456,643 B2
(45) Date of Patent: Sep. 27, 2022

(54) ROTATING ELECTRIC MACHINE, CONTROLLER, VEHICLE SYSTEM, AND MAINTENANCE METHOD OF ROTATING ELECTRIC MACHINE

(71) Applicant: DENSO CORPORATION, Kariya (JP)

(72) Inventors: Minoru Ishida, Kariya (JP); Naoki Katayama, Kariya (JP); Tsubasa Sakuishi, Kariya (JP); Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 162 days.

(21) Appl. No.: 16/589,575

(22) Filed: Oct. 1, 2019

(65) Prior Publication Data

US 2020/0106338 A1 Apr. 2, 2020

(30) Foreign Application Priority Data

Oct. 2, 2018 (JP) .............................. JP2018-187407

(51) Int. Cl.
*H02K 7/12* (2006.01)
*H02K 16/02* (2006.01)
(Continued)

(52) U.S. Cl.
CPC ................ *H02K 7/12* (2013.01); *H02K 7/006* (2013.01); *H02K 11/30* (2016.01); *H02K 16/02* (2013.01);
(Continued)

(58) Field of Classification Search
CPC .......... H02K 7/12; H02K 11/30; H02K 16/02; H02K 7/00; H02K 7/14; H02K 3/14; H02K 7/006; H02K 11/33; H02K 3/28; B60L 15/20; B60L 15/00; B60L 2220/50; B60L 2240/425; B60K 7/0007; B60K 23/08; B60K 1/00; B60K 2007/0038; B60K 2007/0092; B60K 17/356; Y02T 10/64; Y02T 10/72; B60Y 2400/60; B60Y 2200/91
See application file for complete search history.

(56) References Cited

U.S. PATENT DOCUMENTS 5,606,791 A * 3/1997 Fougere ............. H02K 15/0442
29/596
5,723,933 A * 3/1998 Grundl ..................... H02K 3/04
310/208
(Continued)

FOREIGN PATENT DOCUMENTS

EP 1879280 A1 * 1/2008 ............ F03B 13/083
JP H10-304611 A 11/1998
(Continued)

*Primary Examiner* — Naishadh N Desai
(74) *Attorney, Agent, or Firm* — Oliff PLC

(57) ABSTRACT

A rotating electric machine includes a rotor rotatably supported and also including a magnet portion; a stator including a stator winding; and a plunger configured to displace the rotor and the stator relative to one another along an axial direction of the rotating electric machine. The stator includes a slotless structure in which at least one of no magnetic teeth and slot is provided. Thus, an attracting force acting between the magnet portion and the stator is weakened, thereby the rotor and the stator are easily displaceable relative to each other by the plunger.

13 Claims, 38 Drawing Sheets

(51) Int. Cl.
  *H02K 7/00*   (2006.01)
  *H02K 11/30*  (2016.01)
  *B60K 1/00*   (2006.01)
  *B60L 15/00*  (2006.01)

(52) U.S. Cl.
  CPC ............... *B60K 1/00* (2013.01); *B60L 15/00* (2013.01); *B60Y 2200/91* (2013.01); *B60Y 2400/60* (2013.01)

(56) References Cited

U.S. PATENT DOCUMENTS

| | | | |
|---|---|---|---|
| 5,763,977 A | 6/1998 | Shimasaki et al. | |
| 5,850,318 A * | 12/1998 | Dunfield | H02K 5/163 360/99.08 |
| 5,996,554 A * | 12/1999 | Tojo | F02D 11/10 123/399 |
| 2007/0096581 A1 * | 5/2007 | Zepp | H02K 21/024 310/191 |
| 2012/0306298 A1 * | 12/2012 | Kim | H02K 16/00 310/46 |
| 2016/0308411 A1 * | 10/2016 | Watanabe | H02K 16/02 |

FOREIGN PATENT DOCUMENTS

| | | | |
|---|---|---|---|
| JP | 2005-287285 A | 10/2005 | |
| JP | 2006-014439 A | 1/2006 | |
| JP | 2006-014466 A | 1/2006 | |
| JP | 2008-259364 A | 10/2008 | |
| JP | 2012-080616 A | 4/2012 | |
| JP | 2014-150616 A | 8/2014 | |
| JP | 2019-106864 A | 6/2019 | |
| JP | 2019-140893 A | 8/2019 | |
| WO | WO-2015104795 A1 * | 7/2015 | ............... H02K 1/14 |

\* cited by examiner

COMPARATIVE EXAMPLE

POWER MODE

ECO MODE

APPLICATION OF
ELECTRIC CURRENT

ROTATING ELECTRIC MACHINE, CONTROLLER, VEHICLE SYSTEM, AND MAINTENANCE METHOD OF ROTATING ELECTRIC MACHINE

CROSS REFERENCE TO RELATED APPLICATION

The present application is based on and claims the benefit of priority of Japanese Patent Application No. 2018-187407, filed on Oct. 2, 2018, the disclosure of which is incorporated herein by reference.

TECHNICAL FIELD

The present disclosure generally relates to a rotating electric machine, a controller, a vehicle system, and a maintenance method of the rotating electric machine.

BACKGROUND INFORMATION

In the related art, a variable magnetic flux motor is used as an in-wheel motor of an electric vehicle. The variable magnetic flux motor includes a rotor having a magnet, a stator having a stator core with an armature coil wound thereon, and means for displacing the stator in or along a rotation shaft direction of the rotor.

The armature coil is wound on or around teeth of the stator core, and is arranged or positioned in slots in between the teeth. The stator core is made of magnetic material such as iron. As such, the teeth made of the magnetic material existing in proximity of the magnet of the rotor strongly attract the magnet. In other words, a strong attracting force attracts the magnet of the rotor and the stator to each other. Therefore, movement of the stator along the rotation shaft direction for maintenance becomes harder because of the attracting force.

SUMMARY

It is an object of the present disclosure to enable ease of relative displacement between a rotor and a stator in a rotating electric machine.

In the present disclosure, in an exemplary embodiment, the rotating electric machine does not have magnetic teeth, and as such, the attracting force attracting a permanent magnet and the stator to each other is weakened. Therefore, when the rotating electric machine is removed from the vehicle for performing maintenance work, the rotor and the stator can be easily moved relative to each other to positions as to not face each other. Thereby, maintainability of the rotating electric machine is improved.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
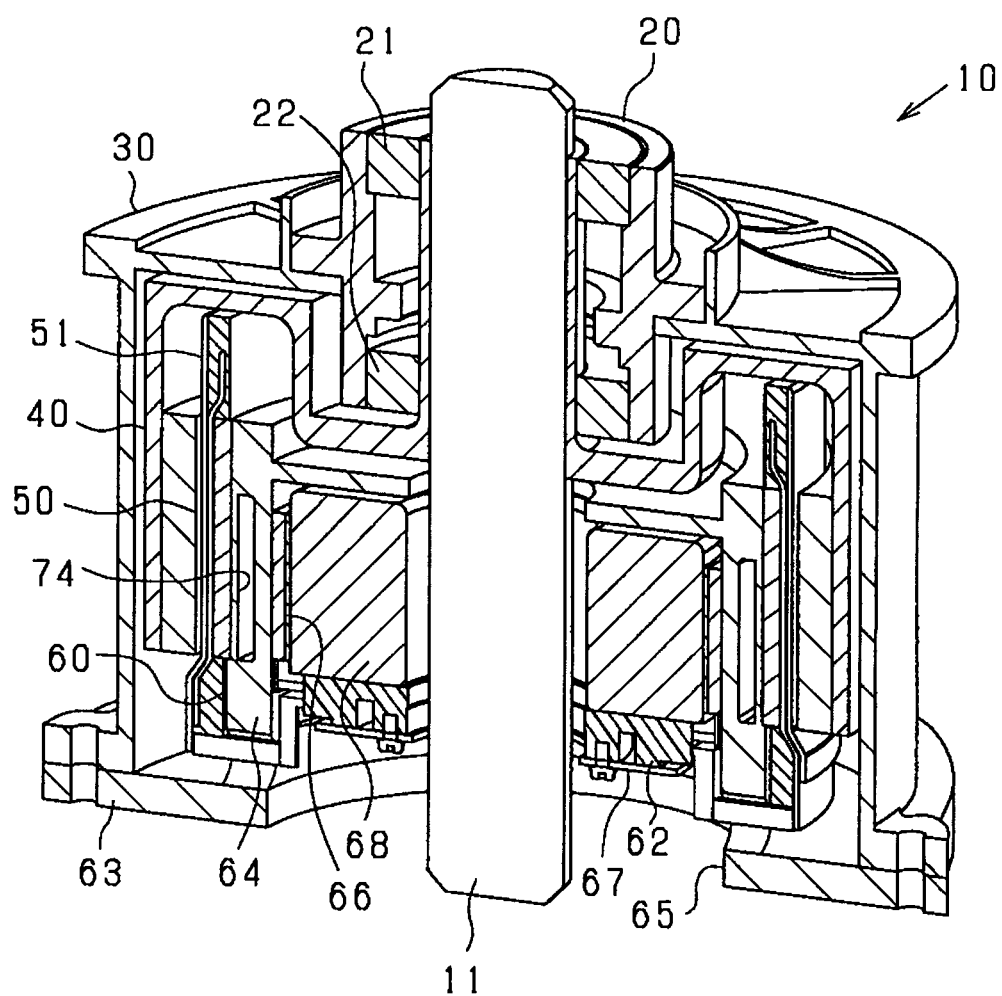
FIG. 1 is a vertical cross-sectional, perspective view of a rotating electric machine.

Hereinafter, embodiments of the present disclosure are described with reference to the drawings. In the respective embodiments described below, parts that are substantially the same or equivalent to each other have the same reference numerals in the drawings, and descriptions of those parts having the same reference numerals are provided in their applicable embodiments.

First Embodiment

The rotating electric machine of the first embodiment is used, for example, as a vehicle power source; that is, as a source of travel power of a vehicle. However, the rotating electric machine of the present disclosure may also be used for various purposes, including industrial use, vehicle use, home appliances use, OA equipment use, game machines use, and the like. First, a basic configuration of a rotating electric machine to which a convertible structure described later is applicable is described with reference to FIGS. 1 to 30A/B.

Figure 2:
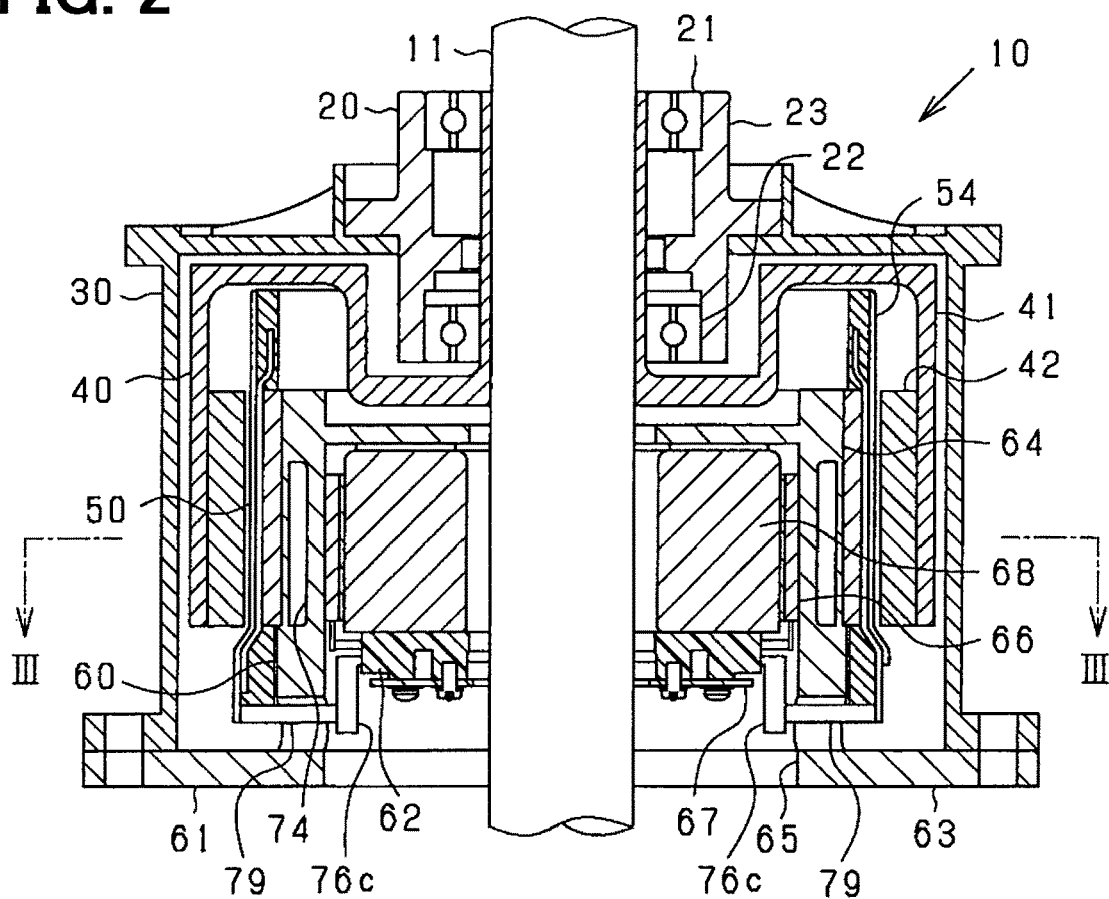
FIG. 2 is a vertical cross-sectional view of the rotating electric machine.
Figure 3:
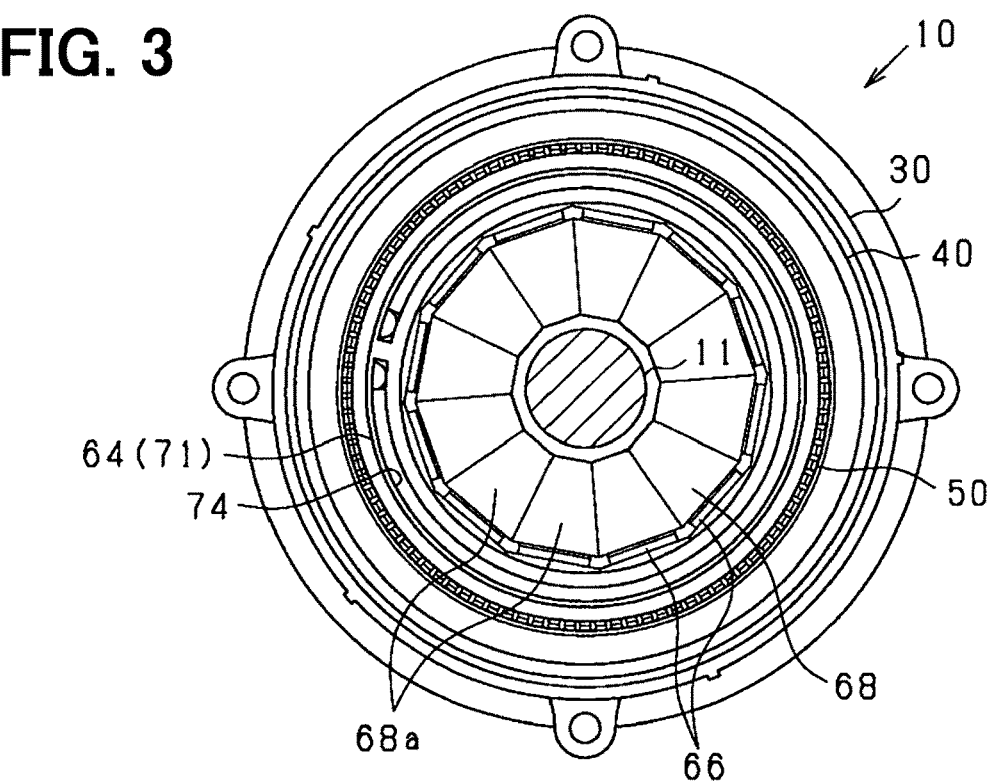
FIG. 3 is a cross-sectional view taken along a line III-III in FIG. 2.
Figure 4:
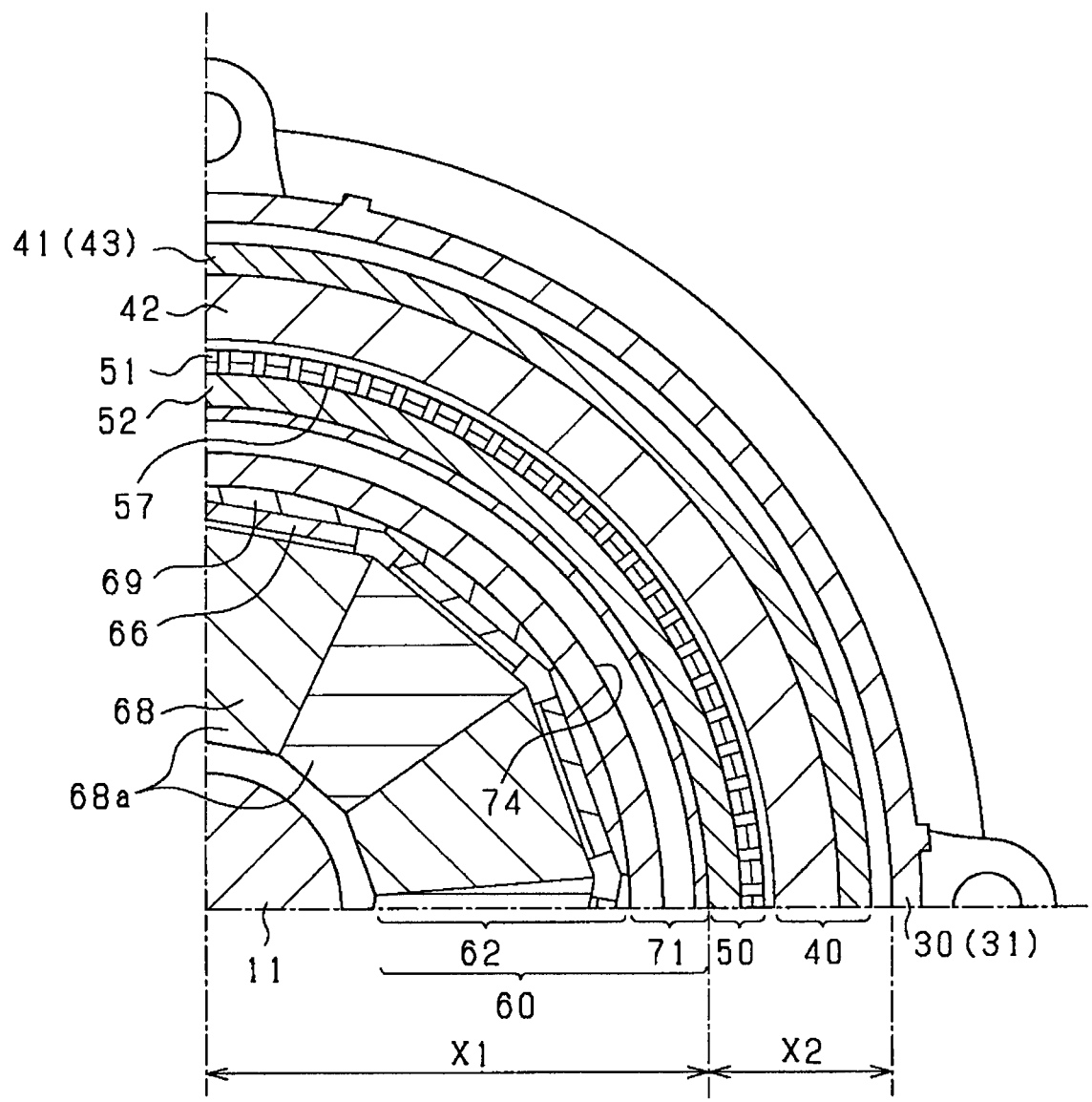
FIG. 4 is an enlarged cross-sectional view showing a part of FIG. 3.
Figure 5:
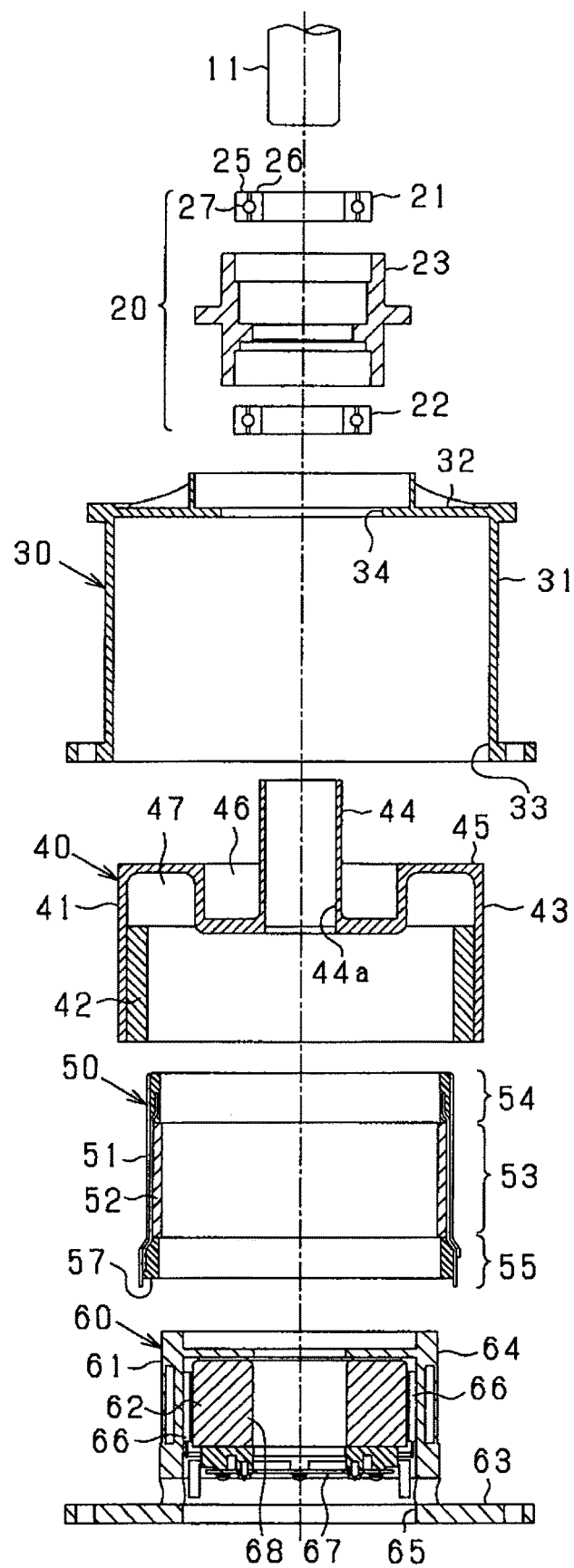
FIG. 5 is an exploded view of the rotating electric machine.

FIG. 1 is a vertical cross-sectional, perspective view of a rotating electric machine 10. FIG. 2 is a vertical cross-sectional view in a direction along a rotation shaft 11 of the rotating electric machine 10. FIG. 3 is a cross-sectional view of the rotating electric machine 10 in a direction orthogonal to the rotation shaft 11 (i.e., a cross-sectional view along a line III-III in FIG. 2). FIG. 4 is a cross-sectional view showing a part of FIG. 3 in an enlarged manner. FIG. 5 is an exploded view of the rotating electric machine 10. In FIG. 3, for convenience of illustration, hatching indicating a cut surface is omitted except for the rotation shaft 11. In the following description, the direction along which the rotation shaft 11 extends is taken as an axial direction, the direction extending radially from the center of the rotation shaft 11 is taken as a radial direction, and the direction extending circumferentially around the rotation shaft 11 is taken as a circumferential direction.

The rotating electric machine 10 of the present embodiment is a synchronous multiphase alternating current (AC) motor, and has an outer rotor structure, that is, a structure in which a rotor is on an outside of a stator. The rotating electric machine 10 includes a bearing unit 20, a housing 30, a rotor 40, a stator 50, and an inverter unit 60. Each of these members is disposed coaxially with the rotation shaft 11, and is assembled in the axial direction in a predetermined order to configure the rotating electric machine 10.

The bearing unit 20 includes two bearings 21 and 22 which are arranged to be separated from each other in the axial direction, and a holder member 23 for holding the bearings 21 and 22. The bearings 21 and 22 are, for example, radial ball bearings, and each has an outer ring 25, an inner ring 26, and a plurality of balls 27 disposed between the outer ring 25 and the inner ring 26. The holder member 23 has a cylindrical shape, and the bearings 21 and 22 are assembled on an inside thereof in the radial direction. The rotation shaft 11 and the rotor 40 are rotatably supported on the radial inside of the bearings 21 and 22.

The housing 30 has a cylindrical peripheral wall 31 and an end face 32 provided at one of both end portions in the axial direction of the peripheral wall 31. Of the both end portions of the peripheral wall 31, the opposite side of the end face 32 is an opening 33, and the housing 30 is configured such that the opposite side of the end face 32 is fully opened by the opening 33. A circular hole 34 is formed in the center of the end face 32, and the bearing unit 20 is fixed by a fixing part such as a screw or a rivet in a state where the bearing unit 20 is inserted into the hole 34.

The rotor 40 and the stator 50 are accommodated in the housing 30, that is, in an internal space defined by the peripheral wall 31 and the end face 32. In the present embodiment, the rotating electric machine 10 is of an outer rotor type, and the stator 50 is disposed inside the housing 30 in a radial inner direction of, i.e., within, the cylindrical rotor 40. The rotor 40 is cantilevered on the rotation shaft 11 on an end face 32 side in the axial direction.

The rotor 40 has a rotor body 41 formed in a hollow cylindrical shape, and an annular magnet portion 42 provided radial inside of the rotor body 41. The rotor body 41 has a substantially cup-like shape, and has a function as a magnet holding member. The rotor body 41 has a cylindrical magnet holding portion 43, a fixing portion 44, which is also cylindrical and has a smaller diameter than the magnet holding portion 43, and a middle portion 45 connecting the magnet holding portion 43 and the fixing portion 44. The magnet portion 42 is attached to an inner peripheral surface of the magnet holding portion 43.

The rotation shaft 11 is inserted into a through hole 44a of the fixing portion 44, and the fixing portion 44 is fixed to the rotation shaft 11 in the inserted state. That is, the rotor body 41 is fixed to the rotation shaft 11 by the fixing portion 44. The fixing portion 44 may stay fixed relative to the rotation shaft 11 by spline connection using a coarse surface, key connection, welding, caulking or the like, for example. Thus, the rotor 40 rotates integrally with the rotation shaft 11. The axis of rotation of the rotor 40 coincides with the axis of the rotation shaft 11.

The bearings 21 and 22 of the bearing unit 20 are assembled on the radial outside of the fixing unit 44. As described above, since the bearing unit 20 is fixed to the end face 32 of the housing 30, the rotation shaft 11 and the rotor 40 are rotatably supported by the housing 30. Thereby, the rotor 40 is freely rotatable in the housing 30.

The fixing portion 44 is provided on only one of two axial ends of the rotor 40 in the axial direction thereof, whereby the rotor 40 is supported in a cantilever manner on the rotation shaft 11. Here, the fixing portion 44 of the rotor 40 is rotatably supported by the bearings 21 and 22 of the bearing unit 20 at two different positions in the axial direction. That is, the rotor 40 is rotatably supported by the bearings 21 and 22 at two positions in one of two axial end parts of the rotor body 41. Therefore, stable rotation of the rotor 40 is realized even in a cantilever-like support structure of the rotor 40 by using the rotation shaft 11. In such a case, the rotor 40 is supported by the bearings 21 and 22 at positions that are shifted away from a center of axially-extending rotation shaft 11.

Further, in the bearing unit 20 of FIG. 5, a dimension of (i) a gap between the outer ring 25 and a ball 27 of a lower bearing 22 closer to the center of the rotor 40 and a dimension of (ii) a gap between the inner ring 26 and the ball 27 of an upper bearing 21 are respectively different. For example, the gap dimension of the bearing 22 is greater than that of the bearing 21. By devising such a configuration, even when vibration of the rotor 40 or swing of the rotor 40 due to the imbalance of component tolerance acts on the bearing unit 20 on a center side of the rotor 40, the influence of the vibration is well absorbed.

More practically, by making a play size (i.e., the gap size) greater in the bearing 22 than in the bearing 21 with an application of preload, the vibration generated in the cantilever structure is well absorbed by the play portion. The preload described above may be a home position preload, or may be one applied by inserting a preload spring, a wave washer, or the like in a step shape part on an axial outer side (i.e., on the upper side in the drawing) of the bearing 22.

The middle portion 45 is configured to have a step shape connecting part between a radial inner side and a radial outer side. That is, a radial inner portion of the middle portion 45 and a radial outer portion thereof have respectively different axial positions, whereby the magnet holding portion 43 and the fixing portion 44 partially overlap in the axial direction. In other words, the magnet holding portion 43 protrudes outward at an upper (outer-from-axial-center) position in the axial direction with respect to a base of the fixing portion 44 (i.e., at a lower position in the drawing of FIG. 5, for example). In such a configuration, the position of the support of the rotor 40 is brought closer to a center of gravity of the rotor 40, compared to a step-less configuration (i.e., a flat disk shape) of the middle portion 45, thereby enabling a stable operation of the rotor 40.

Due to the configuration of the middle portion 45 described above, the rotor 40 has a bearing accommodation recess 46 for accommodating a part of the bearing unit 20 having an annular shape formed at a position surrounding the fixing portion 44 and inside the middle portion 45. Further, a coil accommodation recess 47 for accommodating a coil end portion 54 of the stator winding 51 of the stator 50 described later is formed at a position surrounding the bearing accommodation recess 46 in the radial direction and outside the middle portion 45. Further, these accommodation recesses 46, 47 are arranged to be adjacent to each other in the radial direction, i.e., radial inside and radial outside to each other. That is, a part of the bearing unit 20 and the coil end portion 54 of the stator winding 51 are disposed to overlap along the axial direction, at a radial inside position and radial outside position. Thereby, the axial dimension of the rotating electric machine 10 is reducible.

The coil end portion 54 can be bent radially inward or outward, whereby the axial dimension of the coil end portion 54 is reducible, and the stator axial length is reducible. The bending direction of the coil end portion 54 may be set in consideration of the assembly with the rotor 40. Assuming that the stator 50 is assembled at a radial inside of the rotor 40, the coil end portion 54 may be bent radially inward on an insertion tip side with respect to the rotor 40. Although the bending direction on an opposite tip side may be arbitrarily set, it may be preferable in terms of manufacturing, to have a radially outward bending direction, where a work space is easily available.

The magnet portion 42 is an arrangement of a plurality of magnets with their poles alternatingly arranged along the circumferential direction on the radial inside of the magnet holding portion 43. Details of the magnet portion 42 are described later.

The stator 50 is provided at a radial inside of the rotor 40. The stator 50 has a stator winding 51 wound in a substantially cylindrical shape, and a stator core 52 disposed radially inside thereof. The stator winding 51 is disposed to face the annular magnet portion 42 with a predetermined air gap reserved therebetween. The stator winding 51 is composed of a plurality of phase windings. Each phase winding is configured by connecting a plurality of conductive wires arranged along the circumferential direction at a predetermined pitch. In the present embodiment, by using three-phase windings of U-phase, V-phase, and W-phase and three-phase windings of X-phase, Y-phase, and Z-phase, the stator winding 51 is configured as a six-phase winding, i.e., a combination of two sets of three-phase winding.

The stator core 52 is formed in an annular shape as layered steel plates made of a soft magnetic material, and is assembled to an inside of the stator winding 51 in the radial direction.

The stator winding 51 is a portion overlapping the stator core 52 in the axial direction, and includes a coil side portion 53 that is positioned at a radial outside of the stator core 52, and coil end portions 54 and 55 respectively extending from one end and another end of the core 52 in the axial direction. The coil side portion 53 faces both of the stator core 52 and the magnet portion 42 of the rotor 40 in the radial direction. In a state where the stator 50 is disposed inside the rotor 40, the coil end portion 54, which is the one on a bearing unit 20 side (i.e., on an upper side in the drawing) among the coil end portions 54, 55 on both ends in the axial direction is accommodated in the coil accommodation recess 47 that is formed by the rotor body 41. Details of the stator 50 are described later.

The inverter unit 60 has a unit base 61 fixed to the housing 30 by a fastener such as a bolt, and an electric component 62 assembled to the unit base 61. The unit base 61 has an end plate portion 63 fixed to an end of the housing 30 on an opening 33 side, and a casing portion 64 integrally provided on the end plate portion 63 and extending in the axial direction. The end plate portion 63 has a circular opening 65 at its central portion, and a casing portion 64 is formed to stand up from a periphery of the opening 65.

The stator 50 is attached to an outer peripheral surface of the casing portion 64. That is, the outer diameter of the casing portion 64 is equal to or slightly smaller than the inner diameter of the stator core 52. The stator core 52 is assembled to the outside of the casing portion 64, whereby the stator 50 and the unit base 61 are integrated. Further, when the unit base 61 is fixed to the housing 30, the stator 50 is integrated with the housing 30 in a state where the stator core 52 is assembled to the casing portion 64.

A radial inside of the casing portion 64 is a housing space for housing the electric component 62, and the electric component 62 is disposed in the housing space so as to surround the rotation shaft 11. The casing portion 64 has a role as a housing space forming portion. The electric component 62 includes a semiconductor module 66 constituting an inverter circuit, a control board 67, and a capacitor module 68.

Figure 6:
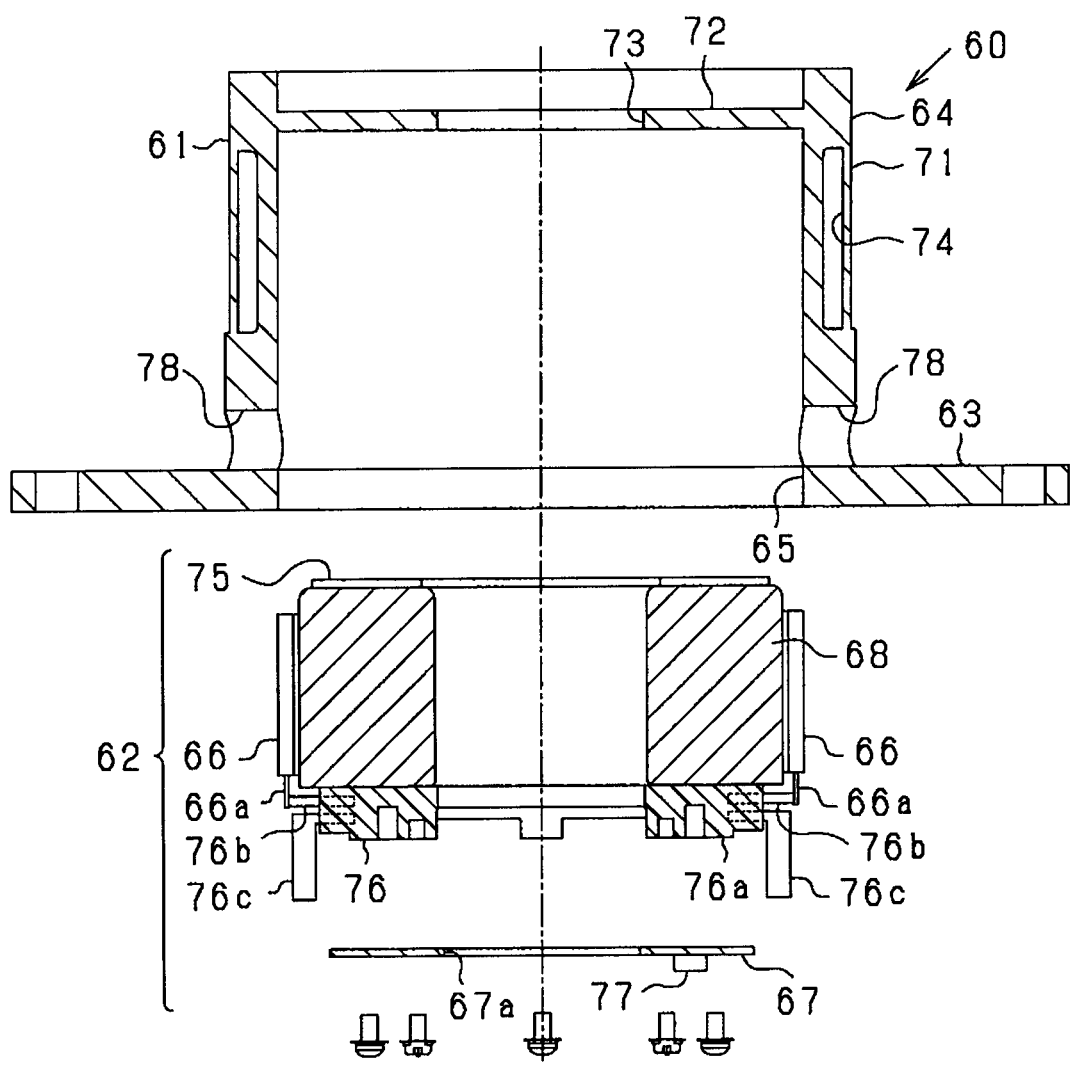
FIG. 6 is an exploded view of an inverter unit.

Here, the configuration of the inverter unit 60 is further described using FIG. 6, which is an exploded view of the inverter unit 60, further to FIGS. 1 to 5 described above.

In the unit base 61, the casing portion 64 has a cylindrical portion 71 and an end surface portion 72 provided on one of two axial end portions of the cylindrical portion 71 (i.e., an end portion on the bearing unit 20 side). The opposite side of the end surface portion 72 is entirely open through the opening 65 of the end plate portion 63. A circular hole 73 is formed at the center of the end surface portion 72, and the rotation shaft 11 can be inserted into the hole 73.

The cylindrical portion 71 of the casing portion 64 serves as a partition that separates the rotor 40 and the stator 50 disposed at the radial outside of the cylindrical portion 71 and the electric component 62 disposed at the radial inside thereof. The rotor 40 and the stator 50, and the electric component 62 are respectively disposed at radial inside and radial outside of the cylindrical portion 71, which interposes the two.

The electric component 62 is an electric component constituting an inverter circuit, and has (i) a powering function of rotating the rotor 40 by supplying electric current to each phase winding of the stator winding 51 in a predetermined order, and (ii) a power generation function by receiving an input of three-phase alternating current from the stator winding 51 according to the rotation of the rotation shaft 11 and outputting a generated power to other components outside of the component 62. The electric component 62 may have only one of the powering function and the power generating function. The power generation function may be, for example, a regeneration function that outputs a regenerative electric power to the outside when the rotating electric machine 10 is used as a vehicle power source (i.e., a source of thrust power for enabling a travel of a vehicle).

As a specific configuration of the electric component 62, a hollow cylindrical capacitor module 68 is provided around the rotation shaft 11, and a plurality of semiconductor modules 66 are circumferentially arranged side by side on an outer peripheral surface of the capacitor module 68. The capacitor module 68 includes a plurality of smoothing capacitors 68a connected in parallel with each other. More practically, the capacitor 68a is a laminated film capacitor formed by laminating a plurality of film capacitors, and has a trapezoidal cross section. The capacitor module 68 is configured as an arrangement of the twelve capacitors 68a in a ring shape.

In the manufacturing process of the capacitor 68a, a long film of a predetermined width formed by laminating a plurality of films is used, for example. A capacitor element is manufactured by cutting a long film into an equal leg trapezoidal shape such that the film width direction is taken as a trapezoidal height direction and the upper and lower bases of the trapezoid alternate along the longitudinal direction of the long film. Then, by attaching an electrode or the like to the capacitor element, the capacitor 68a is manufactured.

The semiconductor module 66 includes, for example, semiconductor switching elements such as MOSFETs and IGBTs, and is formed in a substantially plate-like shape. In the present embodiment, the rotating electric machine 10 includes two sets of three-phase windings, and an inverter circuit is provided for each of the three-phase windings. The electric component 62 has a total of 12 semiconductor modules 66.

The semiconductor module 66 is disposed in a bound manner, at a position between the cylindrical portion 71 of the casing portion 64 and the capacitor module 68. The outer peripheral surface of the semiconductor module 66 is in contact with the inner peripheral surface of the cylindrical portion 71, and the inner peripheral surface of the semiconductor module 66 is in contact with the outer peripheral surface of the capacitor module 68. In such a case, the heat generated in the semiconductor module 66 is transmitted to the end plate portion 63 via the casing portion 64 and is dissipated from the end plate portion 63.

A spacer 69 (see FIG. 4) may be disposed at a position between the semiconductor module 66 and the cylindrical portion 71 in the radial direction. In the capacitor module 68, the cross-sectional shape of the cross section orthogonal to the axial direction is a regular dodecagon, while the cross-sectional shape of the inner peripheral surface of the cylindrical portion 71 is circular, which defines the inner peripheral surface of the spacer 69 as a flat surface and defines the outer peripheral surface of the spacer 69 as a curved surface. The spacers 69 may be integrally provided to be continuous in an annular shape on the radial outside of each semiconductor module 66. Further, it may also be possible to make the cross-sectional shape of the inner peripheral surface of the cylindrical portion 71 into the same dodecagon as the capacitor module 68. In such a case, it is preferable that the inner and outer peripheral surfaces of the spacer 69 be flat.

In the present embodiment, a cooling water passage 74 for circulating cooling water is formed in the cylindrical portion 71 of the casing portion 64, and heat generated by the semiconductor module 66 is also dissipated to the cooling water flowing in the cooling water passage 74. That is, the casing portion 64 is provided with a water cooling mechanism. As shown in FIGS. 3 and 4, the cooling water passage 74 is annularly formed so as to surround the electric component 62 (i.e., the semiconductor module 66 and the capacitor module 68). The semiconductor module 66 is disposed along the inner peripheral surface of the cylindrical portion 71, and the cooling water passage 74 is provided at an adjacent position (i.e., side by side relative to) the semiconductor module 66 in the radial direction.

The stator 50 is disposed outside the cylindrical portion 71, and the electric component 62 is disposed inside the cylindrical portion 71. Therefore, heat of the stator 50 is transmitted to the cylindrical portion 71 from the outside, and heat of the semiconductor module 66 is transmitted to the cylindrical portion 71 from the inside. In such a case, the stator 50 and the semiconductor module 66 can be cooled simultaneously, and heat of the heat generating member of the rotating electric machine 10 can be efficiently dissipated.

The electric component 62 includes an insulating sheet 75 provided on one end surface of the capacitor module 68 in the axial direction and a wiring module 76 provided on the other end surface thereof (see FIG. 6). One of the two axial end surfaces of the capacitor module 68 (i.e., the end surface on the bearing unit 20 side) faces the end surface portion 72 of the casing portion 64, and is abutted to the end surface portion 72 with the insulating sheet 75 interposed therebetween. Also, the wiring module 76 is assembled to the other end surface (i.e., an end surface on an opening 65 side).

The wiring module 76 has a circular plate-like main body 76a made of synthetic resin, and has a plurality of bus bars 76b and 76c embedded therein for electrical connection with the semiconductor module 66 and/or the capacitor module 68. More practically, the semiconductor module 66 has a terminal 66a extending from an end face in the axial direction, and the terminal 66a is connected to the bus bar 76b at a radial outside of the main body 76a. The bus bar 76c extends on an outside in the radial direction of the main body 76a toward the opposite side to the capacitor module 68, and a tip of the bus bar 76c is connected to a wiring member 79 as shown in FIG. 2.

As described above, according to the configuration in which the insulating sheet 75 and the wiring module 76 are respectively provided on both axial ends of the capacitor module 68, a heat dissipation path for dissipating heat from the capacitor module 68 is formed as a path from the axial end faces of the capacitor module 68 to the end surface portion 72 and to the cylindrical portion 71. Thus, heat of the capacitor module 68 is dissipatable from the end face of the capacitor module 68 other than the outer peripheral surface on which the semiconductor module 66 is provided. That is, heat of the capacitor module 68 is dissipatable not only in the radial direction, but also in the axial direction.

The capacitor module 68 has a hollow cylindrical shape, and the rotation shaft 11 is disposed on the inner periphery thereof with a predetermined gap. Therefore, heat of the capacitor module 68 can also be dissipatable from its hollow portion. In such a case, the flow of air is generated by the rotation of the rotation shaft 11, which facilitates the cooling effect of the air.

A disk-shaped control board 67 is attached to the wiring module 76. The control board 67 has a printed circuit board (PCB) on which a predetermined wiring pattern is formed, and a controller 77 composed of various ICs, a microcomputer, and the like is mounted on the printed circuit board. The control board 67 is fixed to the wiring module 76 by a fastener such as a screw. The control board 67 has an insertion hole 67a at its central portion for inserting the rotation shaft 11.

Among the two axial ends of the wiring module 76, the control board 67 is provided on one end side opposite to the capacitor module 68, and the bus bars 76c of the wiring module 76 are configured to extend from one of two sides of the control board 67 to the other side. In such a configuration, the control board 67 may be provided with a notch for avoiding interference with the bus bar 76c. For example, it may be preferable that a part of an outer edge portion of the circular control board 67 is cut away.

Thus, the electric component 62 is accommodated in the space surrounded by the casing portion 64, and the housing 30, the rotor 40, and the stator 50 are arranged in layers on the outside thereof. According to the above configuration, electromagnetic noise generated in the inverter circuit is preferably shielded. In the inverter circuit, switching control of each semiconductor module 66 is performed using PWM control with a predetermined carrier frequency, and electromagnetic noise is considered to be generated by such switching control. However, the housing 30, the rotor 40, the stator 50 and the like positioned at the radial outside of the electric component 62 can effectively shield the electromagnetic noise.

At a proximity of the end plate portion 63 in the cylindrical portion 71, a through hole 78 for inserting the wiring member 79 for electrically connecting the stator 50 on the outside thereof and the electric component 62 on the inside thereof is formed. As shown in FIG. 2, the wiring member 79 is connected to an end portion of the stator winding 51 and to the bus bar 76c of the wiring module 76 by pressure bonding, welding or the like. The wiring member 79 may be, for example, a bus bar, and it is desirable that a joint surface thereof is made flat. The through holes 78 may be provided at one position or at plural positions. In the present embodiment, the through hole 78 is provided at two positions. In the configuration in which the through holes 78 are provided at two positions, it is possible to easily connect the winding terminals extending from two sets of three-phase windings respectively with the wiring member 79, which is preferable for making a multiphase connection.

In the housing 30, as shown in FIG. 4, the rotor 40 and the stator 50 are provided in order from the radial outside, and the inverter unit 60 is provided radial inside of the stator 50. Now, when the radius of the inner peripheral surface of the housing 30 is designated as d, the rotor 40 and the stator 50 are both disposed at a radial outside of the distance of d×0.705 from the rotation center. In such a case, by defining that a region inside of the inner peripheral surface of the stator 50, that is, the region radially inward from the inner peripheral surface of the stator core 52 is a first region X1, and a region from the inner peripheral surface of the stator 50 to the housing 30 is a second region X2, an area size of the horizontal cross section of the first region X1 is configured to be greater than an area size of the horizontal cross section of the second region X2. Further, a volume of the first region X1 is configured to be greater than a volume of the second region X2 within a range where the magnet portion 42 and the stator winding 51 of the rotor 40 overlap in the axial direction.

Note that, when the rotor 40 and the stator 50 are respectively considered as a magnetic circuit component, the first region X1 radial inside of the inner peripheral surface of the magnetic circuit component in the housing 30 is configured to have a greater volume than the second region X2 from radial inside of the inner peripheral surface of the magnetic circuit component to the housing 30 in the radial direction.

Next, the configurations of the rotor 40 and the stator 50 are described in more detail.

Generally, as a configuration of a stator in a rotating electric machine, it is known that a plurality of slots are provided circumferentially on a stator core made of layered steel plates and having an annular shape, and stator windings are wound into the slots. More practically, the stator core has a plurality of teeth radially extending at predetermined intervals from a yoke portion, and a slot is formed between two adjacent teeth in the circumferential direction. In the slot, for example, a plurality of layers of lead wires are accommodated in the radial direction, and the stator winding is configured by such lead wires.

However, in the above-described stator structure, when the stator winding is energized, magnetic saturation occurs at the teeth of the stator core as the magnetomotive force of the stator winding increases, which is then considered to cause restriction on the torque density of the rotating electric machine. That is, in the stator core, it is considered that magnetic saturation occurs when the rotating magnetic flux generated by energization of the stator winding is concentrated on the teeth.

Also, as a general configuration of an interior permanent magnet (IPM) rotor in a rotating electric machine, it is known that permanent magnets are disposed on a d-axis and a rotor core is disposed on a q-axis. In such a case, by exciting the stator winding at a proximity of the d-axis, an excitation magnetic flux flows from the stator to the q-axis of the rotor according to Fleming's law. Thus, it is considered that a wide range of magnetic saturation occurs in the q-axis core portion of the rotor.

Figure 7:
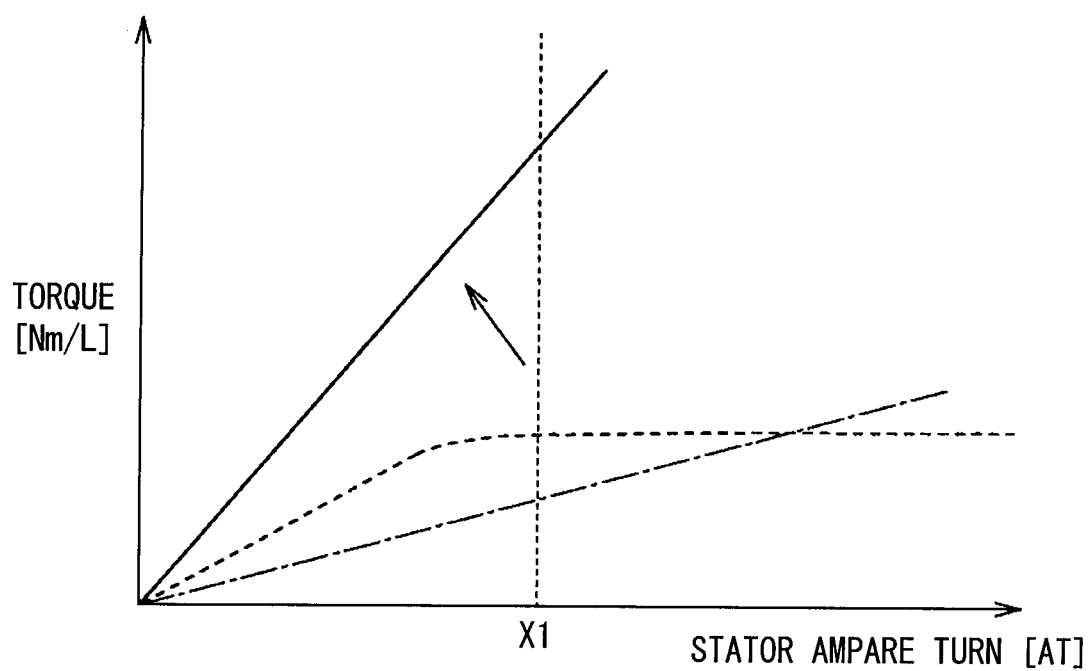
FIG. 7 is a torque diagram showing a relationship between an ampere-turn and a torque density of stator winding.

FIG. 7 is a torque diagram showing a relationship between an ampere turn [AT] indicating a magnetomotive force of a stator winding and a torque density [Nm/L]. The broken line shows the characteristics of a general IPM rotor type rotating electric machine. As shown in FIG. 7, in a general rotating electric machine, magnetic saturation occurs at two points, i.e., (i) at the teeth between the slots and (ii) the q-axis core, as the magnetomotive force increases in the stator, which causes restriction on the increase of the torque. Thus, in the general rotating electric machine, the ampere-turn design value is limited at a point X1.

Therefore, in the present embodiment, in order to eliminate the torque restriction resulting from magnetic saturation, the configuration described below is applied to the rotating electric machine 10. That is, as a first device, in order to eliminate magnetic saturation occurring in the stator core teeth in the stator, a slotless structure is adopted in the stator 50, and, in order to eliminate magnetic saturation occurring in the q-axis core portion of the IPM rotor, a surface permanent magnetic (SPM) rotor is adopted. According to the first device, it is possible to eliminate the above-described two points where the magnetic saturation occurs, with a trade-off of decrease of torque in the low current region (see the dashed-dotted line in FIG. 7). Therefore, as a second device, a pole anisotropic structure is adopted in which the magnetic path is extended in the magnet portion 42 of the rotor 40 to increase the magnetic force in order to overcome the torque decrease by strengthening the magnetic flux of the SPM rotor.

Further, as a third device, a flat wire structure in which the radial thickness of the wire is reduced in the coil side portion 53 of the stator winding 51 is adopted to compensate torque decrease. Here, it is conceivable that a greater eddy current may be generated in the opposing stator winding 51 due to the above-described pole anisotropic structure. However, according to the third device, it may be difficult for the eddy current generated in the stator winding 51, especially in the radial direction, because of the flat, i.e., thin, wire structure in the radial direction. As described above, according to the first to third configurations (i.e., first to third devices), as shown by the solid line in FIG. 7, a magnet having a high magnetic force is employed to provide a significant improvement in torque characteristics, while diminishing a concern of eddy current generation due to the high magnetic force magnet.

Further, as a fourth device, the magnet portion 42 is configured to have a magnetic flux density distribution close to a sine wave by utilizing a pole anisotropic structure. According to the above, it is possible (i) to strengthen the torque by increasing the sine wave matching rate based on pulse control or the like to be described later, and (ii) to further suppress the eddy current loss due to the gradual magnetic flux change as compared with the radial magnet.

Further, as a fifth device, the stator winding 51 has a strand conductor structure in which a plurality of strands are gathered together and twisted. According to the above, the fundamental wave component is collected to allow a large current to flow, and the eddy current generation is more effectively prevented than the third device of radially-flattened wire structure (i.e., flattening of a circumferentially-wide wire cross-section in the radial direction), due to the minimized cross-section area size of each of the strands.

Then, since the plurality of strands are twisted, it is possible to offset the eddy currents respectively generated by the magnetic flux of the right-handed screw law relative to the flow direction of the electric current in terms of the magnetomotive force from the conductor.

As described above, when the fourth device and the fifth device are further added, the torque strength is further improved, while suppressing the eddy current loss caused by the high magnetic force when using the high magnetic force magnet, which is the second device.

Hereinafter, the slotless structure of the stator 50, the flat wire structure of the stator winding 51, and the pole anisotropic structure of the magnet portion 42 are individually described.

Figure 8:
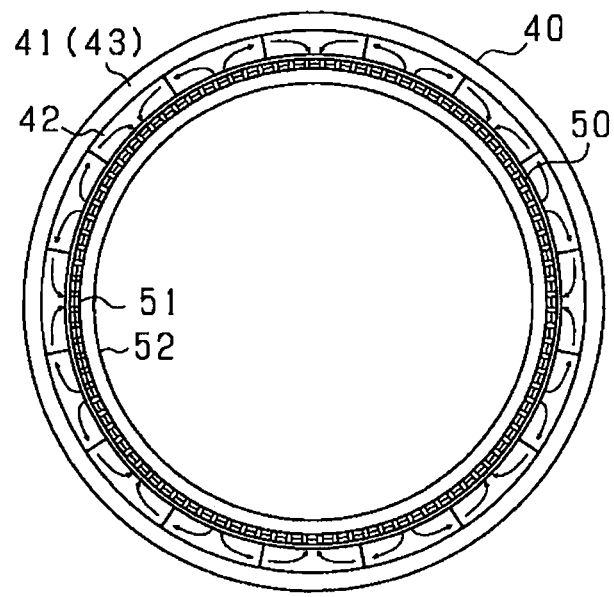
FIG. 8 is a horizontal cross-sectional view of a rotor and a stator.
Figure 9:
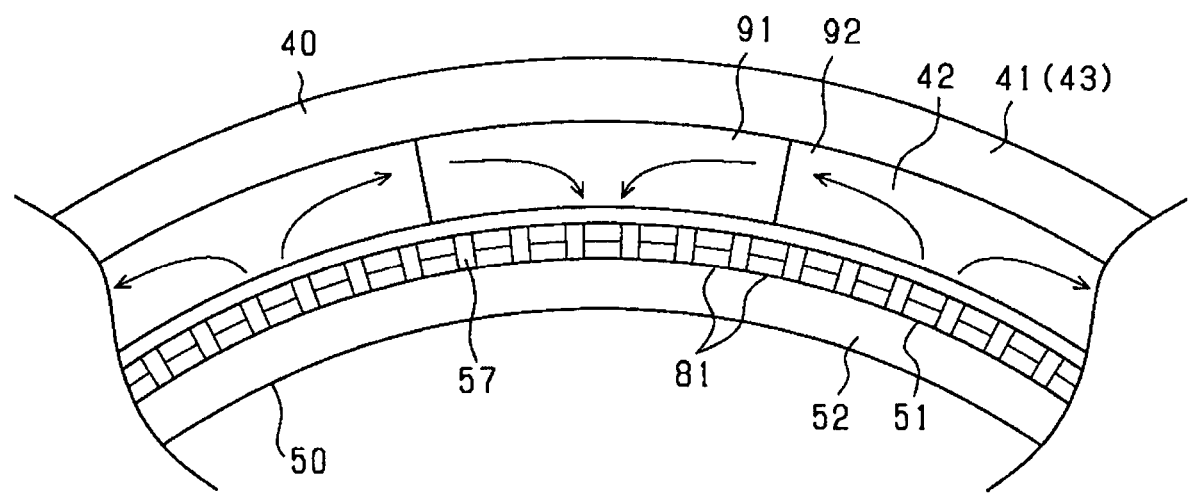
FIG. 9 is an enlarged view of a part of FIG. 8.
Figure 10:
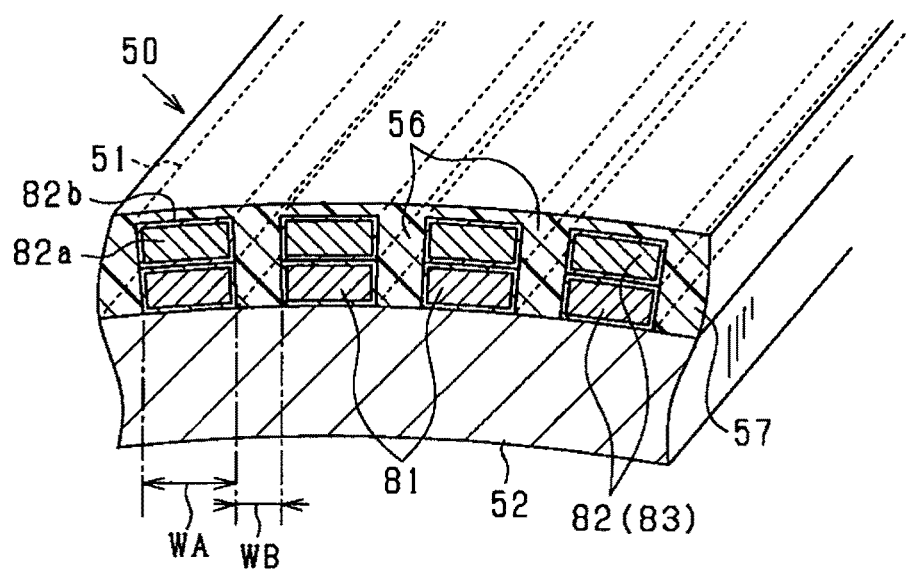
FIG. 10 is a horizontal cross-sectional view of the stator.
Figure 11:
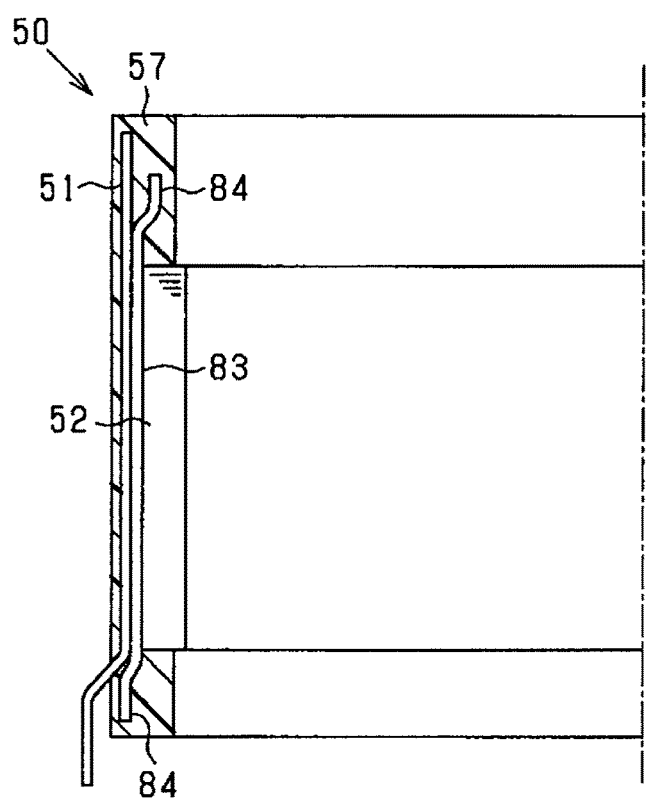
FIG. 11 is a vertical cross-sectional view of the stator.
Figure 12:
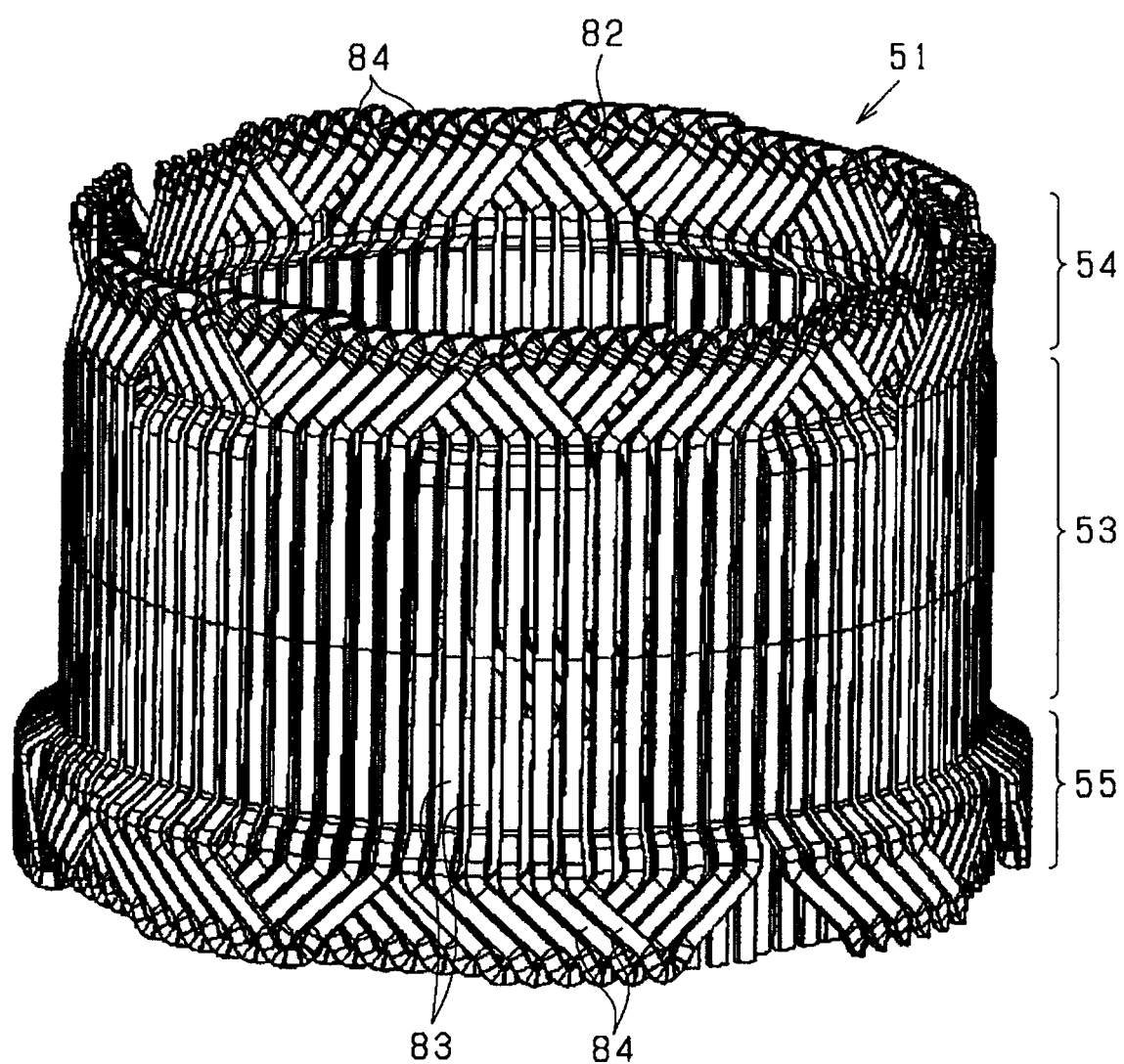
FIG. 12 is a perspective view of the stator winding.

First, the slotless structure and the flat wire structure are described. FIG. 8 is a horizontal cross-sectional view of the rotor 40 and the stator 50, and FIG. 9 is an enlarged view of a part of the rotor 40 and the stator 50 shown in FIG. 8. FIG. 10 is a horizontal cross-sectional view showing a horizontal cross-section of the stator 50, and FIG. 11 is a vertical cross-sectional view showing a vertical cross-section of the stator 50. FIG. 12 is a perspective view of the stator winding 51. In FIGS. 8 and 9, the magnetization direction of the magnet in the magnet portion 42 is indicated by an arrow.

As shown in FIGS. 8 to 11, the stator core 52 has a cylindrical shape in which a plurality of electromagnetic steel plates are stacked in the axial direction, and has a predetermined thickness in the radial direction. The wire 51 is to be assembled on the outside thereof. The outer peripheral surface of the stator core 52 is a wire installation portion. The outer peripheral surface of the stator core 52 is in the form of a curved surface without irregularities (i.e., without concave and convex), and a plurality of wire groups 81 are arranged in the circumferential direction on the outer peripheral surface.

The stator core 52 functions as a back yoke that is part of a magnetic circuit for rotating the rotor 40. In such a case, no teeth (i.e., iron cores) made of a soft magnetic material are provided between the wire groups 81 adjacent in the circumferential direction. That is, the stator core 52 has a slotless structure. In the present embodiment, the stator 50 is structured such that the resin material of a sealer 57 enters into a gap 56 between each of the wire groups 81. That is, speaking of the before sealing state regarding the sealer 57, the wire groups 81 are arranged at predetermined intervals in the circumferential direction on the radial outside of the stator core 52 with the gaps 56, which are, respectively, an inter-wire region. Thus, the slotless stator 50 is constructed as such.

By way of mentioning the slotless structure, a structure with teeth may be, for example, a plurality of teeth each disposed to have a predetermined circumferential width to interpose between the wire groups, which provides a certain magnetic path of magnetic material as a part of the magnetic circuit in between the wire groups. In this respect, the configuration in which the teeth are not provided between the wire groups 81 may be re-defined as a no magnetic circuit formation configuration, in other words.

As shown in FIGS. 10 and 11, the stator winding 51 is sealed by the sealer 57. In the horizontal cross section of FIG. 10, the sealer 57 is a synthetic resin material between the wire groups 81 that fills the gap 56. In such a configuration, an insulating member is interposing between the wire groups 81. In other words, the sealer 57 functions as an insulating member in the gap 56. The sealer 57 is disposed to have thickness dimension in a range that entirely covers the wire groups 81. That is, in other words, on the radial outside of the stator core 52, the thickness of the sealer 57 in the radial direction is greater than the thickness of the wire groups 81 in the radial direction.

Further, when viewed in the vertical cross section of FIG. 11, the sealer 57 is provided in a range that covers a turn portion 84 of the stator winding 51. On the radial inside of the stator winding 51, the sealer 57 is provided in a range that includes at least a part of upper and lower end surfaces of the stator core 52. In such a case, the stator winding 51 is resin-sealed substantially in its entirety except the connection terminal of each of the phase windings, i.e., except for the connection terminal to connect to the inverter circuit.

In the configuration in which the sealer 57 is provided in a range including the end surfaces of the stator core 52, the layered steel plate of the stator core 52 can be axially pressed inward (i.e., bound) by the sealer 57. Thereby, the stacked state of the layered steel plates is stably held by the sealer 57. In the present embodiment, the inner peripheral surface of the stator core 52 is not resin-sealed. However, instead of such a configuration, the entire stator core 52 including the inner peripheral surface of the stator core 52 may be configured as resin-sealed.

In a case where the rotating electric machine 10 is used as a vehicle power source, the sealer 57 may be made of a high heat resistant fluororesin, epoxy resin, PPS resin, PEEK resin, LCP resin, silicon resin, PAI resin, PI resin, or the like, preferably. Further, in view of the linear expansion coefficient from the viewpoint of suppression of cracking due to the difference of the expansion, the material of the sealer 57 is preferably the same material of an outer coating of the wire of the stator winding 51. That is, a silicone resin whose linear expansion coefficient is generally twice or more than that of other resins may be desirably excluded. In electric products such as electric vehicles which have no combustion engine, PPO resin, phenol resin, and FRP resin having heat resistance of about 180° C. may also be candidates for the material of the sealer 57. The above condition may not apply to an environment in which temperature of the surrounding of the rotating electric machine 10 is less than 100° C.

The torque of the rotating electric machine 10 is proportional to the "magnitude" or strength of the magnetic flux. Here, if the stator core has teeth, the maximum amount of magnetic flux at the stator is limited depending on the saturation flux density at the teeth. On the other hand, when the stator core 52 does not have teeth as shown in the present embodiment, the maximum amount of magnetic flux in the stator 50 is not limited. Therefore, such a configuration is advantageous in terms of increasing the electric current supplied to the stator winding 51 to increase the torque of the rotating electric machine 10.

Each group 81 of lead wires 82 on the radial outside of the stator core 52 is configured as an arrangement (i.e., stack) of a plurality of lead wires 82 with each wire 82 having a flat rectangular cross section. Each lead wire 82 is arranged in the drawing of the horizontal cross section in an orientation such that "radial dimension<circumferential dimension." Thereby, the radial thickness dimension of each wire group 81 is reduced. Further, while achieving thickness dimension reduction in the radial direction, a conductor region extends flatly (i.e., widthwise) to a teeth region where conventionally occupied by teeth, which may be designated as a flat wire region structure. Thereby, the increase of heat generation amount from the flattened wire (i.e., the decrease of the cross-section area size) is prevented by increasing the cross-section area size of the wire in the circumferential (i.e., widthwise) direction. Note that, even if a plurality of lead wires are arranged in the circumferential direction and connected in parallel, the same-as-above effects are achievable due to the same principle, although reduction of the cross-sectional area size occurs by the amount of the coating of each wire.

Provided as a slotless structure, the stator winding 51 in the present embodiment may be designed to have a greater region for the wire than a region for the gap therebetween. In the conventional vehicular electric rotating machine, it is naturally expected that the gap region ratio is equal to or less than 1, in terms of the circumferential region length of the stator winding.

On the other hand, in the present embodiment, the wire groups 81 are configurable as having a greater conductor region than the gap region, or the conductor region is at least equal to the gap region. Here, as shown in FIG. 10, when a lead wire region in which the lead wire 82 (i.e., a straight portion 83 described later) is disposed in the circumferential direction is designated as WA, and an inter-wire region between adjacent lead wires 82 is designated as WB, the lead wire region WA is greater in the circumferential direction than the inter-wire region WB.

The torque of the rotating electric machine 10 is approximately inversely proportional to the radial thickness of the wire group 81. In this respect, by reducing the thickness of the wire group 81 on the outside of the stator core 52 in the radial direction, such a configuration is advantageous in achieving an increase in torque of the rotating electric machine 10. The reason of the advantage is that the magnetic resistance is reducible by reducing the distance from the magnet portion 42 of the rotor 40 to the stator core 52, that is, the distance of non-iron portion. According to the above, it is possible to increase the linking flux of the stator core 52 by the permanent magnet, thereby strengthening the torque.

The lead wire 82 is a coated lead wire in which the surface of a conductor 82a is covered with an insulating film 82b, and insulation is secured between the lead wires 82 overlapping each other in the radial direction and between the lead wire 82 and the stator core 52, respectively. The thickness of the insulating film 82b is, for example, 80 μm, which is thicker than the film thickness (e.g., 20 to 40 μm) of commonly used lead wire. Thereby, even without inserting insulating paper or the like in between the lead wire 82 and the stator core 52, the insulation therebetween is guaranteed.

Further, each phase winding made of the lead wire 82 has insulation provided by the insulating film 82b except for the exposed portion for connection. The exposed portion is, for example, an input/output terminal portion or a neutral point portion in a star connection. In the wire group 81, the lead wires 82 adjacent to each other in the radial direction are adhered to each other by using a resin fixing or by the use of a self-adhesive coated wire. Thereby, dielectric breakdown due to rubbing between the lead wires 82 as well as vibration and/or noise are prevented.

Figure 13:
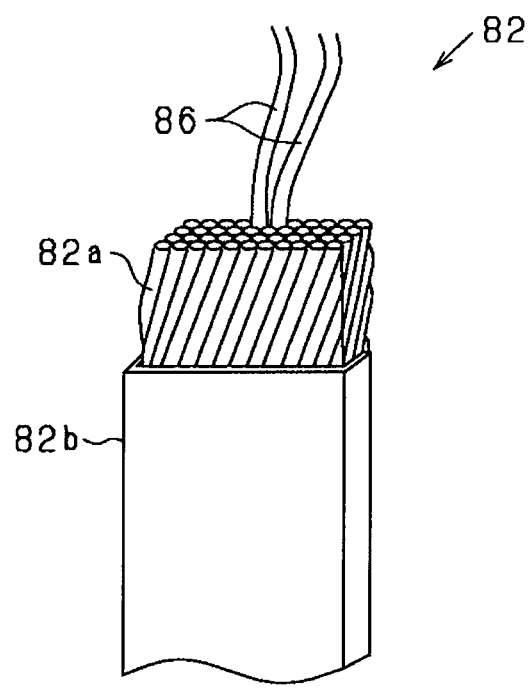
FIG. 13 is a perspective view showing a configuration of a lead wire.
Figure 14:
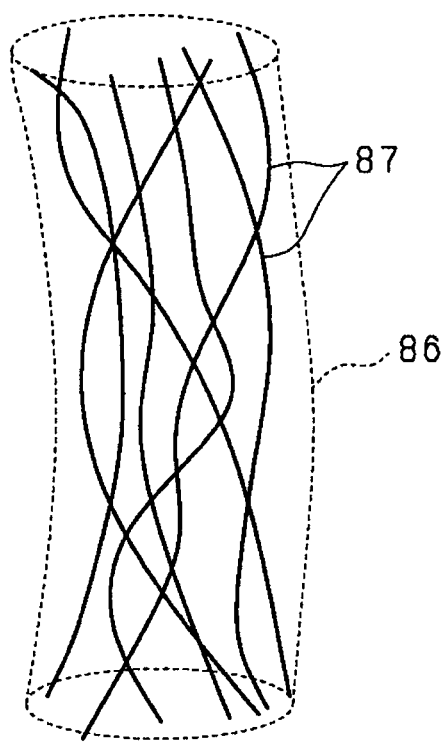
FIG. 14 is a schematic view showing a structure of strands.

In the present embodiment, the conductor 82a is provided as a collection of a plurality of strands 86. More practically, as shown in FIG. 13, the conductor 82a is formed in a twisted thread shape by twisting a plurality of strands 86. Further, as shown in FIG. 14, the strands 86 are provided as a composite obtained by bundling thin fibrous conductive materials 87. For example, the strand 86 may be a composite of CNT (i.e., carbon nanotube) fibers, and as the CNT fibers, fibers including boron-containing fine fibers in which at least a part of carbon is replaced with boron are used. As carbon-based fine fibers, vapor grown carbon fibers (VGCF) or the like may be used other than CNT fibers, but it may still be preferable to use CNT fibers. The surface of the strand 86 is covered with a polymer insulating layer such as enamel.

The conductor 82a is formed by twisting a plurality of strands 86. Therefore, generation of eddy current in each strand 86 is prevented, and eddy current in the conductor 82a is reducible. Further, since the strands 86 are twisted, different positions in one strand 86 receive mutually-reversely directed magnetic fields applied thereto, which causes mutually-reversed electromotive forces cancelling each other. Therefore, the eddy current is further reducible by such a structure. In particular, by forming the strands 86 with the fibrous conductive material 87, it makes it possible to significantly reduce the wire diameter and to significantly increase the number of twists, whereby the eddy current is more efficiently reducible.

As described above, the lead wire 82 has a flat rectangular shape in cross section, and is arranged in plurality in the radial direction. For example, a plurality of strands 86 are twisted to make a wire 82, and the synthetic resin forms a desired shape of the twisted strands 86.

Each lead wire 82 is bent so as to have a predetermined arrangement pattern in the circumferential direction, whereby a phase winding for each phase is formed as the stator winding 51. As shown in FIG. 12, in the stator winding 51, the coil side portions 53 are formed by the straight portions 83 linearly extending in the axial direction in each of the lead wires 82, and coil end portions 54, 55 are respectively formed by the protruding turn portion 84, which protrudes to both inward and outward radial directions on both ends of the coil end portions 53.

Each lead wire 82 is provided as a series of wave-like lead wires by alternately repeating the straight portions 83 and the turn portions 84. The straight portions 83 are disposed at positions facing the magnet portion 42 in the radial direction, and the in-phase (i.e., same phase) straight portions 83 arranged at predetermined intervals at positions axially outside the magnet portion 42 are connected to each other by the turn portions 84. The straight portion 83 is a magnet facing portion that radially faces the magnet portion 42.

In the present embodiment, the stator winding 51 is wound in an annular shape by distributed winding configuration. In such a case, the coil side portion 53 has, at a pitch corresponding to one pair of poles of the magnet portion 42, the straight portions 83 arranged in the circumferential direction for each phase, and the coil end portions 54 and 55 of the stator winding 51 are respectively connected to each other by the turn portions 84 formed in a substantially V-shape. A pair of the straight portions 83 corresponding to one pole pair have the electric current flowing in mutually reverse directions. Further, the combination of the pair of straight portions 83 connected by the turn portion 84 is different between one coil end portion 54 and the other coil end portion 55, and the repeated connections at the coil end portions 54, 55 in the circumferential direction make the stator winding 51 in a substantially cylindrical shape.

More practically, the stator winding 51 constitutes one phase winding by using two pairs of lead wires 82, and one of the three-phase windings (i.e., a U phase, a V phase, a W phase) and the other three-phase windings (i.e., an X phase, a Y phase, a Z phase) are provided in two layers, as a radial inside layer and a radial outside layer. In such a case, when representing the number of phases of the winding as S and the logarithm of the lead wires 82 as m, the number of wire groups 81 for each pole pair is calculated as 2×S×m=2Sm. In the present embodiment, since the number S of phases is 3, the logarithm m is 2, and the rotating electric machine 10 has 8 pole pairs (i.e., having 16 poles), the wire groups 81 by the number of 2×3×2×8=96 are circumferentially disposed.

In the stator winding 51 shown in FIG. 12, the coil side portion 53 has the straight portions 83 overlappingly layered as radial inner and outer layers, i.e., provided in two layers in the radial direction, and the coil end portions 54 and 55 respectively have the turn portions 84 extending reversely from the overlapping straight portions 83 in the circumferential direction, i.e., the turn portions 84 on one radius in the radial inner and outer, i.e., overlapping, layers extend in directions opposite to each other in the circumferential direction. That is, the conductive wires 82 adjacent in the radial direction respectively have the turn portions 84 that have opposite circumferential extending directions except for the coil end portions.

Figure 15A:
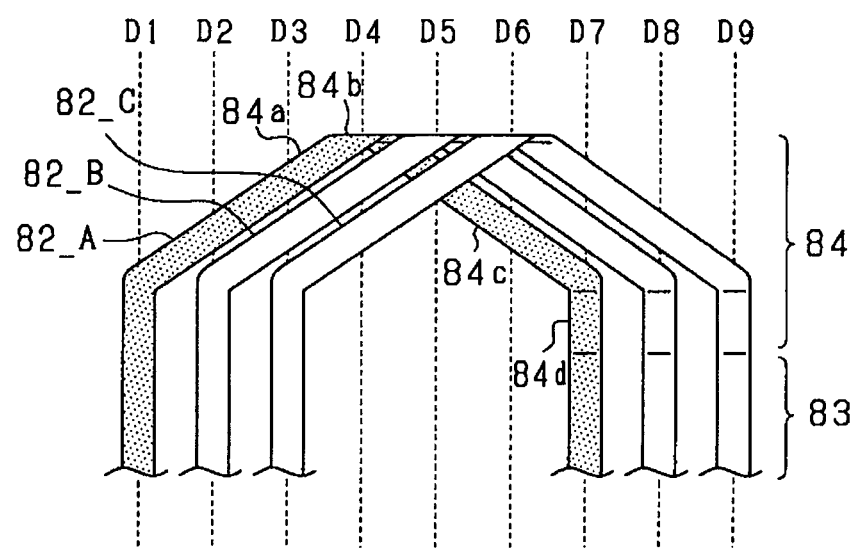
FIGS. 15A, 15B are respectively a view showing a form of each lead wire in an n-th layer.
Figure 15B:
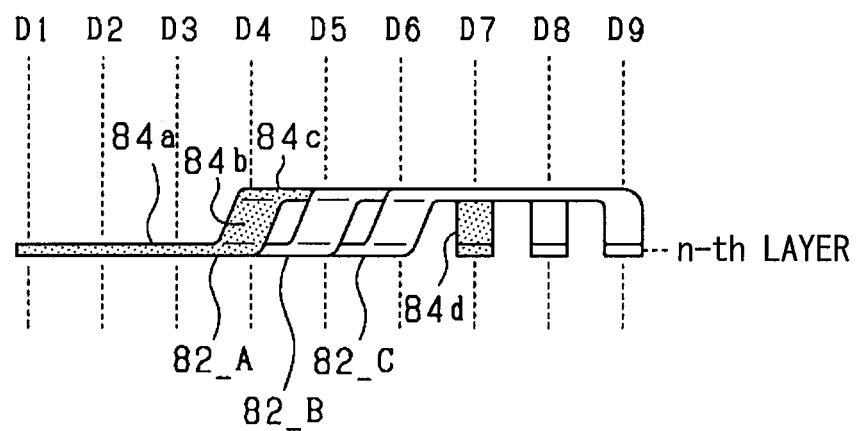

Here, the winding structure of the lead wire 82 in the stator winding 51 is specifically described. In the present embodiment, a plurality of lead wires 82 formed by wave winding are provided so as to be overlapped in a plurality of layers (for example, in two layers) inside and outside in the radial direction. FIGS. 15A/B are respectively a view showing the form of each lead wire 82 in the n-th layer, in which FIG. 15A shows a shape of the lead wire 82 viewed from the side of the stator winding 51 and FIG. 15B shows a shape of the lead wire 82 viewed from one side in the axial direction of the stator winding 51. In FIGS. 15A/B, the positions at which the wire groups 81 are disposed are indicated as D1, D2, D3 etc. Further, for convenience of description, only three lead wires 82 are shown, which are referred to as a first lead wire 82_A, a second lead wire 82_B, and a third lead wire 82_C.

In each of the lead wires 82_A to 82_C, the straight portions 83 are disposed at the n-th layer position, that is, at the same position (i.e., in the same layer) in the radial direction, and the straight portions 83 apart by 6 positions (i.e., 3×m pairs) are mutually connected by the turn portions 84. In other words, in each of the conductors 82_A to 82_C, every five straight portions 83 are connected to each other by the turn portions 84 on the same pitch circle (i.e., in the same layer) centered on the axis of the rotor 40. For example, in the first lead wire 82_A, a pair of straight portions 83 are disposed at positions D1 and D7, respectively, and such pair of straight portions 83 are connected by an inverted V-shaped turn portion 84. Further, the other lead wires 82_B and 82_C are arranged in the same n-th layer while shifting their circumferential positions one by one. In such a case, since all the lead wires 82_A to 82_C are disposed in the same layer, it is conceivable that the turn portions 84 of different wires 82 interfere with each other. Therefore, in the present embodiment, the turn portion 84 of each of the lead wires 82_A to 82_C has an interference avoidance portion which is a part of the turn portion 84 offset in the radial direction.

More practically, the turn portion 84 of each of the lead wires 82_A to 82_C has four parts, i.e., a slope 84a extending in the circumferential direction on the same pitch circle, a slope 84c extending in the circumferential direction on a different pitch circle from the slope 84a, an apex 84b bent inward (i.e., upward in FIG. 15B) to reach the slope 84c, and a swingback 84d. The apex 84b, the slope 84c, and the swingback 84d correspond to the interference avoidance portion. The slope 84c may be configured to be bent radial outward with respect to the slope 84a.

That is, the turn portion 84 of each of the lead wires 82_A to 82_C has one slope 84a and one slope 84c on both sides of the apex 84b which is the center position in the circumferential direction among the three. The radial positions of the slopes 84a and 84c are different from each other. The radial positions of the slopes 84a and 84c are positions in the front-rear direction of paper surface in FIG. 15A, and positions in the up-down directions in the drawing in FIG. 15B. For example, the turn portion 84 of the first lead wire 82_A extends along the circumferential direction starting from the position D1 of the n-th layer, is bent in the radial direction (e.g., to radial inward) at the apex 84b which is the circumferential center position in the turn portion 84, is bent again in the circumferential direction to extend along the circumferential direction again, and is bent in the radial direction (e.g., radial outward) at the swingback 84d to reach the position D9 of the n-th layer which is the end point of the turn portion 843.

According to the above configuration, in the lead wires 82_A to 82_C, slopes 84a are vertically arranged from the top to the bottom in order of the first lead wire 82_A→the second lead wire 82_B→the third lead wire 82_C, and the upper and lower portions of the lead wires 82_A to 82_C are interchanged at the apex 84b, and the other slopes 84c are arranged from the top to the bottom in order of the third lead wire 82_C→the second lead wire 82_B→the first lead wire 82_A. Therefore, the lead wires 82_A to 82_C are arrangeable in the circumferential direction without interfering with each other.

Here, in the configuration in which the plurality of lead wires 82 are overlappingly disposed in the radial direction to form one wire group 81, the turn portion 84 connected to a radial inside straight portion 83 positioned at the radial inside of the other straight portion 83 and the turn portion 84 connected to a radial outside (i.e., the other) straight portion 83 may preferably be positioned farther away from each other in the radial direction than the straight portions 83. Further, in case where the lead wires 82 of multiple layers are bent in the same radial direction at the end portions of the turn portion 84, i.e., at the proximity of a boundary between the turn portion 84 and the straight portion 83, the insulation of the adjacent lead wires 82 may preferably be kept unaffected by the interference between the lead wires 82 in the adjacent layers.

Figure 16:
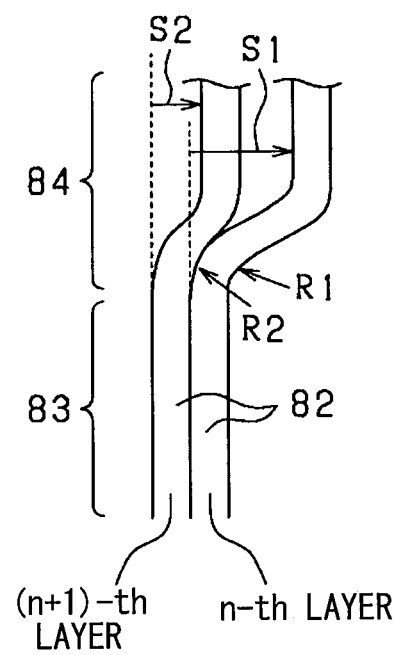
FIG. 16 is a side view showing lead wires in the n-th layer and an (n+1)-th layer.

For example, at the positions D7 to D9 of FIGS. 15A/B, the lead wires 82 overlapping in the radial direction are bent in the radial direction at the swingback 84d of the turn portion 84 respectively. In such a case, as shown in FIG. 16, the bending radius of the bent portion may be made different among the n-th layer lead wire 82 and the (n+1)-th layer lead wire 82. More practically, a bending radius R1 of the radially inner (i.e., n-th layer) lead wire 82 may be made smaller than a bending radius R2 of the radially outer (i.e., (n+1)-th layer) lead wire 82.

Further, it may be preferable to make the amount of shift in the radial direction different among the n-th layer lead wire 82 and the (n+1)-th layer lead wire 82. More practically, a shift amount S1 of the radially inner (i.e., n-th layer) lead wire 82 may be made greater than a shift amount S2 of the radially outer (i.e., (n+1)-th) lead wire 82.

According to the above configuration, even when the radially overlapping lead wires 82 are bent in the same direction, mutual interference of the wires 82 are appropriately avoidable. Thereby, good insulation of the lead wires 82 is obtainable.

Next, the structure of the magnet portion 42 in the rotor 40 is described. In the present embodiment, as a permanent magnet which comprises the magnet portion 42, a magnet at least of residual magnetic flux density Br=1.0 [T] and coercivity bHc=400 [kA/m] is assumed. Since 5000 to 10000 [AT] is applied by inter-phase excitation, if a permanent magnet of 25 [mm] is used with one pole pair, bHc=10000 [A], which means that the magnet is not demagnetized. Here, in the present embodiment, since the permanent magnet in which the axis of easy magnetization is controlled by orientation is used, the length of the magnetic circuit inside the magnet is made longer than the conventional magnet having linear orientation magnetic property which emits 1.0 T or more. That is, in other words, a desired magnetic circuit length per one pole pair is achievable with less amount of magnet, as well as the reversible demagnetization range of the magnet, even when exposed to severe high-temperature conditions, and is more stably maintainable as compared with the conventional design of the magnet using the linear orientation.

As shown in FIGS. 8 and 9, the magnet portion 42 has an annular shape, and is disposed at a position inside the rotor body 41, or more practically, at a radial inside position of the magnet holding portion 43. The magnet portion 42 has a first magnet 91 and a second magnet 92. The first magnet 91 and the second magnet 92 are respectively a polar anisotropic magnet, and the magnetic poles are different from each other. The first magnets 91 and the second magnets 92 are alternately arranged in the circumferential direction. The first magnet 91 is a magnet that is an N pole in the rotor 40, and the second magnet 92 is a magnet that is an S pole in the rotor 40. The first magnet 91 and the second magnet 92 are permanent magnets made of a rare earth magnet such as a neodymium magnet, for example.

Figure 17:
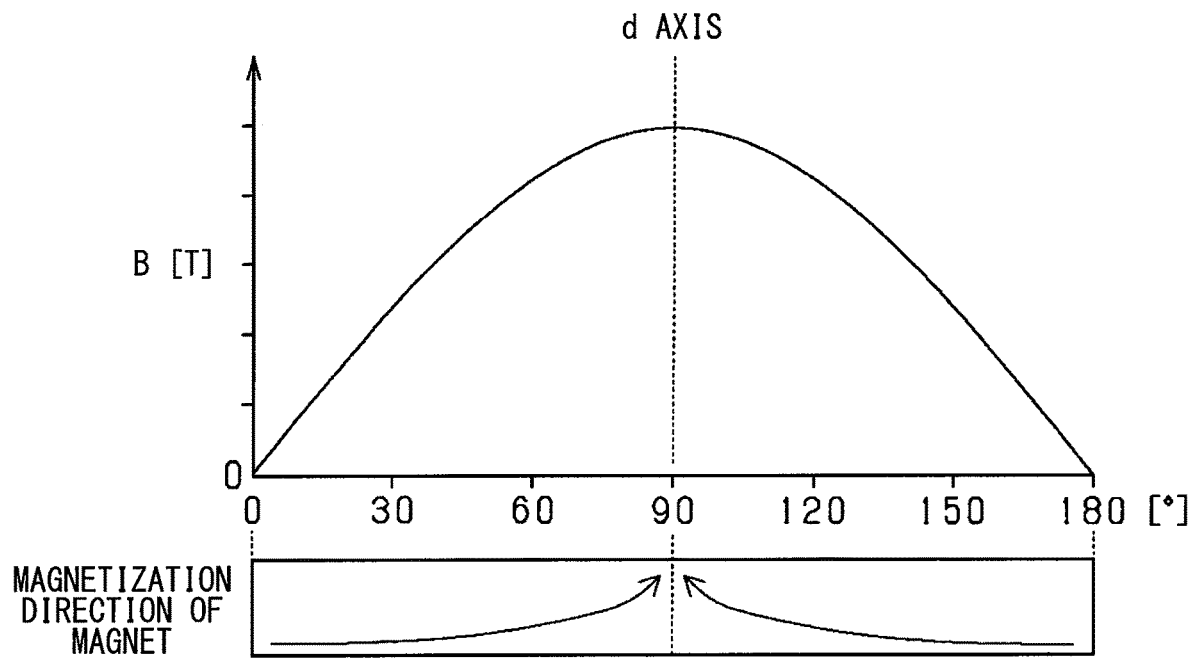
FIG. 17 is a diagram showing a relationship between an electric angle and a magnetic flux density for a magnet of an embodiment.
Figure 18:
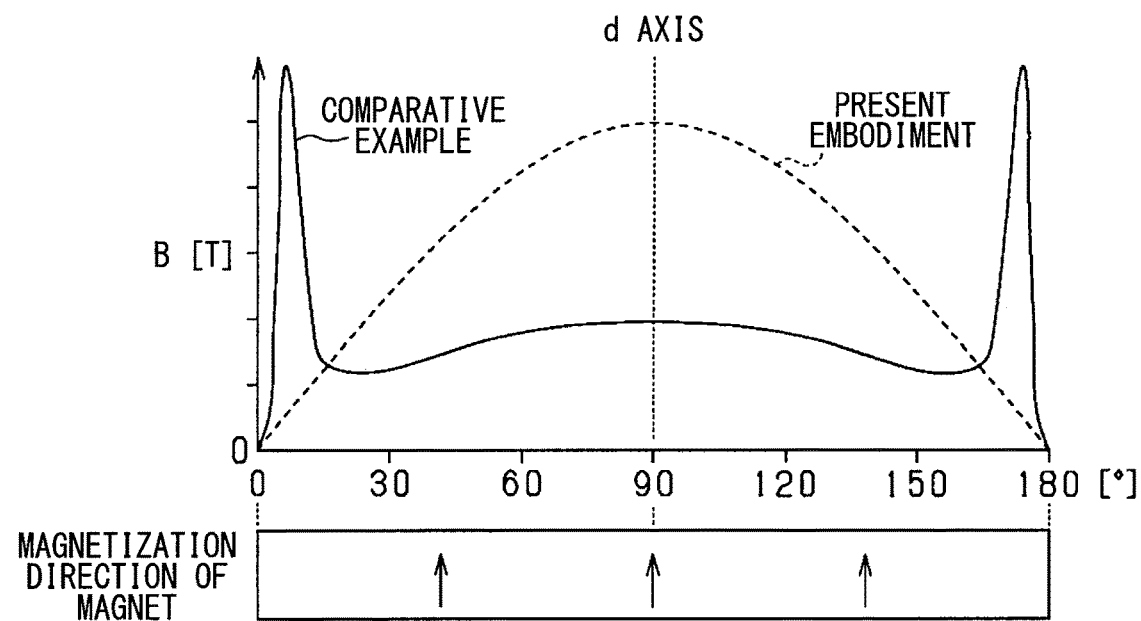
FIG. 18 is a diagram showing a relationship between the electric angle and the magnetic flux density for the magnet of a comparative example.

In each of the magnets 91 and 92, the magnetization direction extends in an arc shape between the d-axis at the magnetic pole center and the q-axis at the magnetic pole boundary. In each of the magnets 91 and 92, the magnetization direction is the radial direction on the d-axis side, and the magnetization direction is the circumferential direction on the q-axis side. In the magnet portion 42, since the magnetic flux flows like an arc between adjacent N and S poles by the magnets 91 and 92, the magnetic path in the magnet is longer than that of the radial anisotropic magnet, for example. Therefore, as shown in FIG. 17, the magnetic flux density distribution takes shape close to a sine wave. As a result, unlike the magnetic flux density distribution of the radial anisotropic magnet shown as a comparative example in FIG. 18, the magnetic flux is concentrated at the magnetic pole position, thereby strengthening the torque of the rotating electric machine 10. In FIG. 17 and FIG. 18, the horizontal axis shows an electric angle, and the vertical axis shows a magnetic flux density. Further, in FIG. 17 and FIG. 18, 90° on the horizontal axis indicates the d-axis (i.e., the pole center), and 0° and 180° on the horizontal axis respectively indicate the q-axis.

The sine wave matching rate of the magnetic flux density distribution may be configured, for example, to be 40% or more. In such way, the amount of magnetic flux in the central portion of the waveform can be reliably improved as compared to the case of using a radial orientation magnet or a parallel orientation magnet having a sine wave matching rate of about 30%. Further, if the sine wave matching rate is set to 60% or more, the amount of magnetic flux in the central portion of the waveform can be securely improved as compared with the magnetic flux concentration arrangement called Halbach array.

In the comparative example of FIG. 18, the magnetic flux density changes steeply near the q-axis. As the change in the magnetic flux density is steeper, the eddy current generated in the stator winding 51 is increased. On the other hand, in the present embodiment, the magnetic flux density distribution is close to a sine wave. Therefore, at a proximity of the q-axis, the change in magnetic flux density is smaller than the change in magnetic flux density of the radial anisotropic magnet. Thereby, the generation of the eddy current is preventable.

Note that, in the magnet portion 42, a magnetic flux is generated in the direction perpendicular to a magnetic pole surface at a proximity of the d-axis (i.e., at the pole center) of each magnet 91, 92, and the magnetic flux is carried away from the d-axis as the magnetic flux comes away from the magnetic pole surface, i.e., in an arc shape. Further, as the magnetic flux becomes orthogonal to the magnetic pole surface, the magnetic flux becomes stronger. Regarding such a point, in the rotating electric machine 10 of the present embodiment, since each wire group 81 is thinned in the radial direction as described above, the center position of the wire group 81 in the radial direction is brought closer to the magnetic pole surface of the magnet portion 42, thereby enabling the stator 50 to receive a stronger magnetic flux from the rotor 40.

Further, the stator 50 has a cylindrical stator core 52 provided on a radial inside of the stator winding 51, that is, on the opposite face of the stator winding 51 with respect to the rotor 40 facing face thereof. Therefore, the magnetic flux extending from the magnetic pole surfaces of the magnets 91 and 92 is attracted to the stator core 52, and makes a circular magnetic path while using the stator core 52 as a part of the magnetic path. In such a case, the direction and path of the magnet flux can be optimized.

Figure 19:
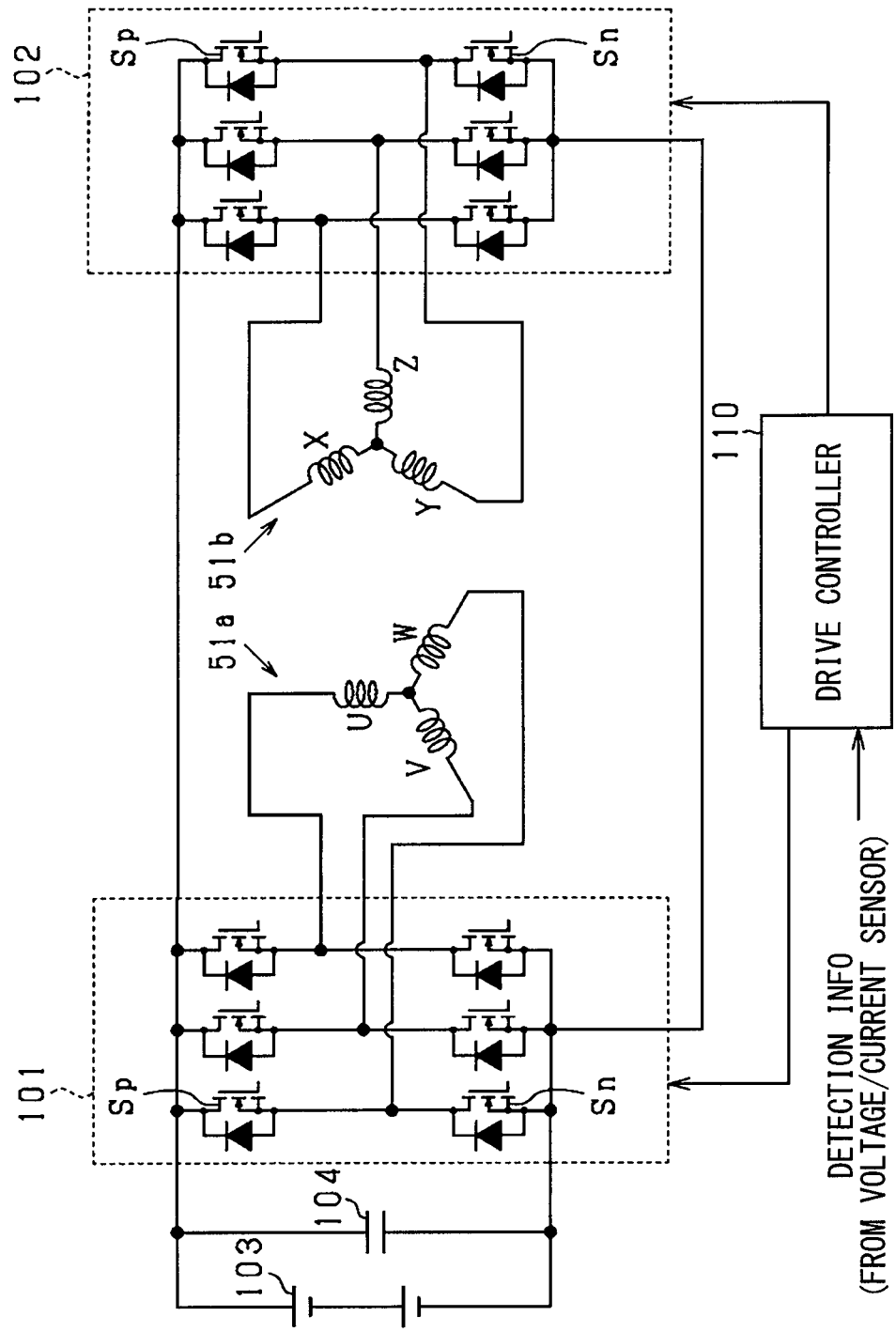
FIG. 19 is an electric circuit diagram of a control system of a rotating electric machine.
Figure 20:
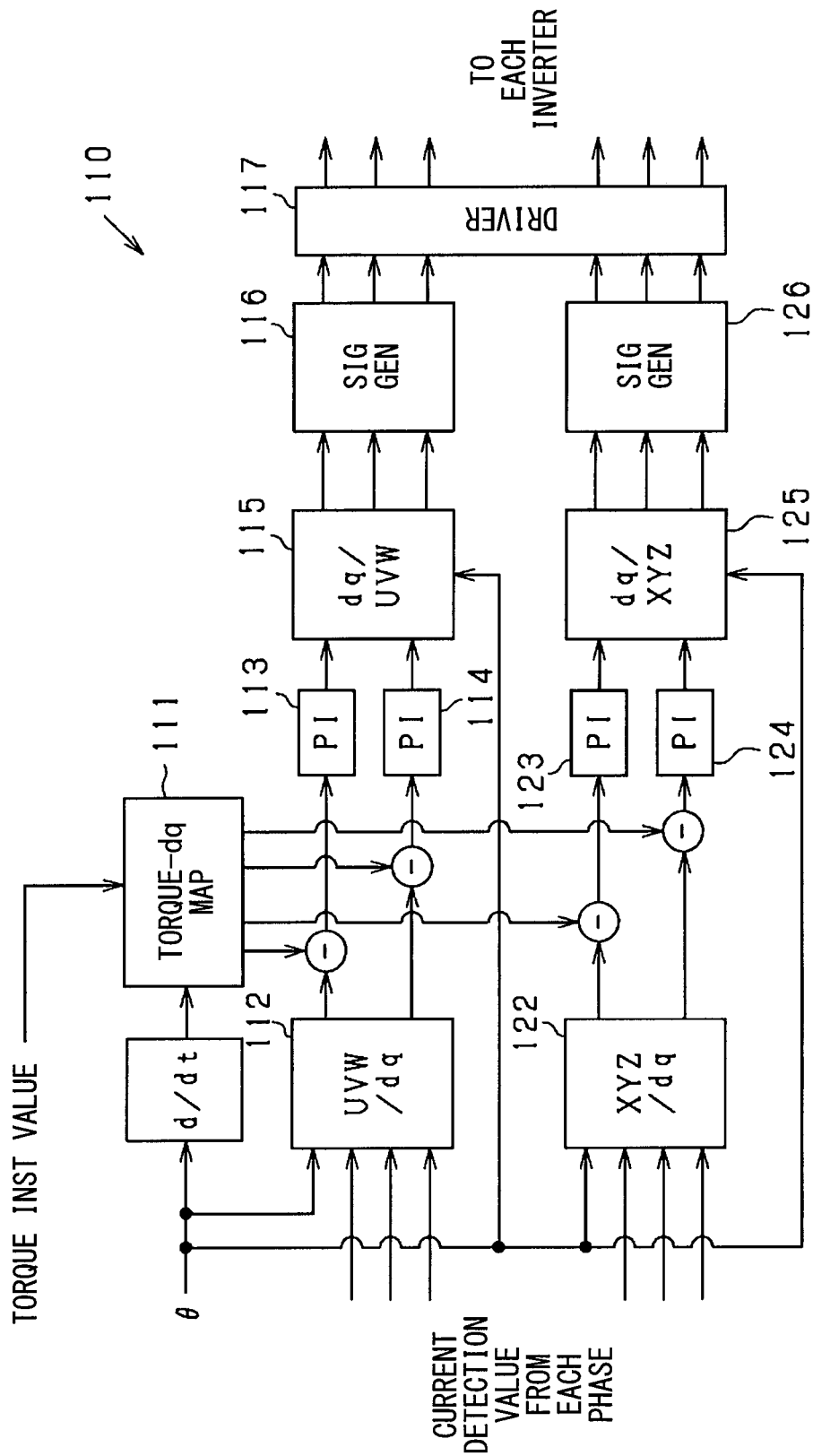
FIG. 20 is a functional block diagram showing a current feedback control process by a controller (161)
Figure 21:
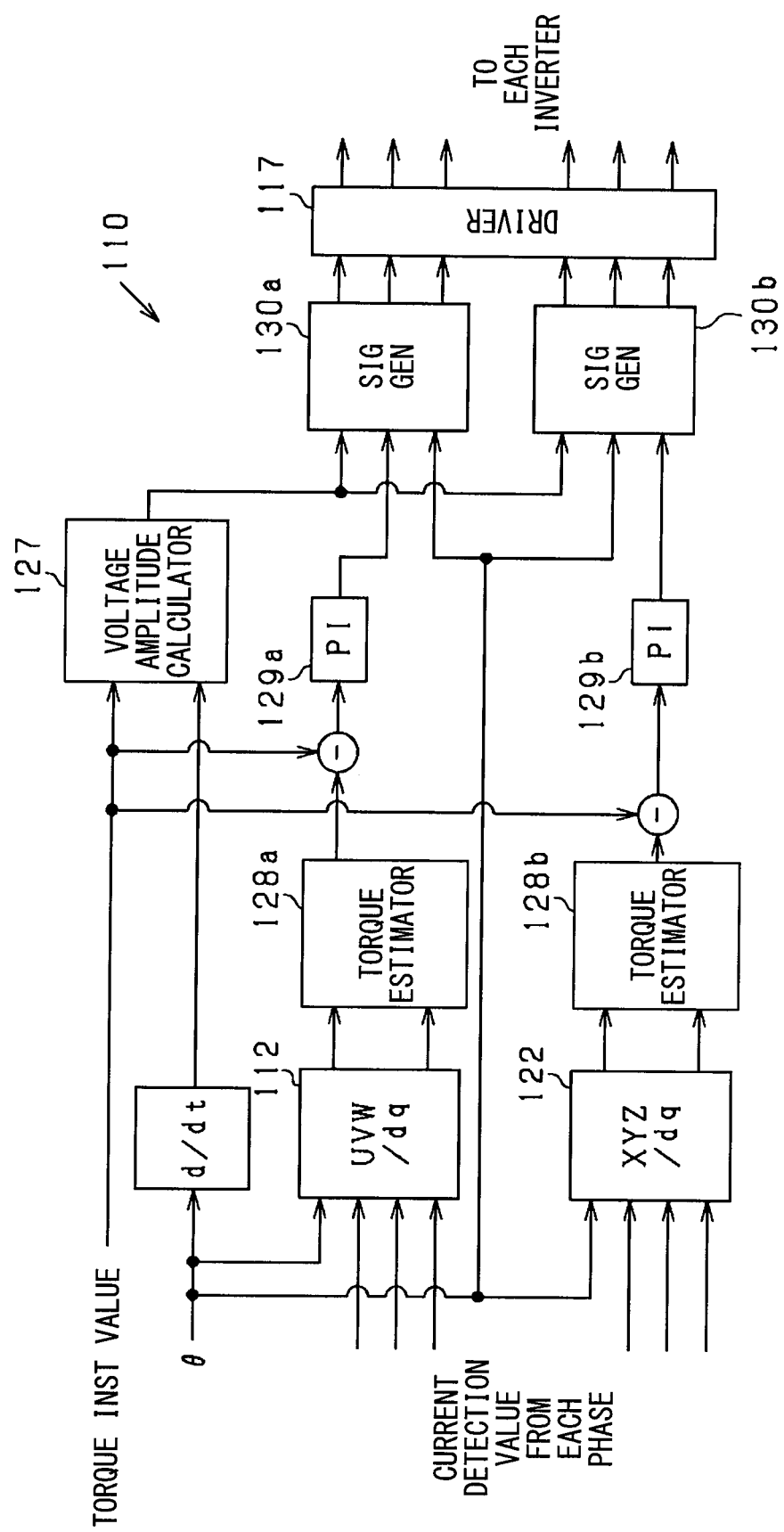
FIG. 21 is a functional block diagram showing a torque feedback control process by the controller (161)
Figure 22:
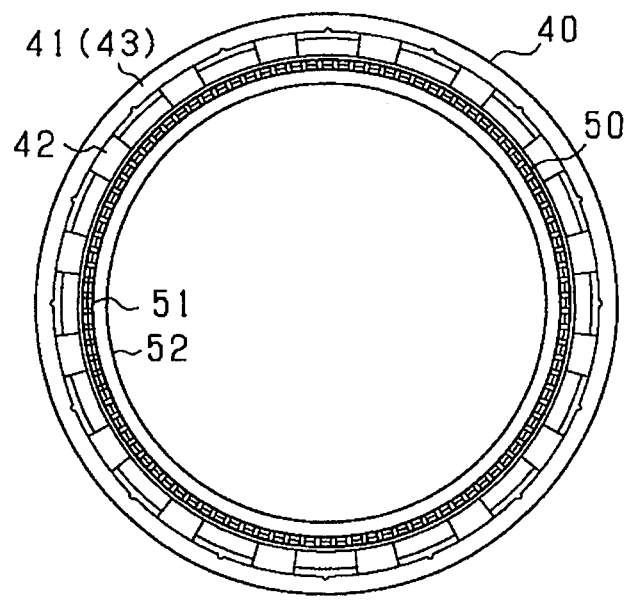
FIG. 22 is a cross-sectional view of the rotor and the stator in another example.
Figure 23:
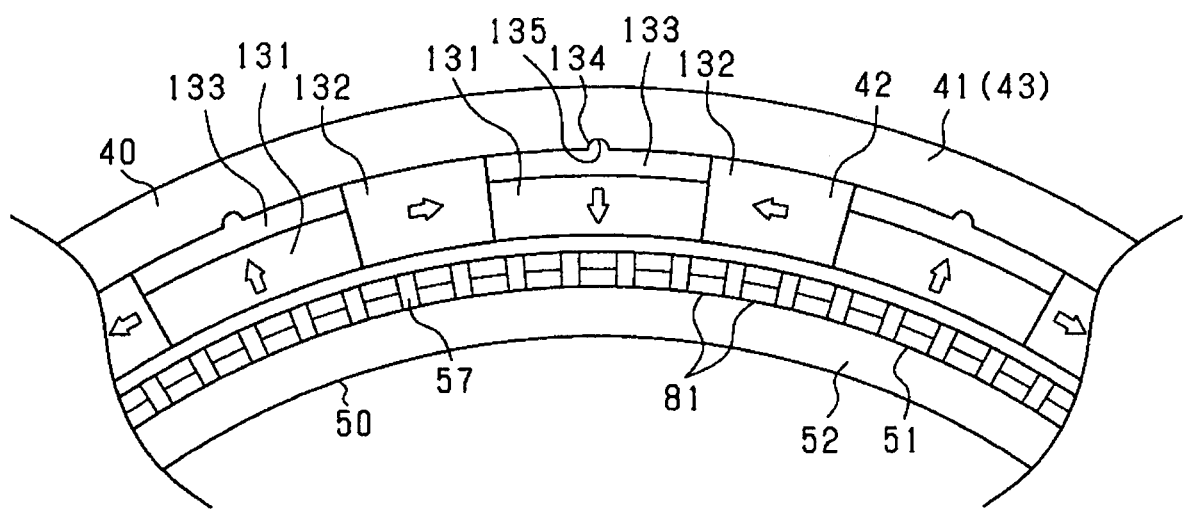
FIG. 23 is an enlarged view of a part of FIG. 22.

Next, the configuration of a control system that controls the rotating electric machine 10 is described. FIG. 19 is an electric circuit diagram of a control system of the rotating electric machine 10, and FIG. 20 is a functional block diagram showing a current feedback control process by a drive controller 110. FIG. 21 is a functional block diagram showing a torque feedback control process by the drive controller 110.

In FIG. 19, two sets of three-phase windings 51a and 51b are shown as the stator winding 51. The three-phase winding 51a includes a U-phase winding, a V-phase winding, and a W-phase winding. Three-phase winding 51b includes an X-phase winding, a Y-phase winding, and a Z-phase winding. A first inverter 101 and a second inverter 102 are provided for each of the three-phase windings 51a and 51b. The inverters 101 and 102 are respectively configured as a full bridge circuit having upper and lower arms equal in number to the number of phases of the phase windings, and the switches (i.e., semiconductor switching elements) provided on each arm are turned ON and OFF to adjust the supply of electric current in each phase winding.

A direct current (DC) power supply 103 and a smoothing capacitor 104 are connected in parallel to each of the inverters 101 and 102. The direct current power supply 103 is configured by, for example, a battery pack in which a plurality of unit cells are connected in series. Note that the switches of the inverters 101 and 102 correspond to the semiconductor module 66 shown in FIG. 1 and the like, and the capacitor 104 corresponds to the capacitor module 68 shown in FIG. 1 and the like.

The drive controller 110 includes a microcomputer including a CPU and various memories, and performs energization control by turning ON and OFF each switch in the inverters 101 and 102 based on various detection information in the rotating electric machine 10 and a request for driving (i.e., vehicle travel) and a request for power generation. The drive controller 110 corresponds to the controller 77 shown in FIG. 6. The detection information of the rotating electric machine 10 includes, for example, a rotation angle (i.e., electric angle information) of the rotor 40 detected by an angle detector such as a resolver, a power supply voltage (i.e., inverter input voltage) detected by a voltage sensor, and the electric current supplied to each phase detected by a current sensor. The drive controller 110 generates and outputs operation signals for operating the switches of the inverters 101 and 102. Note that the request for power generation is, for example, a request for regenerative drive when the rotating electric machine 10 is used as a vehicle power source (i.e., a source of thrust power for enabling a travel of a vehicle).

The first inverter 101 is provided with a series connection of an upper arm switch Sp and a lower arm switch Sn in three phases consisted by a U phase, a V phase and a W phase. A high potential side terminal of the upper arm switch Sp in each phase is connected to a positive terminal of the DC power supply 103, and a low potential side terminal of the lower arm switch Sn in each phase is connected to a negative terminal (i.e., ground) of the DC power supply 103. One end of each of the U-phase winding, the V-phase winding, and the W-phase winding is connected to an intermediate connection point between the upper arm switch Sp and the lower arm switch Sn of each phase. The respective phase windings are star-connected (i.e., Y-connected), and the other ends of the respective phase windings are connected to each other at a neutral point.

The second inverter 102 has a configuration similar to that of the first inverter 101, and includes a series connection of the upper arm switch Sp and the lower arm switch Sn in three phases consisting of X phase, Y phase and Z phase. A high potential side terminal of the upper arm switch Sp in each phase is connected to a positive terminal of the DC power supply 103, and a low potential side terminal of the lower arm switch Sn in each phase is connected to a negative terminal (i.e., ground) of the DC power supply 103. One end of each of an X-phase winding, a Y-phase winding, and a Z-phase winding is connected to an intermediate connection point between the upper arm switch Sp and the lower arm switch Sn of each phase. These respective phase windings are star-connected, or Y-connected, and the other ends of the respective phase windings are connected to each other at a neutral point.

FIG. 20 shows a current feedback control process for controlling each phase current of U, V and W phases, and a current feedback control process for controlling each phase current of X, Y and Z phases. Here, the control process of the U, V, and W phases is described first.

In FIG. 20, a current instruction value setter unit 111 sets a d-axis current instruction value and a q-axis current instruction value by using a torque-dq map, and based on a powering torque instruction value or a power generation torque instruction value for the rotating electric machine 10, or based on an electric angular velocity ω obtained by time differentiation of the electric angle θ. Note that the current instruction value setter unit 111 is shared among both of the U, V, W phase side and the X, Y, Z phase side. The power generation torque instruction value is, for example, a regenerative torque instruction value when the rotating electric machine 10 is used as a vehicle power source (i.e., a source of thrust power for enabling a travel of a vehicle).

A dq conversion unit 112 converts the current detection value (i.e., each phase current) detected by the current sensor provided for each phase to a d-axis current and a q-axis current which are components of an orthogonal two-dimensional rotational coordinate system with a magnetic field direction aligned with the d-axis.

A d-axis current feedback control unit 113 calculates a d-axis instruction voltage as an operation amount for feedback controlling the d-axis current to the d-axis current instruction value. A q-axis current feedback control unit 114 calculates a q-axis instruction voltage as an operation amount for feedback controlling the q-axis current to the q-axis current instruction value. Each of these feedback control units 113 and 114 calculates an instruction voltage using a proportional-integral (PI) feedback method based on a deviation of the d-axis current and the q-axis current from the current instruction value.

A three-phase conversion unit 115 converts the d-axis and q-axis instruction voltages into U-phase, V-phase, and W-phase instruction voltages. Note that each of the units 111 to 115 described above is a feedback control unit that performs feedback control of the fundamental wave current according to the dq conversion theory, and the instruction voltages of the U phase, the V phase and the W phase are feedback control values.

An operation signal generation unit 116 generates an operation signal of the first inverter 101 based on the three-phase instruction voltages using a known triangular wave carrier comparison method. More practically, the operation signal generation unit 116 generates a switch operation signal (i.e., a duty signal) for the upper and lower arms in each phase by PWM control based on a magnitude comparison between (i) a signal obtained by normalizing the three-phase instruction voltages with the power supply voltage and (ii) a carrier signal such as a triangular wave signal.

The same configuration is also applied to the X, Y, and Z phases side, and a dq conversion unit 122 converts the current detection value (i.e., each phase current) detected by the current sensor provided for each phase to an orthogonal two-dimensional rotational coordinate system with a magnetic field direction aligned with the d-axis.

A d-axis current feedback control unit 123 calculates the d-axis instruction voltage, and a q-axis current feedback control unit 124 calculates the q-axis instruction voltage. A three-phase conversion unit 125 converts the d-axis and q-axis instruction voltages into X-phase, Y-phase, and Z-phase instruction voltages. Then, an operation signal generation unit 126 generates an operation signal of the second inverter 102 based on the three-phase instruction voltages. More practically, the operation signal generation unit 126 generates a switch operation signal (i.e., a duty signal) for the upper and lower arms in each phase by PWM control based on a magnitude comparison between (i) a signal obtained by standardizing the three-phase instruction voltages with the power supply voltage and (ii) a carrier signal such as a triangular wave signal.

A driver 117 turns on/off the three-phase switches Sp and Sn in the inverters 101 and 102 based on the switch operation signals generated by the operation signal generation units 116 and 126.

Subsequently, a torque feedback control process is described. This process is mainly used for the purpose of increasing the output of the rotating electric machine 10 and reducing the loss under operating conditions in which the output voltage of each of the inverters 101 and 102 is increased, such as a high rotation area and a high output area. The drive controller 110 selects and performs one of a torque feedback control process and a current feedback control process based on the operating conditions of the rotating electric machine 10.

FIG. 21 shows a torque feedback control process corresponding to the U, V, and W phases, and a torque feedback control process corresponding to the X, Y, and Z phases. In FIG. 21, the same components as in FIG. 20 have the same reference numerals and descriptions thereof are omitted. Here, the control process of the U, V, and W phases is described first.

A voltage amplitude calculation unit 127 calculates, as an instruction value of the magnitude of a voltage vector, a voltage amplitude instruction, based on the powering torque instruction value or the power generation torque instruction value for the rotating electric machine 10 and the electric angular velocity ω obtained by time-differentiating the electric angle θ.

A torque estimation unit 128a calculates a torque estimation value corresponding to the U, V, and W phases based on the d-axis current and the q-axis current converted by the dq conversion unit 112. The torque estimation unit 128a may calculate the voltage amplitude instruction, based on map information in which the d-axis current, the q-axis current, and the voltage amplitude instruction are mutually associated.

A torque feedback control unit 129a calculates a voltage phase instruction that is an instruction value of the phase of the voltage vector, as an operation amount for feedback controlling the torque estimation value to the powering torque instruction value or to the power generation torque instruction value. The torque feedback control unit 129a calculates the voltage phase instruction using the PI feedback method based on the deviation of the torque estimation value from the powering torque instruction value or from the power generation torque instruction value.

An operation signal generation unit 130a generates an operation signal of the first inverter 101 based on the voltage amplitude instruction, the voltage phase instruction, and the electric angle θ. More practically, the operation signal generation unit 130a calculates a three-phase instruction voltage based on the voltage amplitude instruction, the voltage phase instruction, and the electric angle θ, and generates the switch operation signal of the upper and lower arms in each phase by PMW control based on a comparison of signal magnitude between (i) a signal obtained by normalizing the calculated three-phase instruction voltages with the power supply voltage and (ii) a carrier signal such as the triangular wave signal or the like.

Note that the operation signal generation unit 130a may generate the switch operation signal based on (a) pulse pattern information which is map information in which the voltage amplitude instruction, the voltage phase instruction, the electric angle θ and the switch operation signal are associatively related, (b) the voltage amplitude instruction, (c) the voltage phase instruction and (d) the electric angle θ.

Further, the X-, Y-, and Z-phase side basically have the same configuration, and a torque estimation unit 128b calculates torque estimation values corresponding to the X, Y, Z phases based on the d-axis current and the q-axis current respectively converted by the dq conversion unit 122.

A torque feedback control unit 129b calculates a voltage phase instruction that is an operation amount for feedback controlling the torque estimation value to the powering torque instruction value or to the power generation torque instruction value. The torque feedback control unit 129b calculates the voltage phase instruction using the PI feedback method based on the deviation of the torque estimation value from the powering torque instruction value or from the deviation of the torque estimation value from the power generation torque instruction value.

An operation signal generation unit 130b generates an operation signal of the second inverter 102 based on the voltage amplitude instruction, the voltage phase instruction, and the electric angle θ. More practically, the operation signal generation unit 130b calculates a three-phase instruction voltage based on the voltage amplitude instruction, the voltage phase instruction, and the electric angle θ, and generates the switch operation signal of the upper and lower arms in each phase by PWM control based on a comparison of signal magnitude between (i) the signal obtained by normalizing the calculated three-phase instruction voltages with the power supply voltage and (ii) the carrier signal such as the triangular wave signal. The driver 117 turns on/off the three-phase switches Sp and Sn in the inverters 101 and 102 based on the switch operation signals generated by the operation signal generation units 130a and 130b.

Note that the operation signal generation unit 130b may generate the switch operation signal based on (a) pulse pattern information which is map information in which the voltage amplitude instruction, the voltage phase instruction, the electric angle θ and the switch operation signal are associatively related, (b) the voltage amplitude instruction, (c) the voltage phase instruction and (d) the electric angle θ.

According to the rotating electric machine 10 configured as described above, the following excellent effects are achievable.

In the stator 50, teeth made of soft magnetic material are NOT provided between the straight portions 83 adjacent in the circumferential direction of the stator winding 51, that is, between the two adjacent magnet facing portions. According to such a configuration, the conductor cross-sectional area is increased by bringing the adjacent straight portions 83 closer to each other as compared with a teeth-provided configuration, in which a tooth is provided between the adjacent straight portions 83 thereby reducing the heat generation that occurs with the current supply to the stator winding 51. In a so-called slotless structure in which no teeth are provided between the straight portions 83, the absence of the teeth between the straight portions 83 makes it possible to eliminate magnetic saturation, thereby increasing an amount of current supply to the stator winding 51. In such a case, an increase of heat generation amount due to the increase of the current supply is appropriately handleable. Based on the above characteristics, the heat dissipation performance of the stator 50 is optimizable.

The stator core 52 is assembled to the stator winding 51, and such an assembly of the winding 51 and the core 52 is configured as having no tooth made of a soft magnetic material at a position between the two straight portions 83 adjacent in the circumferential direction. In such a case, the stator core 52 provided on the opposite side in the radial direction with respect to the rotor 40 functions as a back yoke of the stator winding 51, thereby enabling a formation of an appropriate magnetic circuit even if there is no tooth between the straight portions 83.

The stator winding 51 is sealed by the sealer 57, whereby an insulating member is provided between the straight portions 83 adjacent in the circumferential direction in the stator winding 51. Thereby, even if each straight portion 83 is positioned close to the next one in the circumferential direction, good insulation in the straight portion 83 is guaranteed.

Since the lead wire 82 is flattened in the stator winding 51 to reduce the radial thickness of the straight portion 83, the center position of the straight portion 83 in the radial direction is brought closer to the magnet portion 42 of the rotor 40. As a result, while suppressing the magnetic saturation in the stator 50 by adopting the slotless structure, the magnetic flux density in the straight portion 83 of the stator winding 51 is increased thereby increasing the torque of the rotating electric machine 10. Further, as described above, since the straight portions 83 adjacent to each other in the circumferential direction are brought closer to each other, the conductor cross-sectional area size is securely reservable even if the lead wire 82 is flattened.

Since each lead wire 82 of the stator winding 51 is an assembly of a plurality of strands 86, the electric current flow path in the lead wire 82 is made thinner. Thus, even if an eddy current is generated when the magnetic field from the magnet portion 42 links the lead wire 82, the eddy current suppression effect of the lead wire 82 for such eddy current is obtainable. As a result, the eddy current flowing in the lead wire 82 is reducible.

Further, since each wire 82 is formed by twisting the strands 86, different positions in each of the strands 86 receive mutually-reversely directed magnetic fields applied thereto, which causes mutually-reversed electromotive voltages caused by the linkage magnetic field cancelling each other. As a result, the reduction effect of the eddy current flowing in the lead wire 82 is improved.

Since each strand 86 is made of the fibrous conductive material 87, the current flow path in the lead wire 82 may further be reducible, and the number of twists of the current flow path may be further increasable. Thereby, the eddy current reduction effect is improvable. Further, the strand 86 may be comprised by the carbon nanotube fiber at least.

In the stator 50 having the slotless structure, the wire region WA is expandable in the circumferential direction compared to the inter-wire region WB, because room for the teeth are not required. Thereby, a wide wire region configuration in which the wire region WA is greater than the inter-wire region WB in the circumferential direction is appropriately realizable.

Since the turn portions 84 of the stator winding 51 are shifted in the radial direction and have the interference avoidance portion that avoids interference with other turn portions 84, the different turn portions 84 are radially separately arrangeable, i.e., away from each other in the radial direction. As a result, the heat dissipation characteristics of the turn portion 84 are improvable, thereby heat dissipation performance of the stator 50 is further improved.

As a configuration for avoiding mutual interference between the turn portions 84 of the respective lead wires 82 on the same pitch circle of the stator 50, the turn portion 84 has the slope 84a (i.e., a first part) where the turn portion 84 extends along the circumferential direction on the same pitch circle, the apex 84b extending from an "outer" slope 84a to an "inner" slope 84c on a radial inside, the slope 84c extending in the circumferential direction on the different pitch circle than the slope 84a, and the swingback 84d (i.e., a second part). Thereby, mutual interference between the turn portions 84 is appropriately avoided.

The turn portion 84 connected to the radially inner straight portion 83 and the turn portion 84 connected to the radially outer straight portion 83 are positioned further away from each other than the positions of the connected straight portions 83, the heat dissipation performance of the turn portions 84 is improved.

Since the bending radii of the bent portion in the turn portion 84 are different between the turn portion 84 connected to the radially inner straight portion 83 and the turn portion 84 connected to the radially outer straight portion 83, those turn portions 84 are appropriately spaced apart from each other.

In the turn portion 84, the shift amount of the bent portion from the straight portion 83 in the radial direction is made respectively different for the turn portion 84 connected to the radially inner straight portion 83 and for the turn portion 84 connected to the radially outer straight portion 83, thereby the respective turn portions 84 are appropriately spaced apart from each other.

Note that the pole anisotropic structure of the magnet portion 42 is not limited to the example described above. In an example shown in FIG. 22 and FIG. 23, a magnet arrangement called a Halbach Array is applied to the configuration of the magnet portion 42. The magnet portion 42 has a first magnet 131 whose magnetization direction (i.e., a direction of the magnetic pole) is aligned with the radial direction, and a second magnet 132 whose magnetization direction (i.e., a direction of the magnetic pole) is aligned with the circumferential direction. The first magnets 131 are disposed at predetermined intervals along the circumferential direction, and the second magnets 132 are disposed at positions between the adjacent first magnets 131 in the circumferential direction. The first magnet 131 and the second magnet 132 are permanent magnets made of a rare earth magnet such as a neodymium magnet, for example.

The first magnets 131 are spaced apart from each other in the circumferential direction such that poles on one side (i.e., a radially inner side) facing the stator 50 alternate, i.e., N poles and S poles. The second magnets 132 are arranged at adjacent positions adjacent to the respective first magnets 131 such that the magnetic pole directions in the circumferential direction alternate (i.e., clockwise direction and counter-clockwise direction).

A magnetic body 133 made of a soft magnetic material is disposed on a radial outside of the first magnet 131, that is, on a magnet holding portion 43 side of the rotor body 41. For example, the magnetic body 133 may be made of a magnetic steel sheet, a soft iron, or a dust core material. In such a case, a circumferential length of the magnetic body 133 is the same as a circumferential length of the first magnet 131, or, in particular, as the circumferential length of an outer peripheral portion of the first magnet 131. Further, the thickness of a composite of the first magnet 131 and the magnetic body 133 in the radial direction is the same as the thickness of the second magnet 132 in the radial direction. In other words, the thickness of the first magnet 131 in the radial direction is thinner than that of the second magnet 132 by an amount of the magnetic body 133. The magnets 131 and 132 and the magnetic body 133 are fixed to each other by an adhesive, for example. The radial outside of the first magnet 131 in the magnet portion 42 is the opposite side to (i.e., is facing away from) the stator 50. The magnetic body 133 is provided on one of two sides of the first magnet 131 in the radial direction, i.e., on the opposite side (i.e., on an anti-stator side) of the stator 50.

A key 134 is formed as a convex portion protruding radially outward on an outer peripheral portion of the magnetic body 133, that is, protruding toward the magnet holding portion 43 of the rotor body 41. Further, on an inner peripheral surface of the magnet holding portion 43, a key groove 135 is formed as a concave portion for receiving the key 134 of the magnetic body 133. The protruding shape of the key 134 and the groove shape of the key groove 135 are the same, and the number of the key grooves 135 is equal to the number of the keys 134 formed on the magnetic bodies 133.

The engagement of the key 134 and the key groove 135 prevents positional shift of the first magnet 131 and the second magnet 132 with respect to the rotor body 41 in the circumferential direction (i.e., rotation direction). Note that the key 134 and the key groove 135 (i.e., protrusions and recesses) may be arbitrarily provided on either of the magnet holding portion 43 or the magnetic body 133 of the rotor body 41. That is, as opposed to the above configuration, it may also be possible to provide the key groove 135 in the outer periphery portion of the magnetic body 133 and to provide the key 134 on the inner peripheral portion of the magnet holding portion 43 of the rotor body 41.

Here, the magnetic flux density in the first magnet 131 is increasable by alternately arranging the first magnet 131 and the second magnet 132 in the magnet portion 42. That is, in the magnet portion 42, the magnetic flux is concentrated and strengthened on one side, i.e., on a stator 50 facing side of the magnet portion 42.

Further, by disposing the magnetic body 133 on the radial outside of the first magnet 131, that is, on one side opposite to the stator 50, it contributes to a suppression of partial magnetic saturation on the radial outside of the first magnet 131, thereby, consequently, preventing the demagnetization of the first magnet 131 due to such magnetic saturation. As a result, the magnetic force of the magnet portion 42 is increasable. In other words, the magnet portion 42 has a configuration in which a portion of the first magnet 131 where demagnetization may easily occur is replaced with the magnetic body 133.

Figure 24A:
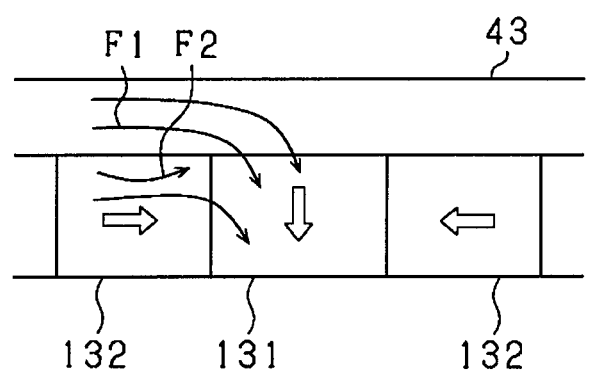
FIGS. 24A, 24B are respectively a view specifically showing a flow of magnetic flux in a magnet portion.
Figure 24B:
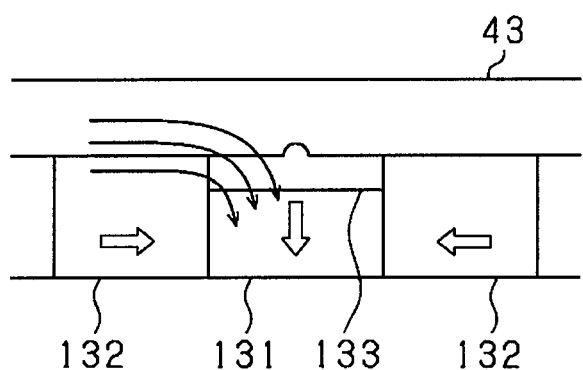

FIGS. 24A, 24B show a view specifically showing a flow of magnetic flux in the magnet portion 42, among which FIG. 24A shows the conventional configuration without the magnetic body 133 provided in the magnet portion 42, and FIG. 24B shows a configuration which has the magnetic body 133 provided in the magnet portion 42. Note that, in FIGS. 24A/B, the magnet holding portion 43 and the magnet portion 42 of the rotor body 41 are linearly expanded (i.e., "flattened for illustration purposes), and the lower side of the drawing corresponds to a stator side, and the upper side of the drawing corresponds to an away-from-stator side.

In the configuration of FIG. 24A, a magnetic pole surface of the first magnet 131 and a side surface of the second magnet 132 are in contact with the inner circumferential surface of the magnet holding portion 43, respectively. Further, a magnetic pole surface of the second magnet 132 is in contact with a side surface of the first magnet 131. In such a configuration, the magnet holding portion 43 may have a combined magnetic flux made of (a) a magnetic flux F1 flowing a path outside of the second magnet 132 and entering a contact surface with the first magnet 131, and (b) a magnetic flux flowing in parallel with the magnet holding portion 43 and drawing a magnetic flux F2 of the second magnet 132. Therefore, there is a concern that partial magnetic saturation may occur in the magnet holding portion 43, at a proximity of the contact surface between the first magnet 131 and the second magnet 132.

In contrast, the configuration of FIG. 24B allows the magnetic flux to pass through the magnetic body 133, by having the magnetic body 133 disposed at a position on an anti-stator side of the first magnet 131 and between the magnetic pole surface of the first magnet 131 and the inner circumferential surface of the magnet holding portion 43. Therefore, magnetic saturation in the magnet holding portion 43 is preventable, and resistant force to demagnetization is improved.

Further, the configuration of FIG. 24B, unlike the one in FIG. 24A, magnetic flux F2 that promotes magnetic saturation is eliminated. Thus, permanence of the entire magnetic circuit is effectively improvable. By devising such a configuration, the magnetic circuit characteristics is maintained (i.e., substantially kept unchanged) even under severe, high temperature conditions.

Further, compared to the radial magnet in the conventional SPM rotor, the magnetic path inside (i.e., passing through) the magnet is made longer. Therefore, the magnetic permeance is increasable, and the magnetic force is improved to increase the motor torque. Furthermore, the magnetic flux is concentrated at the center of the d-axis to increase the sine wave matching rate. In particular, the torque is more effectively strengthened by PWM control to make the waveform of the electric current in sine wave shape or in a trapezoidal wave shape, or by using a switching IC of a 120-degree power supply.

In the example described above, the outer peripheral surface of the stator core 52 has a curved surface without unevenness (i.e., convex/concave), and a plurality of the wire groups 81 are arranged side by side at predetermined intervals on the outer peripheral surface. However, such a configuration may be modified. For example, in an example of FIG. 25, the stator core 52 has (i) an annular yoke portion 141 provided on the opposite side of the stator winding 51 in the radial direction (i.e., on an anti-rotor side of the stator winding 51) (i.e., on a lower side of the drawing) and (ii) a protrusion 142 extending from the yoke portion 141 to protrude toward a gap between the straight portions 83 adjacent in the circumferential direction. The protrusions 142 are provided on the radial outside of the yoke portion 141, that is, on a rotor 40 side of the stator core 52 at predetermined intervals. The wire groups 81 of the stator winding 51 are engaged with the protrusions 142 in the circumferential direction, and are arranged side by side in the circumferential direction using the protrusions 142 as positioning parts.

The protrusion 142 has a thickness dimension in the radial direction from the yoke portion 141 made smaller than one half of radial thickness dimension of the straight portion 83 (i.e., dimension H1 in FIG. 25), i.e., one radially adjacent to the yoke portion 141 among the straight portions 83 in plural layers along the radial direction. Such a restriction on thickness of the protrusion 142 prevents the protrusions 142 to serve as teeth at positions between the wire groups 81 (i.e., the straight portions 83) adjacent in the circumferential direction, thereby not allowing the formation of the magnetic paths through the teeth. The protrusions 142 may be provided only at some of the positions between the wire groups 81 arranged in the circumferential direction, i.e., may be provided only at one position between at least one pair of wire groups 81 adjacent in the circumferential direction. The shape of the protrusion 142 may be any shape such as a rectangular shape or an arc shape.

Note that the straight portion 83 may be provided in a single layer on the outer peripheral surface of the stator core 52. Therefore, in a broad sense, the thickness dimension of the protrusion 142 in the radial direction from the yoke portion 141 may only be made smaller than one half of the thickness dimension of the straight portion 83 in the radial direction.

Assuming a circle centered on the axis of the rotation shaft 11 and passing through the radial center position of the straight portion 83 adjacent to the yoke portion 141 in the radial direction, the protrusion 142 may preferably be contained within the range of the virtual circle when protruding from the yoke portion 141. In other words, it may be preferable that the projection shape of the protrusion 142 protruding from the yoke portion 141 is provided as a shape which does not protrude to an outside of the virtual circle (i.e., not protruding to a rotor 40 side from the circle).

According to the configuration described above, the thickness of the protrusion 142 in the radial direction is limited, and the protrusion 142 does not function as a tooth between the adjacent straight portions 83 in the circumferential direction. As compared with the case in which teeth are positioned in between the adjacent straight portions 83, the adjacent straight portions 83 can be brought closer to each other in such a configuration. Thus, the cross-sectional area size of the conductor is increasable, and the amount of heat generated by the energization of the stator winding 51 is reducible. In such a configuration, the absence of teeth makes it possible to eliminate the magnetic saturation, and it is possible to increase the electric current supplied to the stator winding 51. In such a case, an increase of heat generation amount due to the increase of the current supply is appropriately handleable. Further, in the stator winding 51, since the turn portion 84 is bent in the radial direction and has an interference avoidance portion for avoiding interference with other turn portions 84, the different turn portions 84 are separated away from each other in the radial direction. Thereby, the heat dissipation characteristics are improvable also in the turn portion 84. Based on the above characteristics, the heat dissipation performance of the stator 50 is optimizable.

Figure 25:
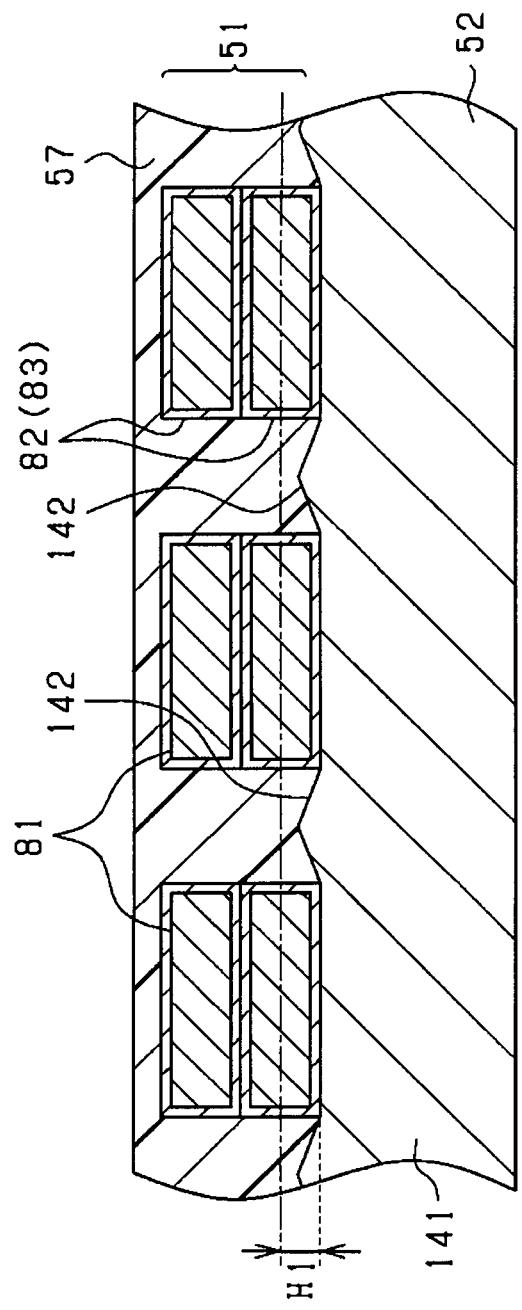
FIG. 25 is a cross-sectional view of the stator in yet another example.

Further, if the yoke portion 141 of the stator core 52 and the magnet portion 42 of the rotor 40 (i.e., each of the magnets 91 and 92) are separated by a predetermined distance or more, the thickness dimension of the protrusion 142 in the radial direction is not limited to the dimension H1 of FIG. 25. More practically, as long as the yoke portion 141 and the magnet portion 42 are separated by 2 mm or more, the thickness dimension of the projection 142 in the radial direction may be the dimension H1 in FIG. 25 or more. For example, when the thickness dimension in the radial direction of the straight portion 83 exceeds 2 mm, and the wire group 81 is constituted by the two layers of the lead wires 82 in the radial direction, the protrusion 142 may have a thickness dimension in a range up to one half position of the thickness of the lead wire 82 in the second layer from the yoke portion 141. In such a case, if the thickness dimension of the protrusion 142 in the radial direction is set as "H1×3/2," the above-described effects are at least achievable by increasing the cross-sectional area size of the conductor in the wire group 81.

Figure 26:
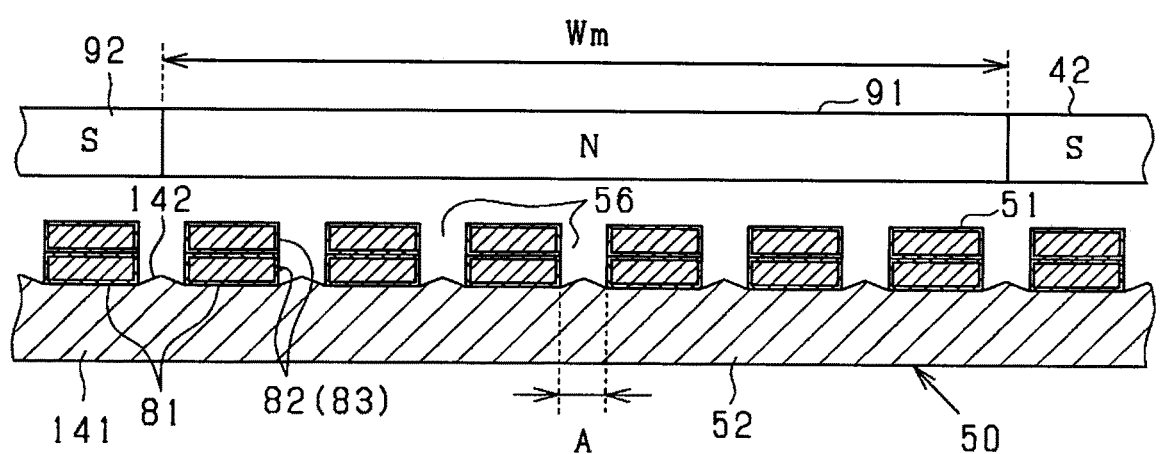
FIG. 26 is a cross-sectional view of the stator in still yet another example.

The stator core 52 may be configured as shown in FIG. 26. Note that, although the sealer 57 is omitted in FIG. 26, the sealer 57 may be provided. In FIG. 26, for the illustration purposes, the magnet portion 42 and the stator core 52 are shown in a linearly developed form.

In the configuration of FIG. 26, the stator 50 has a protrusion 142 as an inter-winding member between the circumferentially adjacent lead wires 82 (i.e., between the adjacent straight portions 83). Here, when Wt is set as the circumferential width dimension of the protrusion 142 excited by energization of the stator winding 51 within the range corresponding to one pole of the magnet portion 42, and Bs is set as the saturation magnetic flux density of the protrusion 142, Wm is set as the width dimension in the circumferential direction of one pole, and Br is set as the residual magnetic flux density of the magnet portion 42, the protrusion 142 is made of a magnetic material satisfying the following equation (1).

$$Wt \times Bs \leq Wm \times Br \qquad (1)$$

More practically, the three-phase winding of the stator winding 51 is a distribution winding, and the stator winding 51 has the number of the protrusions 142 corresponding to one pole of the magnet portion 42, i.e., the number of gaps 56 in between the wire groups 81, of "3×m." Further, m is a logarithm of the number of lead wires 82. In such a case, when each of the phases of the stator winding 51 is energized in a preset order, the protrusions 142 for two phases in one pole are excited. Therefore, the circumferential width dimension Wt of the protrusion 142 excited by the energization of the stator winding 51 in the range of one pole of the magnet portion 42 is "2×A×m" when A is set as the width dimension of the protrusion 142 (i.e., the gap 56) in the circumferential direction. Then, by defining the width dimension Wt in such a manner, the protrusion 142 in the stator core 52 is configured by using a magnetic material that satisfies the relationship of the above-described equation (1). Note that the width dimension Wt is a circumferential dimension of a portion where the relative permeability may possibly be greater than 1 within one pole.

When the stator winding 51 is provided as a concentration winding, the number of protrusions 142 in stator winding 51 with respect to one pole pair (i.e., two poles) of the magnet portion 42, that is, the number of gaps 56 in between the adjacent wire groups 81, is "3×m." In such a case, when each of the phases of the stator winding 51 is energized in a preset order, the protrusion 142 for one phase is excited within one pole. Therefore, the width dimension Wt in the circumferential direction of the protrusion 142 excited by energization of the stator winding 51 in the range of one pole of the magnet portion 42 is "A×m." Then, by defining the width dimension Wt in such manner, the protrusion 142 is configured by using a magnetic material that satisfies the relationship of the above-described equation (1).

Note that Bd=1.0 or stronger [T] for magnets with BH product of 20 [MGOe (kJ/m3)] or more, such as neodymium magnet, samarium cobalt magnet, ferrite magnet or the like, and Br=2.0 [T] or stronger for iron. Therefore, as a high output motor, the protrusion 142 in the stator core 52 may be made of a magnetic material that satisfies a relationship of Wt<½×Wm.

Figure 27:
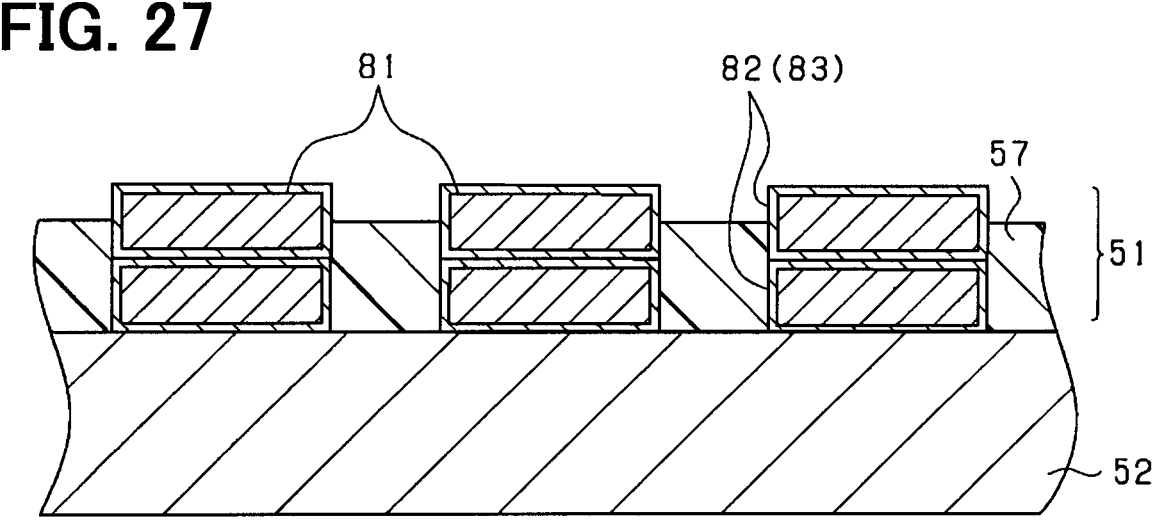
FIG. 27 is a cross-sectional view of the stator in still yet another example.

In the example described above, the sealer 57 covering the stator winding 51 is disposed in a thickness range of including all the wire groups 81 on the radial outside of the stator core 52, that is, the thickness dimension of the sealer 57 in the radial direction is configured as a range of greater than the thickness dimension of each wire group 81 in the radial direction. However, such a configuration may be changed. For example, as shown in FIG. 27, the sealer 57 may be made thinner so that a part of the lead wire 82 protrudes or is exposed therefrom. More practically, the sealer 57 may be provided in a state in which a radially outer part of the most radially outer lead wire 82 in the wire group 81 is exposed on a stator 50 side. In such a case, the thickness dimension of the sealer 57 in the radial direction may be the same as or smaller than the thickness dimension of each wire group 81 in the radial direction.

Figure 28:
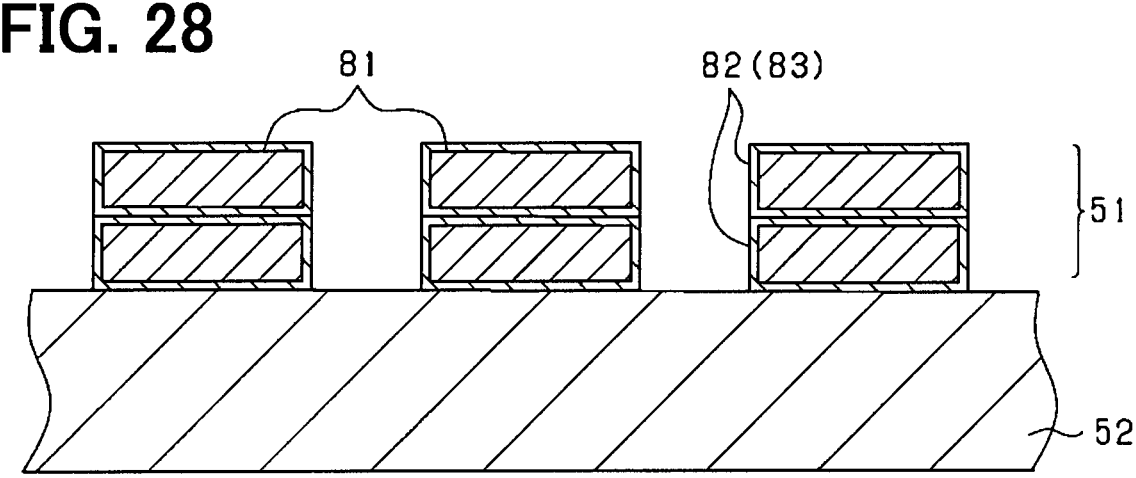
FIG. 28 is a cross-sectional view of the stator in still yet another example.

Further, as shown in FIG. 28, each wire group 81 may be not sealed by the sealer 57. That is, the sealer 57 covering the stator winding 51 may be omitted. In such a case, gaps between the circumferentially arranged wire groups 81 are provided as void.

Figure 29:
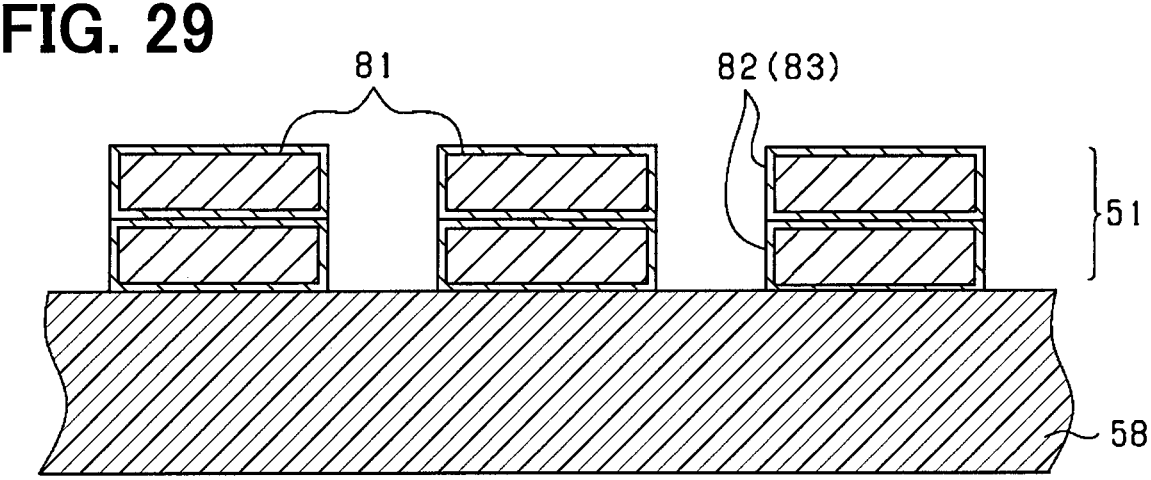
FIG. 29 is a cross-sectional view of the stator in still yet another example.

The stator 50 may have no stator core 52. In such a case, the stator 50 is configured by (i.e., provided as) the stator winding 51 shown in FIG. 12 In the stator 50 not having the stator core 52, the stator winding 51 may be sealed with a sealing member. Alternatively, instead of using the stator core 52 made of a magnetic material, the stator 50 may be configured to include an annular winding holder 58 made of a non-magnetic material such as a synthetic resin as shown in FIG. 29. Further, non-magnetic teeth may be provided integrally with the winding holder 58 using the same material, or the above-described sealer 57 may be provided integrally with the winding holder 58. The winding holder 58 corresponds to a winding holder that holds the stator winding 51.

Figure 30A:
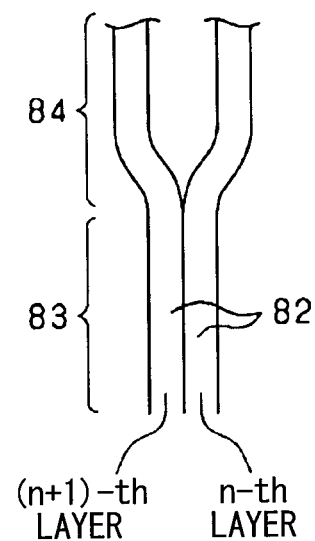
FIGS. 30A, 30B are respectively a side view showing each lead wire in the n-th layer and the (n+1)-th layer in still yet another example.

As a configuration for avoiding interference between the lead wires 82 overlapping in and out in the radial direction of the (i.e., one) wire group 81 of the stator winding 51, as shown in FIG. 30A, the turn portions 84 in the n-th layer and the (n+1)-th layer may be bent in mutually-opposite directions (i.e., radial outward direction and radial inward direction). That is, the turn portions 84 connected to the straight portions 83 of the plurality of layers and at "radially overlapping" positions (i.e., positions on one radius and inward and outward in the radial direction) may be bent in different directions in the radial direction. In such manner, the turn portions 84 can also be appropriately spaced apart from each other. Further, it is preferable to apply this structure to the part with the severest insulation, or to use for the last layer and a start layer among multiple layers.

Figure 30B:
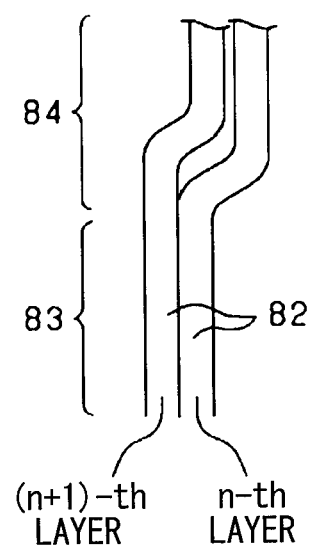

Alternatively, as shown in FIG. 30B, wire bent positions may be made different in the axial direction (i.e., positions in the vertical direction in the drawing) in the n-th layer and in the (n+1)-th layer. In such a case, mutual interference is preventable even if the bending radius at the turn portion 84 of two layers is the same.

In the example described above, the stator winding 51 has the straight portions 83 at positions on the same pitch circle centered on the rotation shaft 11 connected by the turn portion 84, with each of the turn portions 84 provided with the interference avoidance portion. However, such a configuration may be changed. For example, the stator winding 51 may have the straight portions 83 at positions on different pitch circles centered on the rotation shaft 11, that is, in different layers, and may be connected by the turn portions 84. In any case, as long as the turn portion 84 has an interference avoidance portion which is radially shifted and avoids interference with other turn portions 84, such a configuration is usable.

Figure 31A:
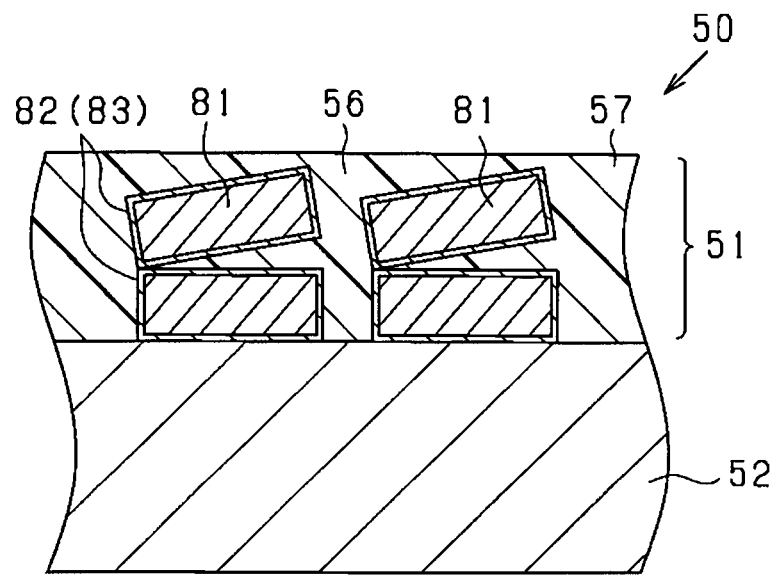
FIGS. 31A, 31B are respectively a cross-sectional view of the stator in still yet another example.

As shown in FIG. 31A, the wire group 81 of the stator winding 51 may have the straight portions 83 of the respective lead wires 82 arranged to have non-parallel pair of facing surfaces in the radial direction (i.e., a vertical direction in the drawing). Note that, in FIG. 31A, the wire groups 81 are sealed by the sealer 57. According to the above configuration, the sealing material as a non-heat generating portion is interposable between the adjacent straight portions 83 aligned in the radial direction, and heat generated by the straight portion 83 is dissipatable through the non-heat generating portion when the stator winding 51 is energized. Thereby, the heat dissipation performance in the wire group 81 is improvable.

Further, even if teeth are not interposed between the straight portions 83 adjacent in the circumferential direction, the sealing material is preferably inserted between the straight portions 83 of the respective wire groups 81, and thus each of the straight portions 83 is appropriately fixable. However, the configuration of FIG. 31A may be modified, and the configuration may have no sealing portion (i.e., the configuration may have no sealer 57). In such a case, an air gap as a non-heat generating portion may be interposed between the straight portions 83 aligned in the radial direction, and the heat radiation performance of the wire group 81 is also improvable.

Figure 31B:
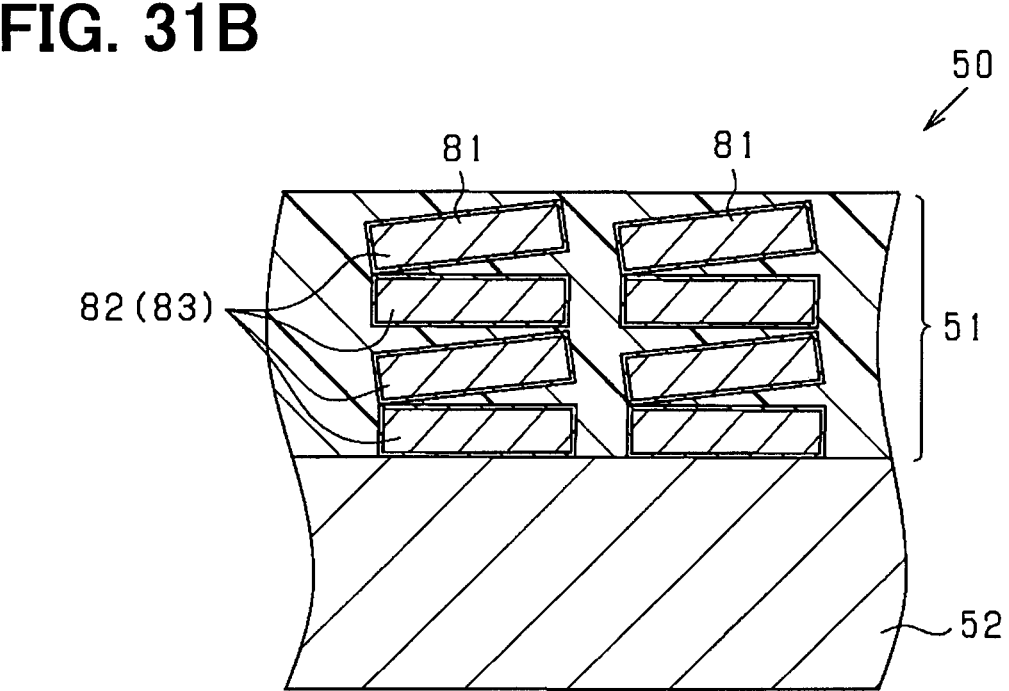

As shown in FIG. 31B, in the wire group 81 of the stator 50, the straight portions 83 of the respective lead wires 82 may be arranged in four layers in the radial direction, and the gap dimension between the pair of opposing surfaces is large and small, i.e., is changed, in the circumferential direction, and the larger gap sides (i.e., an open side of two adjacent lead wires 82) may alternate right and left in the radial direction. Note that, in FIG. 31B, the wire groups 81 are sealed by the sealer 57. The number of layers of the straight portion 83 may be three or more. According to the above configuration, heat is appropriately dissipatable from the respective straight portions 83 arranged in the radial direction.

Further, even when the rotation direction of the rotating electric machine 10 is reversed again and again at the time of operation of the rotating electric machine 10 (i.e., the rotating electric machine 10 is rotated back and forth), the holding power for holding the straight portions 83 is favorably obtainable.

The stator winding 51 may have the straight portion 83 of the lead wire 82 provided in a single layer in the radial direction. Further, when arranging the straight portion 83 in multiple layers inside and outside in the radial direction, the number of layers may be arbitrary, i.e., may be three, four, five, six, or the like.

In the examples described above, the rotation shaft 11 is provided to protrude in both directions, i.e., protrudes from one end of the shaft 11 of the rotating electric machine 10 and also protrudes from the other end of the shaft 11 of the rotating electric machine 10. However, the rotation shaft 11 may protrude from one end side only. In such a case, the rotation shaft 11 may preferably protrude from one axial end that is supported by the bearing unit 20, i.e., from a cantilever support side of the shaft 11. In the configuration of the present embodiment, since the rotation shaft 11 does not protrude into an inside of the inverter unit 60, the internal space of the inverter unit 60, i.e., the internal space of the cylindrical portion 71 more practically, can be used more widely.

As a structure of rotatably supporting the rotation shaft 11, the structure may have bearings at two positions, i.e., at one end of the shaft 11 and at the other end of the shaft 11 of the rotor 40, for example. In such a case, in the configuration of FIG. 1, bearings may be provided at two positions on one side and on the other side of the inverter unit 60 in the radial direction.

In the example described above, the middle portion 45 of the rotor body 41 in the rotor 40 has a step shape in the axial direction. However, such a configuration may be changed to eliminate the step shape of the middle portion 45 (i.e., the middle portion 45 may have a flat shape).

In the example described above, the conductor 82a of the lead wire 82 of the stator winding 51 is configured as an assembly of a plurality of strands 86. However, the lead wire 82 may be provided as a rectangular cross-section, i.e., square, lead wire 82. Further, the lead wire 82 may be provided as a round lead wire having a circular cross section or an elliptical cross section.

In the example described above, the inverter unit 60 is provided in an inside of the stator 50 in the radial direction. However, the stator 50 may have no inverter unit 60 provided inside of the stator 50 in the radial direction, instead. In such a case, it is possible to leave an inner space which is radial inside of the stator 50 as a vacant space. Further, it is possible to arrange other components other than the inverter unit 60 in the inner space.

The rotating electric machine 10 may have no housing 30 provided therein. In such a case, for example, the rotor 40, the stator 50, and the like may be held by a part of a wheel or by other vehicle components.

The present disclosure may be applicable to a rotating electric machine of an inner rotor structure (i.e., applicable to a rotor-inside structure). In such a case, for example, the stator 50 and the rotor 40 may be provided in order from the radial outer side of the housing 30, and the inverter unit 60 may be provided at a radial inside position of the rotor 40. In the above-mentioned example, although the rotor is described as a SPM rotor, an IPM rotor may also be applicable to the present disclosure. In such a case, the straight portion 83 may serve as a magnet facing portion arranged to face the magnet portion 42 with a predetermined air gap and a rotor core (not shown) interposed therebetween.

<Convertible Structure of Rotating Electric Machine, Controller, and Vehicle System>

Figure 32:
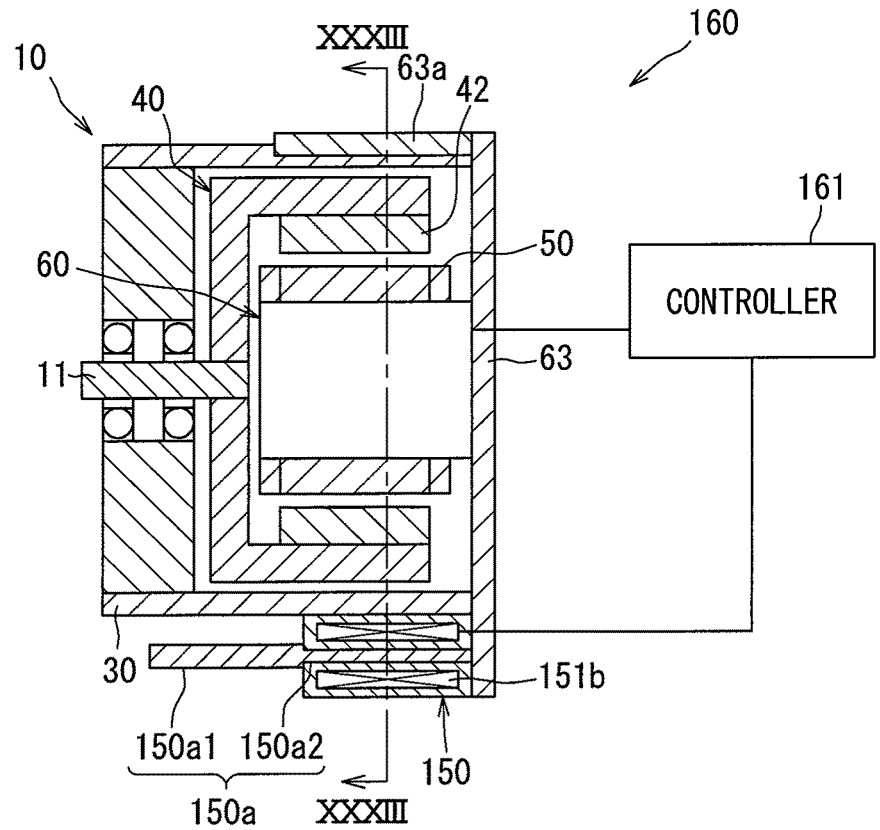
FIG. 32 is a view showing the rotating electric machine provided with a displacement mechanism and a vehicle system according to a first embodiment of the present disclosure.
Figure 33:
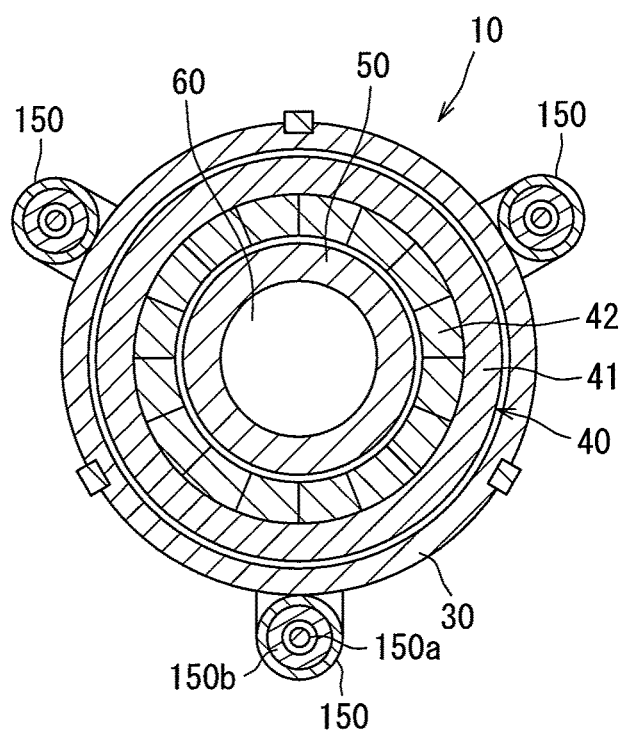
FIG. 33 is a cross-sectional view taken along a line XXXIII-XXXIII in FIG. 32.
Figure 34:
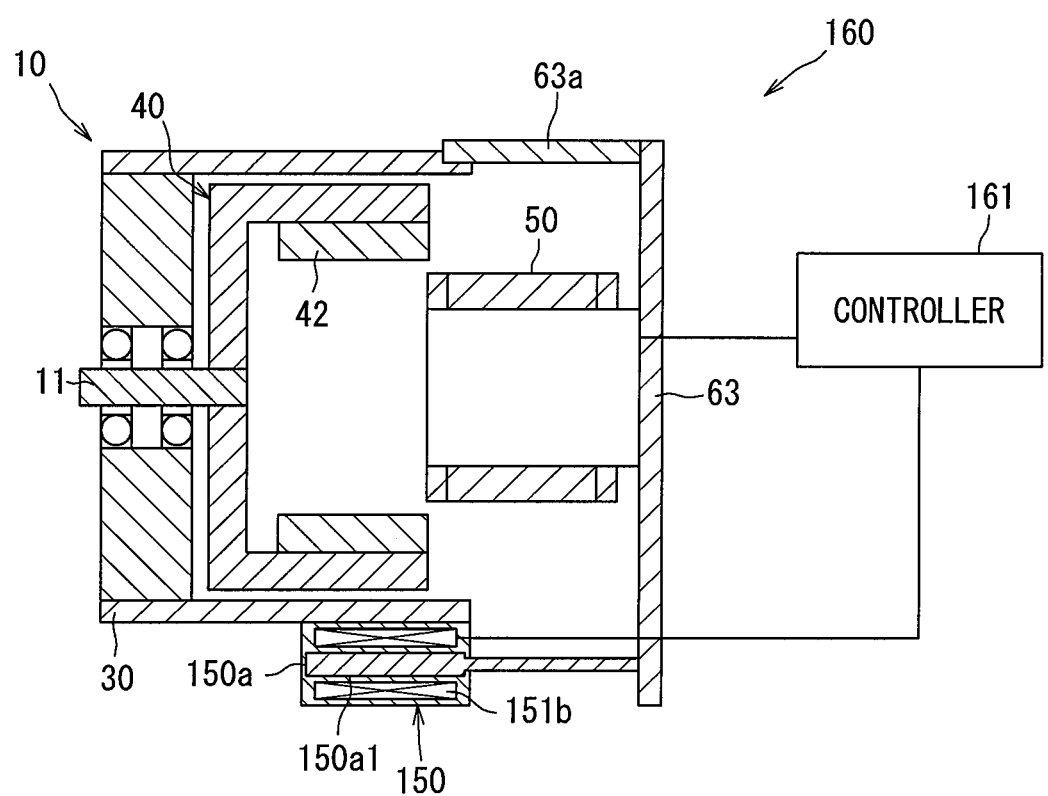
FIG. 34 is a cross-sectional view showing a disengage state.

First, the convertible structure adopted by the rotating electric machine 10 of the present embodiment is described. As shown in FIGS. 32 to 34, the rotating electric machine 10 of the present embodiment is configured such that the rotor 40 and the stator 50 are displaceable relative to each other in the axial direction. In FIG. 32, a cross-sectional view of the rotating electric machine 10 corresponding to FIG. 2 is simplified and shown. FIG. 33 is a cross-sectional view taken along a line XXXIII-XXXIII in FIG. 32.

FIG. 32 shows an example in which, as the rotating electric machine 10 having the outer rotor structure, the end plate portion 63 does not have the opening 65 and the rotation shaft 11 does not penetrate the end plate portion 63. However, as described above, the present disclosure can also be applied to a configuration in which the rotation shaft 11 penetrates the end plate portion 63, that is, a configuration in which both ends of the rotation shaft 11 project to an outside of the rotating electric machine 10.

The rotating electric machine 10 includes a plunger 150 as a displacement mechanism that displaces the rotor 40 and the stator 50 relative to each other in the axial direction. The plunger 150 of the present embodiment is provided to move the stator 50 along the axial direction. The plunger 150 has a rod 150a and a coil 150b. The rod 150a is extended along the axial direction. The rod 150a has an enlarged diameter portion 150a1 and a reduced diameter portion 150a2 having a smaller diameter than the enlarged diameter portion 150a1. One end of the reduced diameter portion 150a2 is fixed to the end plate portion 63, and the other end of the reduced diameter portion 150a2 is connected with the enlarged diameter portion 150a1. The plunger 150 has a return spring not shown in the drawing.

The end plate portion 63 includes a fitting portion 63a which is slidably fitted in the axial direction with respect to the housing 30. The fitting portion 63a is axially slidable, for example, by straight spline fitting. The stator 50 is integrated with the inverter unit 60 as described above, and moves together with the end plate portion 63. The number of plungers 150 provided in the rotating electric machine 10 is not particularly limited. In the present embodiment, three plungers 150 are provided. The three plungers 150 are arranged at regular intervals on concentric circles centered on the rotation shaft 11. The three plungers 150 simultaneously move the end plate portion 63 at three positions. Thereby, the end plate portion 63 is smoothly movable.

In a state where the coil 150b is not energized, the end plate portion 63 is positioned at an initial position by the return spring. FIG. 32 shows such a non-energized state. In such a state, the reduced diameter portion 150a2 is mainly disposed in the annular coil 150b. In the non-energized state, the mutually facing regions of the rotor 40 (i.e., the magnet portion 42) and the stator 50 become the longest in the axial direction (see FIG. 32). That is, the size of facing area is maximized. For example, the stator 50 faces the entire region of the magnet portion 42 in the axial direction. As a result, the output characteristics of the rotating electric machine 10 have low rotation and high torque characteristics. The relative positioning of the rotor 40 and the stator 50 shown in FIG. 32 is an initial position in the non-energized state of the coil 150b.

When the coil 150b is energized, the enlarged diameter portion 150a1 is drawn into the coil 150b, and the rod 150a moves along the axial direction. With the movement of the rod 150a, the end plate portion 63 moves away from the original position in the axial direction. As the end plate portion 63 gets farther from the original position, the size of facing area between the rotor 40 and the stator 50 becomes smaller. By reducing the size of facing area, the reverse electromotive force generated in the stator winding 51 is reducible. Therefore, even when a field weakening control is not performed, the electric current can be favorably supplied to the stator winding 51 when the rotor 40 is rotating at high speed. That is, the efficiency deterioration of the rotating electric machine 10 at a high speed rotation time is preventable.

FIG. 34 shows a state in which the rotor 40 and the stator 50 are moved relative to each other so as not to face each other. In other words, FIG. 34 shows a state in which the stator 50 is completely disengaged from the rotor 40. In such a state, the enlarged diameter portion 150a1 is drawing into, and is mainly positioned in the coil 150b. Due to the move of the stator 50 to a position at which the size of facing area is substantially zero, the rotating electric machine 10 is in a free run (i.e., idle) state. The relative positional relationship between the rotor 40 and the stator 50 shown in FIG. 34 is a disengage state.

Next, the controller and the vehicle system are described.

Figure 35:
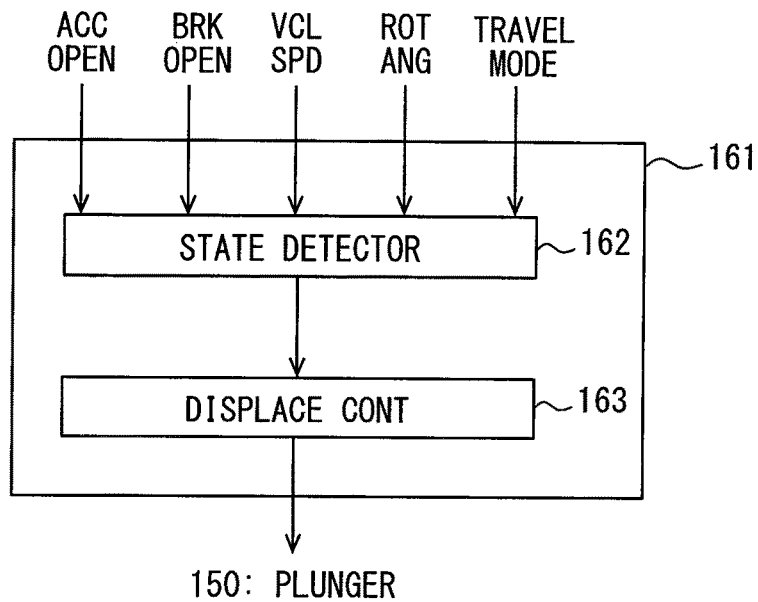
FIG. 35 is a functional block diagram showing the controller.

As shown in FIGS. 32 and 34, a vehicle system 160 applied to a vehicle includes the rotating electric machine 10 of the above-described convertible structure and a controller 161. As shown in FIG. 35, the controller 161 at least includes a state detector 162 and a displacement control unit 163. The controller 161 is configured to control the plunger 150, which is a displacement mechanism, according to a state of the vehicle. The controller 161 is configured, for example, as an ECU (i.e., Electronic Control Unit) equipped with a microcomputer. Further to the function of controlling the operation of the plunger 150, the controller 161 may have a function of generating a torque instruction value to be output to the drive controller 110.

The state detector 162 detects a state of the vehicle based on a signal input from the outside. The following may be the signal input from the outside, for example. That is, a detection result of a sensor mounted on the vehicle, an operation result of an apparatus (ECU) different from the controller 161, a setting by a driver, and the like may be input. The state detector 162 in the present embodiment may detect the state of the vehicle based on, inter alia, an accelerator opening detected by an accelerator opening sensor, a brake pedal opening, a vehicle speed detected by a vehicle speed sensor, a rotation angle of the rotor (i.e., an electric angle) detected by a rotation angle sensor, and a travel mode of a mode selector set by the driver.

The displacement control unit 163 controls the operation of the plunger 150, which is a displacement mechanism, such that a facing state of the rotor 40 and the stator 50 is controlled to a preset state according to the state of the vehicle detected by the state detector 162. The displacement control unit 163 according to the present embodiment controls the operation of the plunger 150 so that the size of the facing area corresponds to the state of the vehicle.

Figure 36:
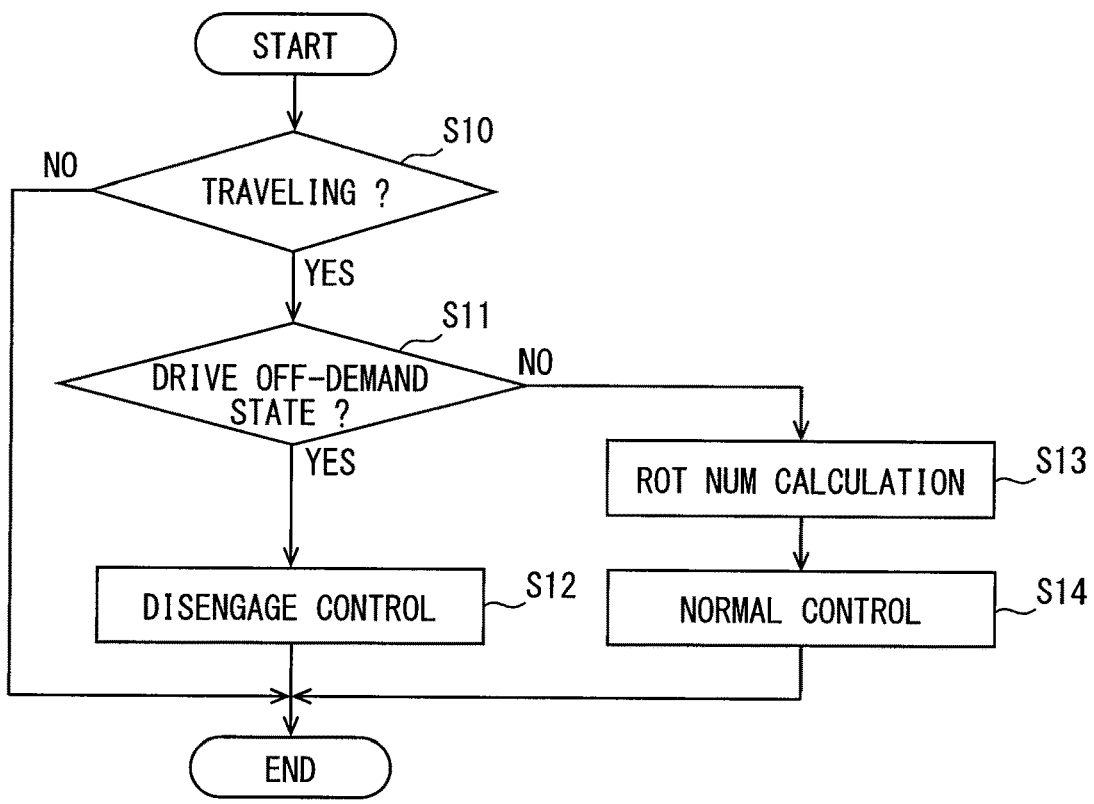
FIG. 36 is a flowchart of a process performed by the controller.

FIG. 36 shows a process performed by the controller 161. The controller 161 repeatedly performs the process described below in a predetermined cycle while the electric power is turned ON. Further, the process described below is performed on all rotating electric machines 10 that serve as a source of travel power of a vehicle.

First, the controller 161 determines whether the vehicle is traveling (step S10). For example, when the vehicle speed is equal to or higher than a predetermined value, the controller 161 determines that the vehicle is traveling. When the vehicle speed is less than the predetermined value, the controller 161 ends the series of processes.

If it is determined that the vehicle is traveling, then the controller 161 determines whether drive of the rotating electric machine 10 (i.e., to serve as a source of travel power of a vehicle) is unnecessary, or off-demand, during the traveling (step S11). When the accelerator opening degree is less than a predetermined value, that is, an accelerator is OFF, the controller 161 determines that a coasting travel (i.e., inertia travel) is performable, that is, drive of the rotating electric machine 10 is unnecessary, or off-demand. Then, the controller 161 performs disengage control (step S12). Note that determination conditions of the coasting travel are not limited to the above example. That is, for example, when the accelerator is OFF and a brake is OFF, it may be determined that the coasting travel is performable.

The controller 161 energizes the coil 150b of the plunger 150 such that the stator 50 is disengaged from the rotor 40 for the rotating electric machine 10 that serves as a source of travel power of a vehicle. By such energization, as shown in FIG. 34, the size of facing area of the rotor 40 and the stator 50 becomes substantially equal to zero, and the rotating electric machine 10 enters a free run state. Therefore, a running resistance (i.e., load) by the rotating electric machine 10 is substantially reduced to zero.

Further, when there is a rotating electric machine 10 that does not require drive in the selected travel mode, the controller 161 determines at step S11 that such a rotating electric machine 10 is in a drive off-demand state. In such a case, the controller 161 also performs the above-described disengage control. When the process of step S12 is performed, the controller 161 ends the series of processes.

On the other hand, the controller 161 detects an operating state of the rotating electric machine 10 that has been determined as not in the drive off-demand state at step S11. For example, the number of rotations (i.e., rotation speed) may be calculated based on the rotation angle (step S13). Next, the controller 161 performs a normal control (step S14). The controller 161 controls the energization of the plunger 150 so that the size of facing area of the rotor 40 and the stator 50 is brought to an area size corresponding to the number of rotations of the rotating electric machine 10. More practically, the energization to the plunger 150 is controlled so that, the lower the rotation speed is, the size of facing area is made greater, and the higher the rotation speed is, the size of facing area is made smaller.

For example, when low rotation and high torque are required, such as when the vehicle is started to drive, energization of the coil 150b of the plunger 150 is stopped. As a result, the size of facing area is maximized as shown in FIG. 32, and the rotating electric machine 10 in such state (i.e., initial state) has low rotation and high torque characteristics.

Figure 37:
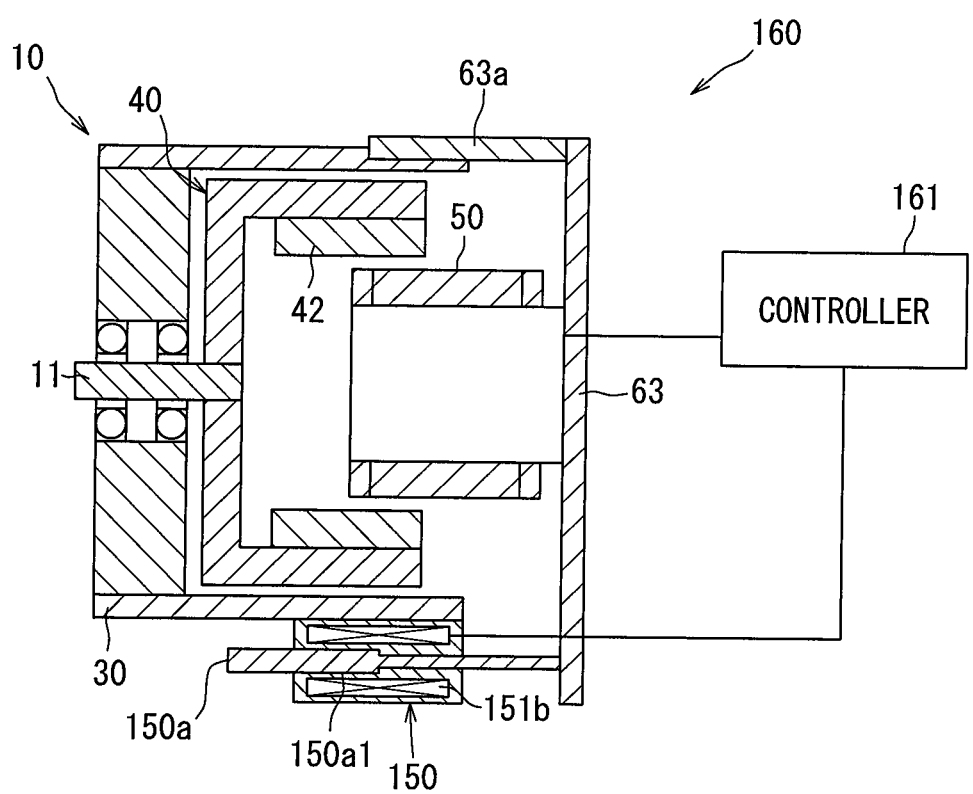
FIG. 37 is a cross-sectional view showing a partially pulled-out state.

Further, the relative position between the rotor 40 and the stator 50 can be set arbitrarily according to the number of rotations. For example, as shown in FIG. 37, the size of facing area of the rotor 40 and the stator 50 may be controlled as about 50% of the state shown in FIG. 32. That is, the stator 50 can be held in a half disengaged state. When the process of step S14 is performed, the controller 161 ends the series of processes. The state detector 162 performs the processes of steps S10, S11, and S13, and the displacement control unit 163 performs the processes of steps S12 and S14.

Figure 38A:
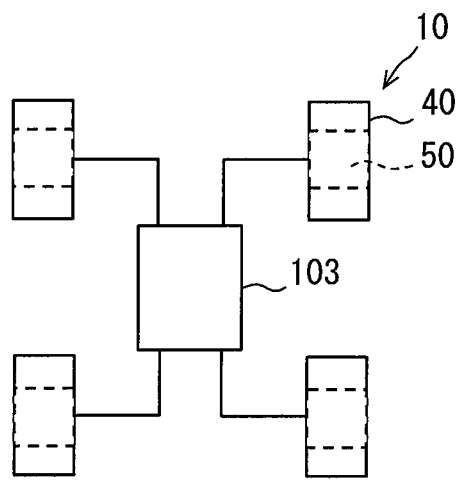
FIGS. 38A, 38B are respectively an illustration of a relationship between a travel mode and a control state.
Figure 38B:
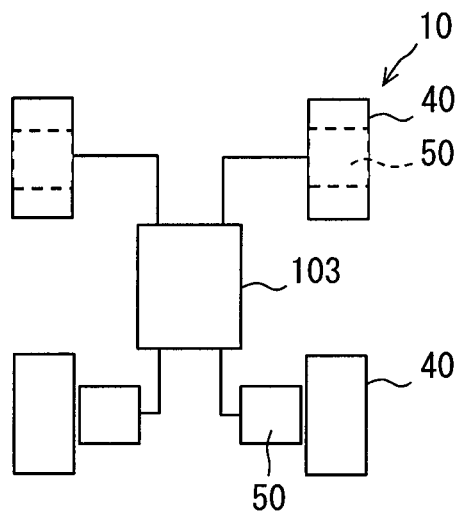

FIGS. 38A/B are respectively an illustration of a relationship between the travel mode and a control state. In FIGS. 38A, 38B, as an example, the rotating electric machine 10 is disposed in each of the four wheels as a source of travel power of a vehicle. The rotating electric machine 10 is provided as an in-wheel motor. FIG. 38A shows a state in which a power mode is set by the mode selector, and FIG. 38B shows a state in which an eco-mode is set by the mode selector. In FIG. 38B, the front wheels are respectively a drive wheel and the rear wheels are respectively a non-drive wheel. FIGS. 38A/B show a state in which the accelerator opening is equal to or greater than a predetermined value, that is, the accelerator is ON.

The power mode is a 4WD mode in which all of the four rotating electric machines 10 are driven. The eco mode is a 2WD mode in which two front side wheels or two rear side wheels are driven by the rotating electric machines 10. When the power mode is set, a normal control is performed for the rotating electric machines 10 on all four wheels. On the other hand, when the eco mode is set, disengage control is performed for the rotating electric machine 10 on the rear wheels that are not driven. Note that, during the coasting travel, disengage control is performed on the rotating electric machines 10 on all four wheels.

Although FIGS. 38A/B respectively illustrate an example of a four-wheel in-wheel motor configuration in which the rotating electric machine 10 is disposed in each of the four wheels of the vehicle, the configuration is not limited thereto. For example, in a modified configuration, two front wheels are driven by one rotating electric machine 10 and two rear wheels are driven by another rotating electric machine 10. Further, in another modified configuration, while front wheels may be driven by an engine, rear wheels may be driven by the rotating electric machine 10, or vice versa.

Next, the effects of the convertible-structure rotating electric machine 10, the controller 161 of the same, and the vehicle system 160 including them are described.

In the present embodiment, as described above, the stator 50 does not have teeth of the magnetic material. Therefore, compared with the structure which has the teeth of a magnetic material, the attracting force which acts between the magnet portion 42 of the rotor 40 and the stator 50 can be weakened. Therefore, the rotor 40 and the stator 50 can be easily displaced relative to each other in the axial direction by the plunger 150 which is a displacement mechanism.

In particular, the rotor 40 and the stator 50 can be easily displaced relative to each other during coasting travel of the vehicle, for example, i.e., when the stator winding 51 is not energized, i.e., is in non-energized state. Even if the magnet portion 42 with a high magnetic flux density is used due to the increase in the amount of magnet, the material of the magnet, the arrangement of the magnet (e.g., the above-mentioned Halbach Array), or the like, the rotor 40 and the stator 50 can be easily displaced relative to each other because of lack of teeth made of magnetic material. Thereby, the increase of the size of the plunger 150 is prevented.

Further, the plunger 150 is operated to set a preset facing state of the rotor 40 and the stator 50 according to the state of the vehicle. More practically, the plunger 150 is operated so as to have the size of facing area corresponding to the state of the vehicle. The magnitude of the linkage magnetic flux acting on the stator 50 from the magnet portion 42 changes in accordance with the size of facing area. Therefore, an output characteristic is settable according to the state of the vehicle. For example, by increasing the size of a facing area, the rotation shaft 11 can be rotated in a high torque state at low speed. Further, by reducing the size of the facing area, high-speed traveling at high efficiency that does not require field weakening becomes possible. Further, by reducing the size of the facing area substantially to zero, the rotating electric machine 10 that does not require drive can be put into a free run state. Thereby, the energy loss at the drive unnecessary time, i.e., at a drive off-demand time, is reducible.

As the rotating electric machine 10 with the stator 50 having no teeth of magnetic material, as shown in FIG. 10, FIG. 25, FIG. 27, and FIG. 28, the stator core 52 made of the magnetic material may preferably be disposed on one side in the radial direction, i.e., a side facing-away from the rotor 40 or an anti-rotor side, among two sides of the stator winding 51. According to the above, since the stator core 52 provided on the opposite side in the radial direction with respect to the rotor 40 functions as a back yoke, no teeth are required at a position between the straight portions 83 of the stator winding 51 for a formation of an appropriate magnetic circuit.

Further, as shown in FIG. 29, the stator 50 may be configured as (i) not having a stator core of a magnetic material, and (ii) having a non-magnetic material winding holder 58 for holding the stator winding 51. According to the above, since the stator 50 has a coreless structure, the attracting force attracting the magnet portion 42 of the rotor 40 and the stator 50 can be further weakened. That is, relative displacement of the rotor 40 and the stator 50 can be further facilitated.

Further, although an example of performing a normal control according to the rotation speed is shown, the present embodiment is not limited to such a configuration. That is, instead of using the number of rotations, torque demand for the rotating electric machine 10 may be calculated, for example, and a normal control may be performed according to such a torque demand. The state detector 162 may serve at least as a part of a torque instruction generation unit.

The process of step S13 (i.e., rotation number calculation) may be eliminated, and, at step S14, energization control may be performed so that the facing state of the rotor 40 and the stator 50 becomes a predetermined state set in advance. The relative position may be switched in two steps. For example, non-energization control to plunger 150 may be performed as a normal control. In such a case, if it is determined at step S11 that the drive off-demand state is not currently set, the energization of the coil 150b of the plunger 150 is stopped, and the rotating electric machine 10 is put in the state shown in FIG. 32.

Although an example has been shown in the above as performing the disengage control of step S12 (a) when coasting travel conditions are satisfied or (b) when a travel mode is selected in which drive by the rotating electric machine 10 is unnecessary, or off-demand, the present embodiment is not necessarily limited thereto. That is, only one of the above two situations may be set as the condition for performing the disengage control.

Although an example has been shown in the above in which the travel mode is set by the mode selector operated by the driver, the present disclosure is not limited thereto.

The present disclosure can also be applied to a configuration having a function of automatically switching the travel mode according to the travel state. The travel mode information may be acquired from a device (e.g., an ECU) different from the controller 161, and the determination process of the drive off-demand state at step S11 may be performed based on such information.

Although an example has been shown in which coasting travel conditions are satisfied by the release of the accelerator during the travel of the vehicle, satisfaction of the coasting travel conditions is not limited to such an example. For example, in a vehicle provided with an automatic drive controller, the coasting travel condition satisfied state (i.e., a "no drive by the rotating electric machine 10 required" state) may be detected based on a signal from the automatic drive controller.

Although one end of the rod 150*a* of the plunger 150 is fixed to the end plate portion 63, the present disclosure is not limited thereto. The plunger 150 may be provided to move the stator 50. For example, in a configuration where the housing 30 has a front housing and a rear housing to which the stator 50 is fixed, one end of the rod 150*a* may be fixed to the rear housing.

Although an example of the plunger 150 is shown as a displacement mechanism, the displacement mechanism is not limited to a plunger. That is, as long as the rotor 40 and the stator 50 are mutually displaceable in the axial direction, any device may be used as the displacement mechanism. For example, a displacement mechanism may be providable as (i) a mechanism including a gear and a motor and different from the rotating electric machine 10, (ii) a hydraulic actuator, (iii) a pneumatic actuator, (iv) a mechanism including a wire and a motor other than the rotating electric machine 10 for winding the wire by such motor, or the like.

Although an example has been shown as the one which moves the stator 50, the rotor 40 may also be moved. Further, the configuration described above is not limited to the outer rotor structure. That is, an inner rotor structure may be adoptable.

Although a totally-non facing state of the rotor 40 and the stator 50 has been shown as a disengage state, the disengage state is not necessarily limited thereto. For example, in the configuration where the stator core 52, the stator core 52 and the magnet portion 42 face each other at the initial position. Therefore, if at least the stator core 52 is moved to a position not facing the magnet portion 42, for example, it may serve as the disengage state. Further, since the coil side portion 53 of the stator winding 51 also faces the magnet portion 42 in the initial position, if at least the coil side portion 53 is moved to a position not facing the magnet portion 42, it may serve as the disengage state. Therefore, the disengage state may be understood as a state, in which the coil end portion 55 and the coil side portion 53 do not face the magnet portion 42, and at least a part of the coil end portion 54 faces the magnet portion 42.

Although an example of performing a disengage control in the drive off-demand state has been shown, the present embodiment is not limited to such configuration. The disengage control may be performed so as to minimize the size of facing area within a range of displaceability of relevant components.

Another example of the rotating electric machine 10 provided with the displacement mechanism is shown below. In another example shown in FIGS. 39A/B to 41A/B, the description of the controller 161 is omitted. Further, the rotating electric machine 10, e.g., the rotor 40 including the magnet portion 42, is simplified in the drawing. Also, in another example, the stator 50 has a slotless structure that does not have slots defined by the magnetic teeth (i.e., teeth made of magnetic material).

Figure 39A:
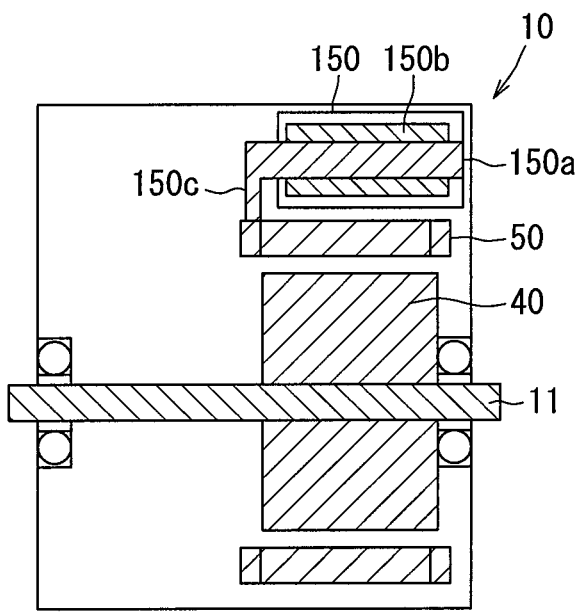
FIGS. 39A, 39B are respectively a cross-sectional view showing another example of the rotating electric machine provided with the displacement mechanism.
Figure 39B:
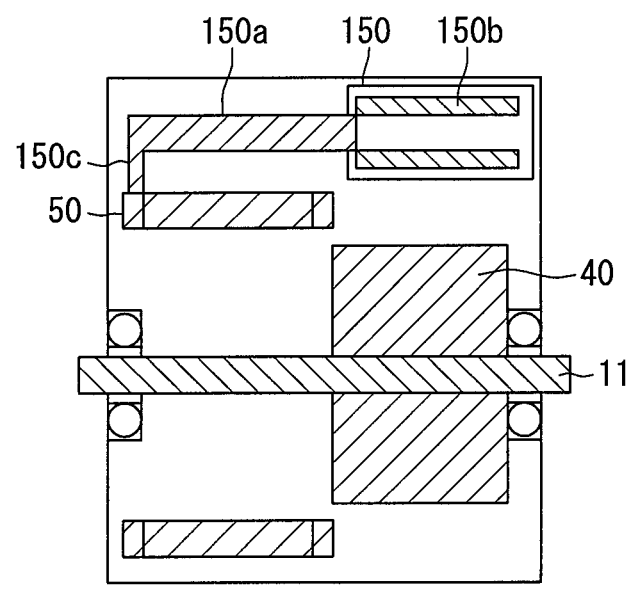

FIGS. 39A/B show an example in which the stator 50 is moved in the inner rotor structure in which the rotor 40 is disposed radially inward with respect to the stator 50. Also in FIGS. 39A/B, the plunger 150 is employed as the displacement mechanism. The rod 150*a* of the plunger 150 and the stator 50 are connected by a connecting portion 150*c*. The stator 50 is axially slidably fitted to a housing. FIG. 39A shows the initial position state of the rotating electric machine 10. When the coil 150*b* is energized, the rod 150*a* is pulled into the coil 150*b*, and the size of facing area between the rotor 40 and the stator 50 is maximized. FIG. 39B shows the disengage state. The coil 150*b* is put in a non-energized state, in which the rod 150*a* is pulled out from the coil 150*b* by the return spring and the stator 50 is moved to a non-facing position where the stator 50 does not face the rotor 40.

Figure 40A:
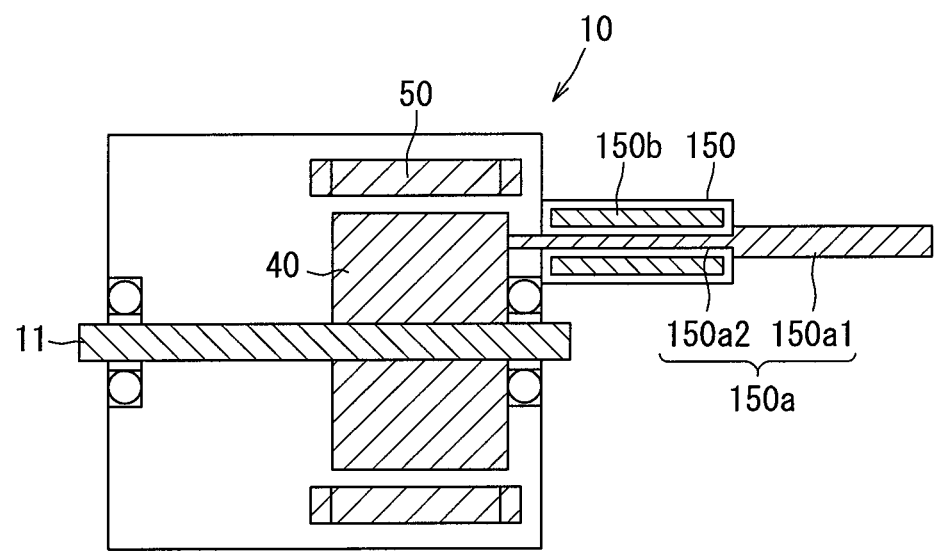
FIGS. 40A, 40B are respectively a cross-sectional view showing yet another example of the rotating electric machine provided with the displacement mechanism.
Figure 40B:
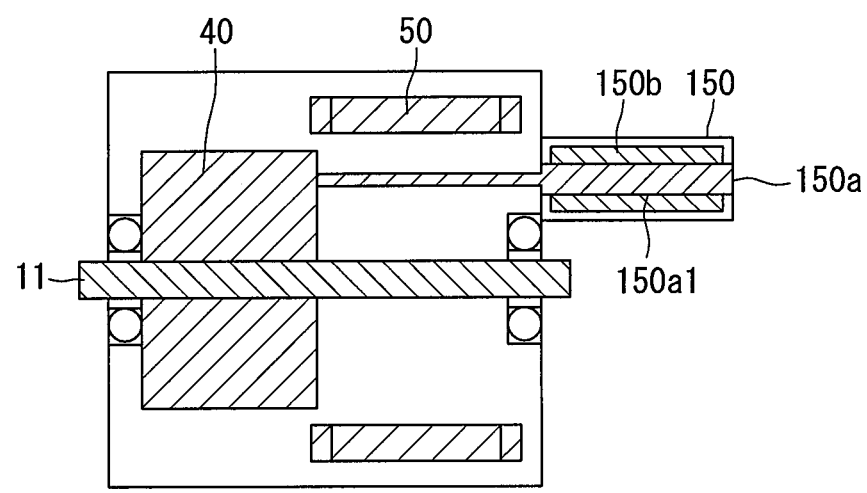

FIGS. 40A/B show respectively an example in which the rotor 40 is moved by the plunger 150 in the inner rotor structure similar to FIGS. 39A/B. In FIGS. 40A/B, the rotor 40 is provided so as to be axially displaceable with respect to the rotation shaft 11 by straight spline fitting or the like. FIG. 40A shows the original position state. The coil 150*b* is put in the non-energized state, and the reduced diameter portion 150*a*2 of the rod 150*a* is disposed in the coil 150*b* by the return spring, and the size of facing area between the rotor 40 and the stator 50 is maximized. FIG. 40B shows the disengage state. When the coil 150*b* is energized, the enlarged diameter portion 150*a*1 of the rod 150*a* is drawn into the coil 150*b*, and the rotor 40 is moved to a position where it does not face the stator 50.

Figure 41A:
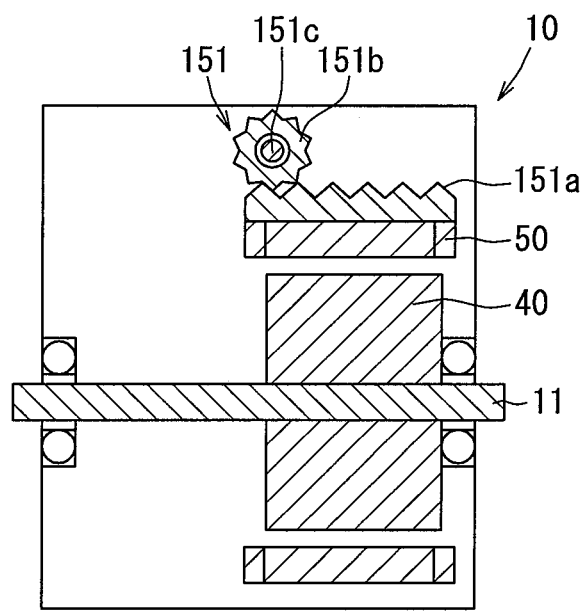
FIGS. 41A, 41B are respectively a cross-sectional view showing still yet another example of the rotating electric machine provided with the displacement mechanism.

FIGS. 41A/B also show respectively an example in which the stator 50 is moved in the inner rotor structure. In FIGS. 41A/B, a displacement mechanism 151 using a gear is employed. In FIGS. 41A/B, the stator 50 is provided so as to be axially displaceable with respect to the housing by straight spline fitting or the like. The displacement mechanism 151 has a gear 151*a* provided on the outer periphery of the stator 50, a gear 151*b* for engaging with the gear 151*a* and moving the stator 50, and a motor for rotating the gear 151*b*. In FIGS. 41A/B, only a rotation shaft 151*c* is shown among other components of the motor. The gear 151*a* is extended in the axial direction on a part of the outer periphery of the stator 50. The rotation shaft 151*c* is extended in the direction orthogonal to both of the axial direction and the radial direction. The gear 151*b* rotates about the rotation shaft 151*c* by the drive of the motor, and moves the gear 151*a* and hence the stator 50 in the axial direction. The displacement control unit 163 of the controller 161 controls the drive of the motor.

Figure 41B:
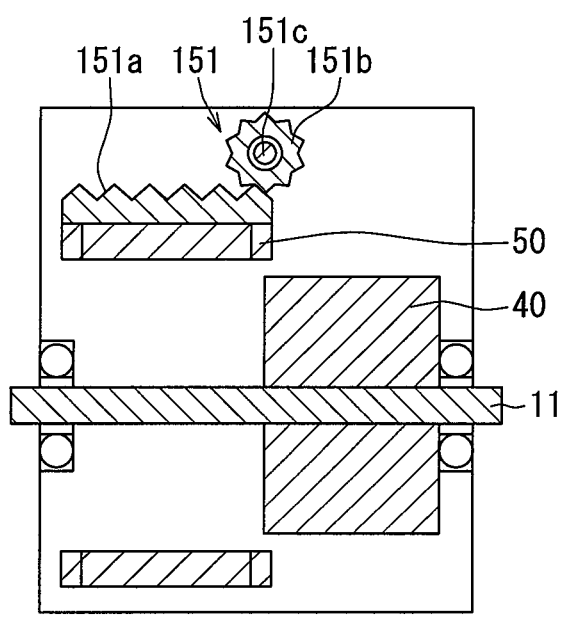

FIG. 41A shows the initial position state. In such a state, the size of facing area between the rotor 40 and the stator 50 is maximized. FIG. 41B shows the disengage state. By the drive of the motor, the gear 151*b* is rotated, whereby the gear 151*a* shifts in the axial direction, and the stator 50 is moved to a position where it does not face the rotor 40. Note that, in each of the examples shown in FIG. 39A to FIG. 41B described above, it may be possible to hold, for example, the rotor 40 and the stator 50 in a half-pulled state, in which one of the rotor 40 and the stator 50 is pulled out, i.e., displaced, to a non-facing state halfway and held thereby, instead of being put and held in the disengage state, or in a fully pulled-out state.

Second Embodiment

The present embodiment may refer back to the preceding embodiment(s). Therefore, the description of the components already described in the preceding embodiment(s) is omitted.

The controller 161 of the present embodiment performs the above-described disengage control when a request for transition to a separation state, that is, a separation request, is input from the outside while the vehicle is stopped. A separation request signal is input to the controller 161 as a switch or the like is operated by a person, e.g., a driver of a vehicle. The switch may be operated when the vehicle is towed or pushed by hand, for example, in a factory, maintenance shop or the like, and for the maintenance of the rotating electric machine 10.

Figure 42:
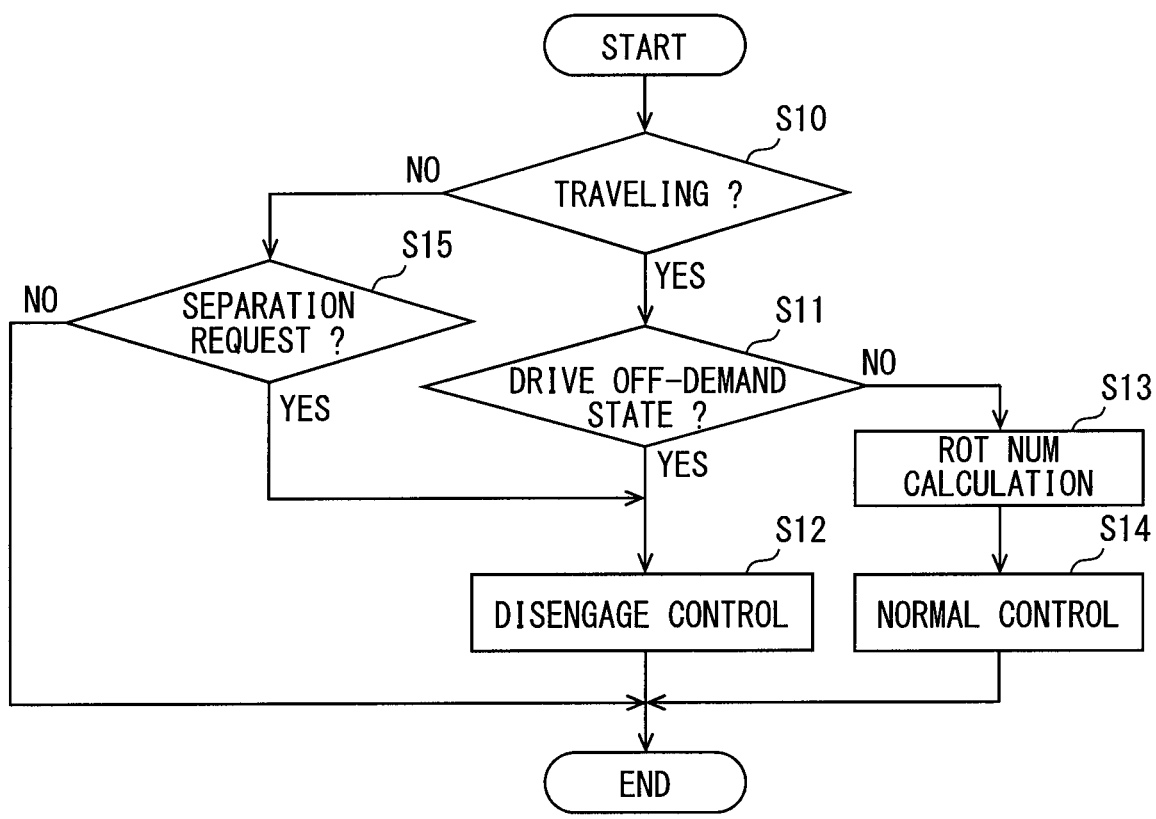
FIG. 42 is a flowchart showing a process performed by the controller according to a second embodiment of the present disclosure.

FIG. 42 shows a process performed by the controller 161. The process from step S10 to step S14 is the same as the process shown in the preceding embodiment (see FIG. 36).

If it is determined at step S10 that the vehicle is not traveling, that is, it is determined that the vehicle is stopped, the controller 161 determines whether or not there is an input of the separation request (step S15). When it is determined that the separation request has been input, the disengage control of step S12 is performed, and a series of processes is ended. On the other hand, if it is determined that the separation request is not input, the series of processes ends. Note that the state detector 162 performs the process of step S15.

The controller 161 may perform the process shown in FIG. 42 in a state where an ignition switch of a vehicle is turned ON and a power supply is turned ON. Further, when the switch is operated with the ignition switch turned OFF, the power supply may be supplied from a battery for performing the process shown in FIG. 42.

Figure 43A:
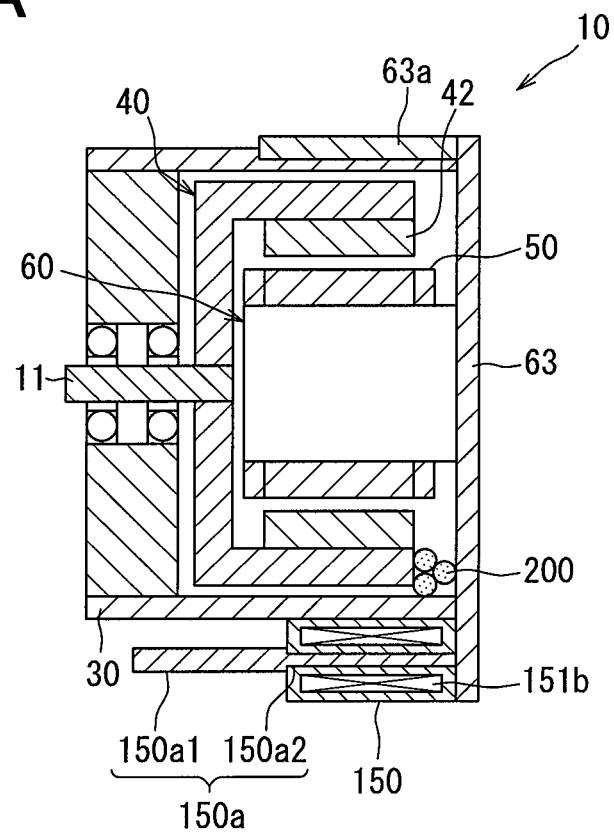
FIGS. 43A, 43B are respectively an illustration of maintenance work performed during a vehicle stop time.
Figure 43B:
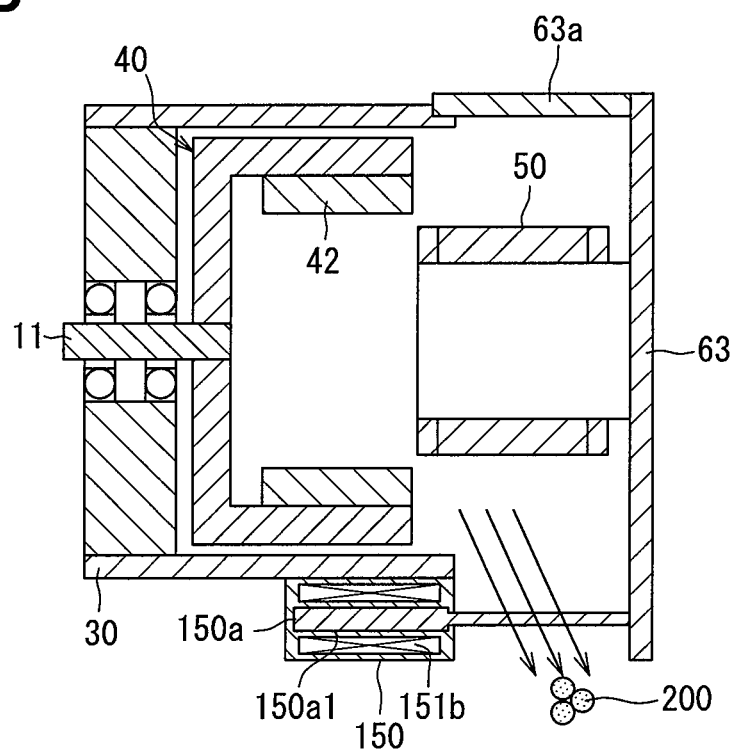

FIG. 43A shows the original position state. In such a state, it is assumed that foreign matter 200 such as mud, salt and the like has intruded into the internal space of the rotating electric machine 10 due to water splash, flooding or the like. FIG. 43A corresponds to FIG. 32. For performing maintenance work of the rotating electric machine 10, when a separation request switch is operated, the rotating electric machine 10 goes into the disengage state as shown in FIG. 43B. Therefore, a gap space is provided at a position between the housing 30 and the end plate portion 63, and the inside of the rotating electric machine 10 is easily cleanable. Thereby, foreign matter 200 is expelled therefrom. Further, the inside of the rotating electric machine 10 may be examinable.

As described above, according to the present embodiment, when a request for disengagement of the rotor 40 and the stator 50 is input while the vehicle is stopped, the rotor 40 and the stator 50 can be brought into the disengage state. Further, since the stator 50 has no magnetic teeth, the rotor 40 and the stator 50 can easily be displaced relative to each other in the axial direction. That is, such a configuration enables easy transition to the disengage state of the rotor 40 and the stator 50 in the rotating electric machine 10.

Since transition to the disengage state may easily be made in such a manner, for example, a towing load is reducible at the time of towing the vehicle. Further, power generation by the rotating electric machine 10 is prevented in such a manner, thereby generation of an overvoltage on a power supply line is preventable during towing. The load is also reducible when moving the vehicle by hand (by pushing, for example). Note that the controller 161 may be configured to perform only the processes of steps S10, S12, and S15. The disengage control may be not performed while the vehicle is traveling, but may only be performed while the vehicle is stopped.

Third Embodiment

The present embodiment may refer back to the preceding embodiment(s). Therefore, the description of the components already described in the preceding embodiment(s) is omitted.

Figure 44A:
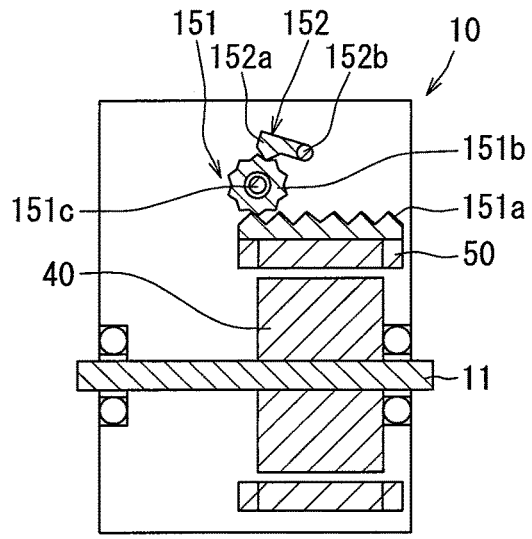
FIGS. 44A, 44B, 44C are respectively a cross-sectional view showing a rotating electric machine according to a third embodiment of the present disclosure.

The rotating electric machine 10 according to the present embodiment includes a lock mechanism 152 as shown in FIGS. 44A/B/C. The lock mechanism 152 restrains or binds the relative displacement between the rotor 40 and the stator 50. The lock mechanism 152 locks relative displacement between the rotor 40 and the stator 50 when the displacement mechanism is not in operation, and releases the lock so that relative displacement is enabled when the displacement mechanism is in operation. The lock mechanism 152 locks the operation of the displacement mechanism in a lock state, and enables the displacement mechanism in an unlock state. In FIGS. 44A/B/C, the description of the controller 161 is omitted. Further, the rotating electric machine 10, e.g., the rotor 40 including the magnet portion 42, is simplified in the drawing.

The rotating electric machine 10 shown in FIGS. 44A/B/C has the same configuration as that of FIGS. 41A/B except that the lock mechanism 152 is provided. The lock mechanism 152 has a lock arm 152a and a motor for rotating the lock arm 152a. Among the motor parts, FIGS. 44A/B/C show only a rotation shaft 152b. The rotation shaft 152b extends substantially in parallel with the rotation shaft 151c. The lock arm 152a is rotated by the motor toward the gear 151b, and engages with the gear 151b to lock the gear 151b which prohibits the rotation of the gear 151b. On the other hand, the lock of the gear 151b is released when the lock arm 152a is rotated toward the opposite side, i.e., away from the gear 151b.

Figure 44B:
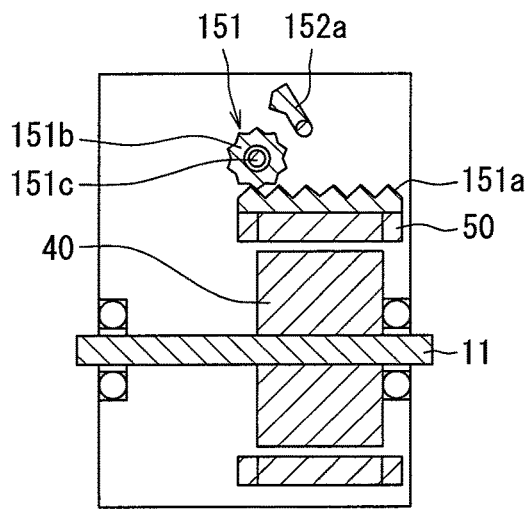
Figure 44C:
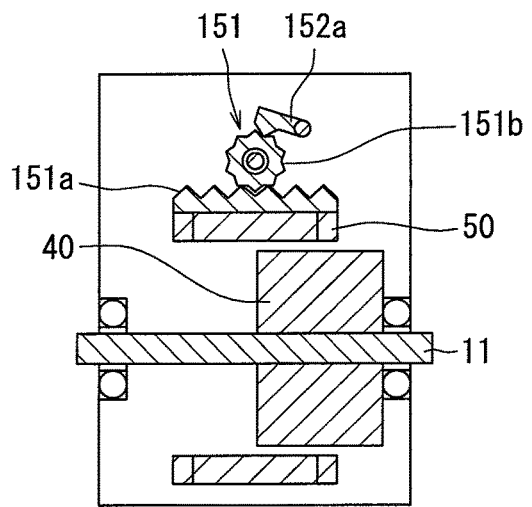

FIG. 44A shows a lock state at the original position. FIG. 44B shows a release state (i.e., an unlock state) in which the lock is released at the original position. FIG. 44C shows a lock state in which the stator 50 is locked at an intermediate position.

Figure 45:
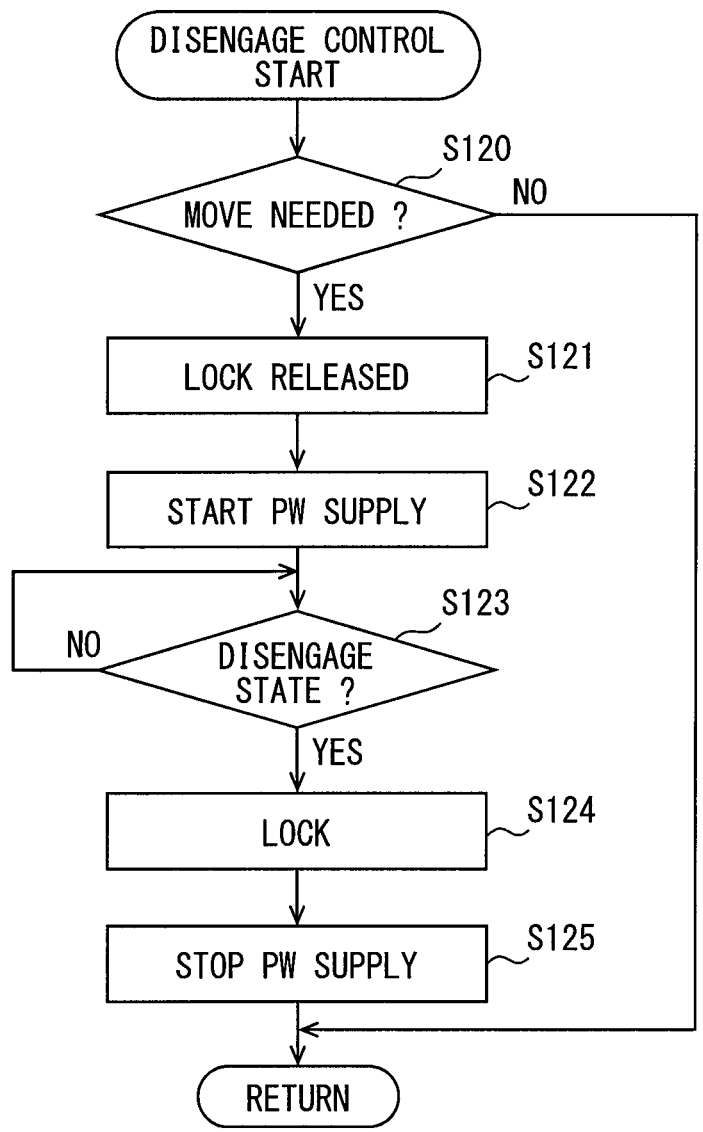
FIG. 45 is a flowchart showing a process performed by the controller.

FIG. 45 is a flowchart showing a disengage control process performed by the displacement control unit 163 of the controller 161, that is, the process of step S12 (see FIG. 42). The position of the stator 50 along the axial direction can be determined based on, for example, a sensor that detects the position of the stator 50, a rotation angle of the motor of the displacement mechanism 151, or the like.

When it is determined at step S11 of FIG. 42 that the drive is not required, the controller 161 then determines whether the stator 50 needs to be moved (step S120). If the stator 50 needs to be moved, the lock arm 152a is rotated to release the lock (step S121). The controller 161 controls the motor of the lock mechanism 152 to be energized, whereby the lock arm 152a is rotated toward the opposite side, i.e., away from the gear 151b. Thus, the lock is released.

After the lock is released, the controller 161 starts energization (i.e., START PW SUPPLY) of the motor of the displacement mechanism 151 (step S122). Next, the controller 161 determines whether or not the disengage state is caused (step S123), and continues the energization until the disengage state is caused.

If it is determined that the stator 50 has moved to the position of the disengage state, then the controller 161 rotates the lock arm 152a to lock (step S124). The controller 161 controls energization of the motor of the lock mechanism 152, whereby the lock arm 152a is rotated to engage with the gear 151b, and the lock state is established. Then, after locking, the controller 161 stops the energization of the motor of the displacement mechanism 151 (step S125). Then, a series of processes is ended. Further, though not illustrated, the same applies to the normal control.

When movement of the stator 50 is required to return to the normal control, the stator 50 is moved to a predetermined position (i.e., the initial position) after the lock is released, and the lock is released upon completing the movement, and then the energization of the motor of the displacement mechanism 151 is stopped.

As described above, according to the present embodiment, the relative displacement between the rotor 40 and the stator 50 is locked by the lock mechanism 152 when the displacement mechanism 151 is not in operation, and the lock is released when the displacement mechanism 151 is in operation. Therefore, the relative positioning of the rotor 40 and the stator 50 is held (i.e., kept unchanged) at an arbitrary position by the lock mechanism 152. For example, even when an attracting force that causes the rotor 40 and the stator 50 to come closer to each other in the axial direction is generated by energization of the stator winding 51, the relative position between the rotor 40 and the stator 50 is maintained, i.e., is kept unchanged. In such a manner, an error in relative positioning regarding the rotor and the stator is preventable, thereby the rotating electric machine 10 is enabled to have the desired output characteristics.

Further, by having the lock mechanism 152, it is possible to maintain the relative position between the rotor 40 and the stator 50 even when an electric current is not constantly applied to the motor of the displacement mechanism 151. Further, when the lock arm 152a engages with the gear 151b of the displacement mechanism 151, the lock state is stably established. Due to the mechanical lock in the above-described manner, the motor of the lock mechanism 152 may only be energized when the lock arm 152a is rotated. Thus, energy consumption is reducible. Note that the motor of the lock mechanism 152 is smaller in size and consumes less power than the motor of the displacement mechanism 151 for moving the stator 50. Therefore, even when energization is continued to hold the lock arm 152a at a predetermined position, energy consumption of the rotating electric machine 10 is reducible.

In the rotating electric machine 10 including the lock mechanism 152, the displacement mechanism is not limited to a configuration shown in FIGS. 44A/B/C. The lock mechanism 152 is also not limited to the above-described configuration. When the rotating electric machine 10 includes the displacement mechanism 151 including the gear 151b, the lock mechanism 152 may be configured to inhibit the rotation of the gear 151b at least by making a physical contact with the gear 151b. As the lock mechanism 152, a plunger including a return spring may be employed instead of the motor.

Fourth Embodiment

The present embodiment may refer back to the preceding embodiment(s). Therefore, the description of the components/configurations already described in the preceding embodiment(s) is omitted.

Figure 46A:
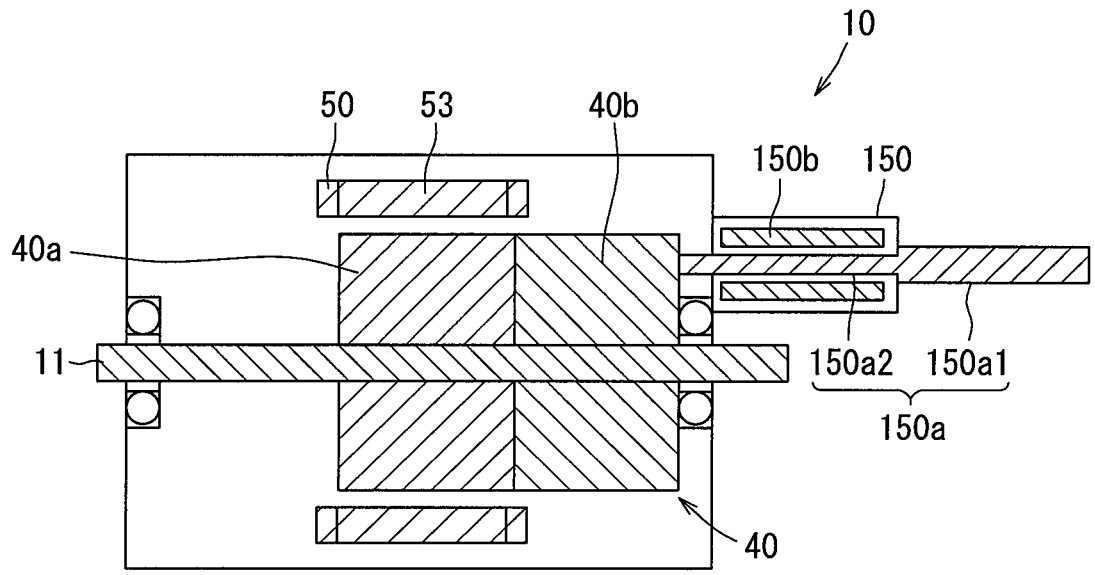
FIGS. 46A, 46B are respectively a cross-sectional view showing a rotating electric machine according to a fourth embodiment of the present disclosure.

As shown in FIGS. 46A/B, in the present embodiment, the rotor 40 is divided into a plurality of blocks 40a and 40b in the axial direction. Although not shown in FIGS. 46A/B, the magnet portion 42 includes, as described above, a plurality of magnets 91, 92 (or 131, 132) arranged on the stator 50 facing surface of the rotor 40 along the circumferential direction. Further, the plurality of blocks 40a and 40b have respectively different magnetic flux strengths. The strength of the magnetic flux may be represented, for example, as a surface magnetic flux density. Except for the configuration of the rotor 40, the rotating electric machine 10 is the same as the one shown in FIGS. 40A/B. The controller 161 is omitted from FIGS. 46A/B. Further, the rotating electric machine 10, e.g., the rotor 40 including the magnet portion 42, is simplified in the drawing.

In the present embodiment, the rotor 40 has two blocks 40a and 40b. The magnetic flux strengths of the blocks 40a and 40b are respectively different because the amounts of magnets are different among them. More practically, the block 40a has more magnets arranged therein than the block 40b. The rotating electric machine 10 is configured to include a plunger 150 as a displacement mechanism, and the rotor 150 is configured to be axially movable by the plunger 150.

FIG. 46A shows an initial position state. The coil 150b is in a non-energized state, and the reduced diameter portion 150a2 of the rod 150a is positioned in the coil 150b by the return spring. Further, the block 40a of the rotor 40 mainly faces the stator 50. In FIG. 46A, only the block 40a faces the coil side portion 53 in the radial direction. As described above, since the block 40a has many magnets, the rotating electric machine 10 has a first characteristic, or more practically, the low rotation (speed) and high torque characteristics.

Figure 46B:
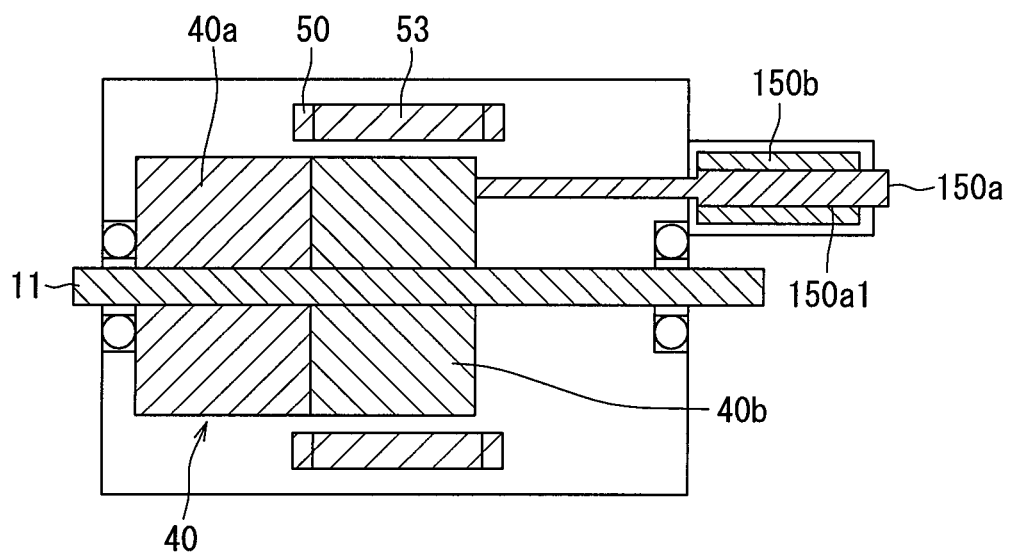

FIG. 46B shows a moved state in which the rotor 40 is moved with respect to the initial position state. FIG. 46B shows, in other words, a state in which switching to a second characteristic that is different from the first characteristic is caused. When the coil 150b is energized, the enlarged diameter portion 150a1 of the rod 150a is drawn into the coil 150b, and the block 40b of the rotor 40 mainly faces the stator 50. In FIG. 46B, only the block 40b faces the coil side portion 53 in the radial direction. As described above, since the block 40b has fewer number of magnets than the block 40a, the rotating electric machine 10 has the second characteristic, or more practically, the high rotation characteristic.

Although not shown, the controller 161 controls energization of the coil 150b of the plunger 150 in accordance with the expected (i.e., on-demand) characteristics of the rotating electric machine 10.

As described above, according to the present embodiment, the blocks 40a and 40b having different magnetic flux strengths are provided axially adjacent to each other. The block 40b faces the stator 50 in the energized state of the coil 150b of the plunger 150, and the block 40a faces the stator 50 in the non-energized state. That is, the characteristics of the rotating electric machine 10 are switchable by simple control of ON and OFF of the plunger 150 which is a displacement mechanism. Further, since no tooth made of magnetic material is formed in the rotating electric machine 10, the characteristics of the rotating electric machine 10 are easily switchable. The controller 161 controls the energization of the coil 150b of the plunger 150 in accordance with the expected (i.e., on-demand) characteristics of the rotating electric machine 10.

Although the rotor 40 has been shown as having two blocks 40a and 40b in the above example, the present embodiment is not limited to such a configuration The rotor 40 may have three or more blocks.

Although it is shown as the example in which the magnetic flux strengths of the plurality of blocks 40a and 40b are made different depending on the amount of magnet, the present disclosure is not limited thereto. The strength of the magnetic flux may be varied depending on the material of the magnet, the arrangement of the magnet, and the like. Further, the facing distance (i.e., gap) of the block 40a and the block 40b to the stator 50 may be set to respectively different values among the two blocks 40a, 40b.

The displacement mechanism is not limited to the plunger 150 described above. Also, instead of the rotor 40, the stator 50 may be displaced. The rotating electric machine 10 is not limited to the inner rotor structure. The lock mechanism 152 described in the previous embodiment may be combined with the configuration of the present embodiment.

Fifth Embodiment

The present embodiment may refer back to the preceding embodiment(s). Therefore, the description of the components already described in the preceding embodiment(s) is omitted.

Figure 47A:
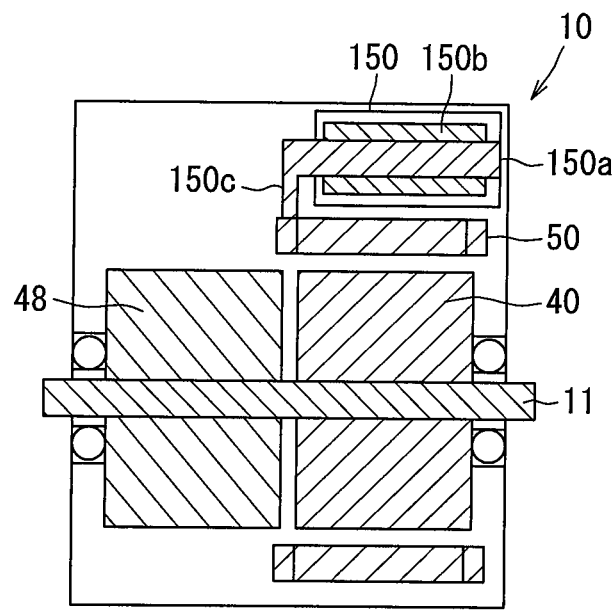
FIGS. 47A, 47B are respectively a cross-sectional view showing a rotating electric machine according to a fifth embodiment of the present disclosure.

As shown in FIGS. 47A/B, the rotating electric machine 10 of the present embodiment has an induction-type rotor 48 (i) having no magnet portion 42 and (ii) arranged side by side in the axial direction with a permanent-magnet-type rotor 40 having the magnet portion 42 (not illustrated in FIGS. 47A/B). The rotor 40 corresponds to a first rotor, and the rotor 48 corresponds to a second rotor. Except for the configuration of the rotor 40, the rotating electric machine 10 has the same configuration as that of FIG. 39. The rotors 40 and 48 are axially offset with respect to the same rotation shaft 11. The controller 161 is omitted from FIGS. 47A/B. Further, the rotating electric machine 10, e.g., the rotor 40 including the magnet portion 42, is simplified in the drawing.

Figure 47B:
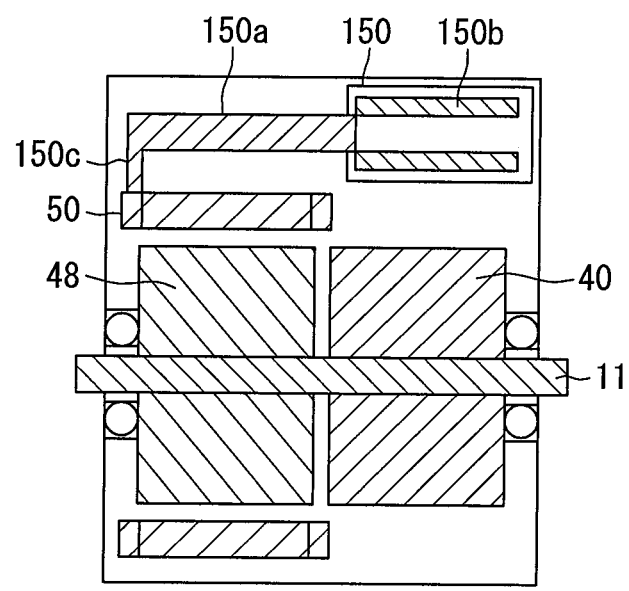

FIG. 47B shows the initial position state. By energizing the coil 150b, the rod 150a is drawn into the coil 150b, whereby the stator 50 is opposed to (i.e., faces) the rotor 40. FIG. 47B shows a moved state in which the stator 50 is moved from the initial position state. That is, the coil 150b is in the non-energized state, and the rod 150a is pulled out from the coil 150b by the return spring, and the stator 50 faces the rotor 48.

Although not shown in the drawing, the controller 161 controls energization of the coil 150b of the plunger 150 in accordance with the expected (i.e., on-demand) characteristics of the rotating electric machine 10.

Thus, according to the present embodiment, the permanent-magnet-type rotor 40 and the magnetic induction-type rotor 48 are arranged side by side in the axial direction on the rotation shaft 11. The stator 50 faces the rotor 40 when the coil 150b of the plunger 150 is energized, and the stator 50 faces the rotor 48 when the coil 150b of the plunger 150 is in the non-energized state. Therefore, also in the present embodiment, the characteristics of the rotating electric machine 10 are switchable by simple control of ON and OFF of the plunger 150 which is a displacement mechanism. Further, since no tooth made of magnetic material is formed in the rotating electric machine 10, the characteristics of the rotating electric machine 10 are easily switchable.

For example, when the coasting travel condition is satisfied, the controller 161 puts the coil 150b in the non-energized state, and causes the stator 50 to face the rotor 48, and maintains the facing state of the rotor 48 and the stator 50 for a predetermined period from a start of re-acceleration. According to the above, at the time of re-acceleration after the coasting travel, for example, the induction-type rotor 48 is advantageous in terms of higher responsiveness than the permanent-magnet-type rotor 40, which can face the stator 50 only after displacement. Note that when the predetermined period ends, the coil 150b may be energized to switch to the rotor 40 (i.e., to displace the stator 50).

The displacement mechanism is not limited to the plunger 150 described above. Also, instead of the rotor 40, the stator 50 may be displaced. The rotating electric machine 10 is not limited to the inner rotor structure. The lock mechanism 152 described in the previous embodiment may be combined with the configuration of the present embodiment.

Sixth Embodiment

The present embodiment may refer back to the preceding embodiment(s). Therefore, the description of the rotating electric machine 10 and the components already described in the preceding embodiment(s) is omitted.

In the present embodiment, an example is described, in which a method for performing maintenance of the rotating electric machine 10 having the above-described displacement mechanism is explained.

Figure 48A:
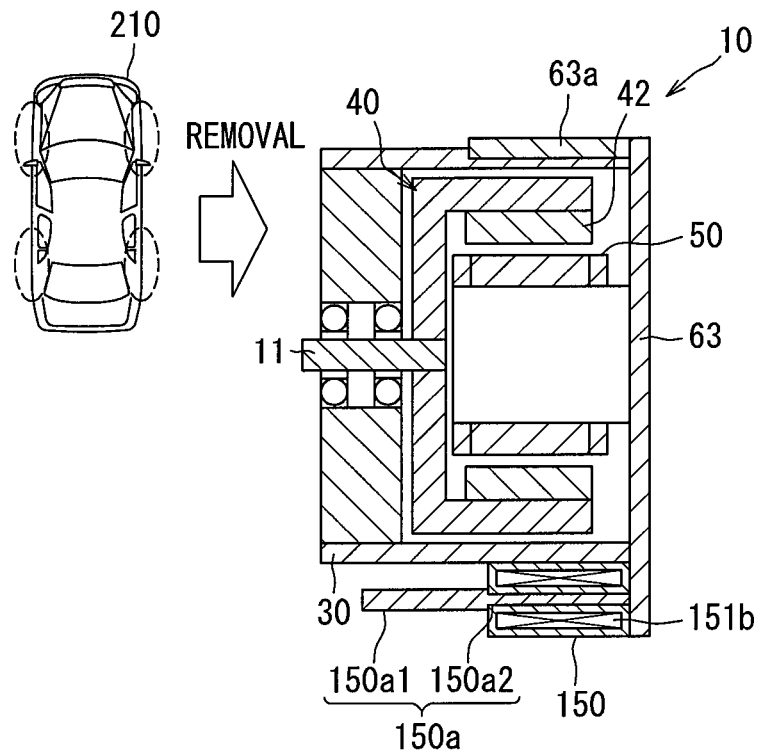
FIGS. 48A, 48B are respectively a view showing a maintenance method of the rotating electric machine according to a sixth embodiment of the present disclosure.

In the preceding embodiments (see FIG. 43A/B), an example has been shown in which a disengage control is performed while the vehicle is stopped, for expelling the foreign matter and the like. On the other hand, in the present embodiment, in an ignition switch turned OFF state, the rotating electric machine 10 is removed from a vehicle 210 as shown in FIG. 48A. In FIG. 48A, at least one of the rotating electric machines 10 disposed on each of the four wheels as an in-wheel motor is removed.

Figure 48B:
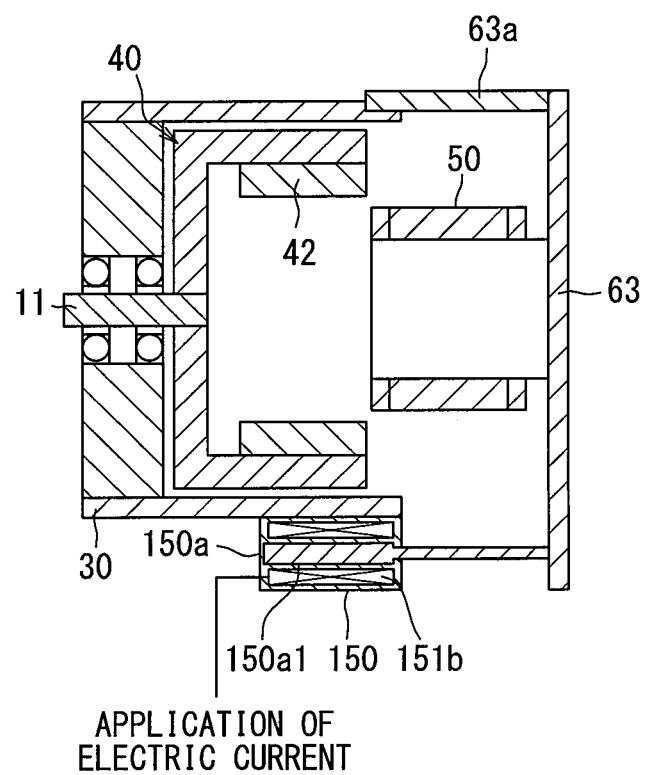

After removal from the vehicle 210, an electric current is applied to the coil 150b of the plunger 150, which is a displacement mechanism, to forcibly operate the plunger 150. By energization, the enlarged diameter portion 150a1 is drawn into the coil 150b, and as shown in FIG. 48B, the size of a facing area is substantially equal to zero, which is the disengage state. In the disengage state, a gap space is provided at a position between the housing 30 and the end plate portion 63, and the inside of the rotating electric machine 10 is cleanable. Further, parts replacement and the like may be performable.

After the maintenance work is complete, the rotating electric machine 10 is reused by re-assembling the rotating electric machine 10 into the vehicle 210.

As described above, according to the present embodiment, since the stator 50 does not have any teeth made of the magnetic material, the rotor 40 and the stator 50 are easily displaceable along the axial direction for performing the maintenance work in a removed state from the vehicle. That is, it is possible to easily put the rotating electric machine 10 in the disengage state. Therefore, maintainability of the rotating electric machine 10 is improvable.

The disclosure in the specification is not limited to the embodiments described therein. The disclosure encompasses the described embodiments as well as variations thereof by those skilled in the art based on the described embodiments. For example, the disclosure is not limited to the combination of parts and/or elements shown in the embodiments. The disclosures are implementable in various combinations thereof. The disclosure can have additional parts that are addable to the embodiments. The disclosure encompasses those in which parts and/or elements of the embodiments have been omitted. The disclosure encompasses the embodiments that have replacements or combinations of parts and/or elements originally disposed in other embodiment(s). The disclosed technical scope is not limited to the description of the embodiments. It is to be understood that the technical scopes disclosed herein are indicated by the description of the scope of the claims, and further include all modifications within the meaning and scope equivalent to the descriptions of the scope of the claims.

What is claimed is:

1. A rotating electric machine, comprising:
a rotatably-supported rotor including a magnet portion;
a stator arranged radially inside of the rotor and including a stator winding; and
a displacement mechanism configured to move the rotor and the stator relative to one another in an axial direction along a rotation shaft of the rotor, wherein
the stator is configured as a slotless structure in which at least one of no magnetic teeth or slot is provided, and
wherein the displacement mechanism is configured to move the rotor and the stator relative to one another so as to be in non-facing positions where the stator does not face the rotor.

2. The rotating electric machine of claim 1, wherein
the stator includes a magnetic stator core, and
the stator core is provided on an anti-rotor side of the stator winding in a radial direction defining a radius of the electric machine.

3. The rotating electric machine of claim 1, wherein
the stator has no magnetic stator core, and
the stator includes a non-magnetic winding holder configured to hold the stator winding.

4. The rotating electric machine of claim 1, further comprising:
a lock mechanism configured to lock and unlock relative displacement of the rotator and the stator, the relative displacement being locked at a non-operation time of the displacement mechanism, and unlocked at an operation time of the displacement mechanism.

5. The rotating electric machine of claim 1, wherein
the magnet portion includes a plurality of magnets arranged on a stator facing surface of the rotor along a circumferential direction, which is defined with reference to the axial direction of the rotating electric machine,
the rotor is divided into a plurality of blocks along the axial direction, and
the plurality of blocks have respectively different magnetic field strengths.

6. The rotating electric machine of claim 1, wherein
the rotor is provided with (i) a first rotor of a permanent magnet type having the magnet portion and (ii) a second rotor of a magnet-less induction type arranged beside the first rotor in the axial direction.

7. A controller of a vehicle including a rotating electric machine configured to provide a travel power of the vehicle, the rotating electric machine including: (i) a rotor rotatably supported and further including a magnet portion; (ii) a stator being arranged radially inside of the rotor, having a stator winding, and including a slotless structure in which at least one of no magnetic teeth and slot is provided; and (iii) a displacement mechanism configured to displace the rotor and the stator relative to one another in an axial direction along a rotation shaft of the rotor, the controller comprising:
a state detector configured to detect a state of the vehicle; and
a displacement control unit configured to control an operation of the displacement mechanism for setting a preset facing state of the rotor and the stator according to the state of the vehicle,
wherein the displacement control unit is configured to control operation of the displacement mechanism to set the rotor and the stator to non-facing positions where the stator does not face the rotor.

8. The controller of claim 7, wherein
when the state detector detects a drive off-demand state of the rotating electric machine when the vehicle is moving, the displacement control unit controls operation of the displacement mechanism of the rotating electric machine in the drive off-demand state to cause relative displacement of the rotor and the stator and to put the rotor and the stator in the non-facing positions.

9. The controller of claim 7, wherein
when the state detector detects a separation request input state requesting a relative movement of the rotor and the stator away from each other, the displacement control unit is configured to control operation of the displacement mechanism to cause the relative movement to put the rotor and the stator in the non-facing positions.

10. The controller of claim 7, wherein
the rotating electric machine includes a lock mechanism, and
the displacement control unit is configured to control the lock mechanism that locks and unlocks relative displacement of the rotor and the stator, the relative displacement being locked at a non-operation time of the displacement mechanism and being unlocked at an operation time of the displacement mechanism.

11. A vehicle system comprising:
a rotating electric machine configured to provide a source of travel power of a vehicle and including:
a rotor rotatably supported and including a magnet portion;
a stator arranged radially inside of the rotor and including a stator winding having a slotless structure in which at least one of no magnetic teeth and slot is provided;
a displacement mechanism configured to cause a relative displacement of the rotor and the stator in an axial direction along a rotation shaft of the rotor; and
a controller comprising:
a state detector configured to detect a state of the vehicle; and
a displacement control unit configured to set a preset facing state of the rotor and the stator according to the state of the vehicle by controlling an operation of the displacement mechanism,
wherein the displacement control unit of the controller is configured to control operation of the displacement mechanism to set the rotor and the stator to non-facing positions where the stator does not face the rotor.

12. A method of maintaining a rotating electric machine, the rotating electric machine including: (i) a rotor rotatably supported and including a magnet portion; (ii) a stator arranged radially inside of the rotor and including a stator winding having a slotless structure in which at least one of no magnetic teeth and slot is provided; and (iii) a displacement mechanism configured to displace the rotor and the stator relative to one another in an axial direction along a rotation shaft of the rotating electric machine, the method comprising:
removing the rotating electric machine; and
operating the displacement mechanism to displace the rotor and the stator away from each other to be put in non-facing positions where the stator does not face the rotor.

13. The rotating electric machine of claim 1, wherein the stator is disengaged from the rotor at the non-facing positions so that the rotating electric machine enters a free run state at which running resistance by the rotating electric machine is substantially zero.

* * * * *